(12) United States Patent
Mizuuchi et al.

(10) Patent No.: US 6,519,077 B1
(45) Date of Patent: Feb. 11, 2003

(54) OPTICAL WAVEGUIDE, OPTICAL WAVELENGTH CONVERSION DEVICE, METHOD FOR PRODUCING THE SAME, SHORT WAVELENGTH LIGHT GENERATION APPARATUS USING THE SAME, OPTICAL INFORMATION PROCESSING APPARATUS USING THE SAME, COHERENT LIGHT GENERATION APPARATUS USING THE SAME, AND OPTICAL SYSTEM USING THE SAME

(75) Inventors: Kiminori Mizuuchi, Osaka (JP); Kazuhisa Yamamoto, Osaka (JP); Yasuo Kitaoka, Osaka (JP); Toshifumi Yokoyama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/534,134

(22) Filed: Mar. 23, 2000

(30) Foreign Application Priority Data

Mar. 23, 1999 (JP) .............................. 11-078706
Oct. 25, 1999 (JP) .............................. 11-303177

(51) Int. Cl.⁷ .......................... G02F 1/365; G02B 6/10; G02B 6/122
(52) U.S. Cl. ....................... 359/332; 385/122; 385/129; 385/130; 385/141
(58) Field of Search ............... 359/326–332; 385/122, 129, 130, 132, 141, 142

(56) References Cited

U.S. PATENT DOCUMENTS

| | | | | |
|---|---|---|---|---|
| 5,315,432 A | * | 5/1994 | Ohno | 359/326 |
| 5,506,722 A | * | 4/1996 | Mizuuchi et al. | 359/332 |
| 5,872,884 A | | 2/1999 | Mizuuchi et al. | 385/130 |
| 6,002,515 A | * | 12/1999 | Mizuuchi et al. | 359/326 |

FOREIGN PATENT DOCUMENTS

| | | |
|---|---|---|
| JP | 1-238631 | 9/1989 |
| JP | 3-261924 | 11/1991 |
| JP | 4-254834 | 9/1992 |
| JP | 5-188420 | 7/1993 |
| JP | 5-273624 | 10/1993 |
| JP | 9-281536 | 10/1997 |

* cited by examiner

Primary Examiner—John D. Lee
(74) Attorney, Agent, or Firm—RatnerPrestia

(57) ABSTRACT

An optical waveguide of the present invention includes: a nonlinear optical crystal; a first ion exchange region provided in the vicinity of a portion of a surface of the nonlinear optical crystal; and a second ion exchange region provided in the surface of the nonlinear optical crystal. The second ion exchange region covers a greater area of the surface than an area covered by the first ion exchange region. The second ion exchange region includes a region having an extent of 0.02 μm to 0.2 μm along a depth direction in which an ion exchange ratio varies along the depth direction.

34 Claims, 25 Drawing Sheets

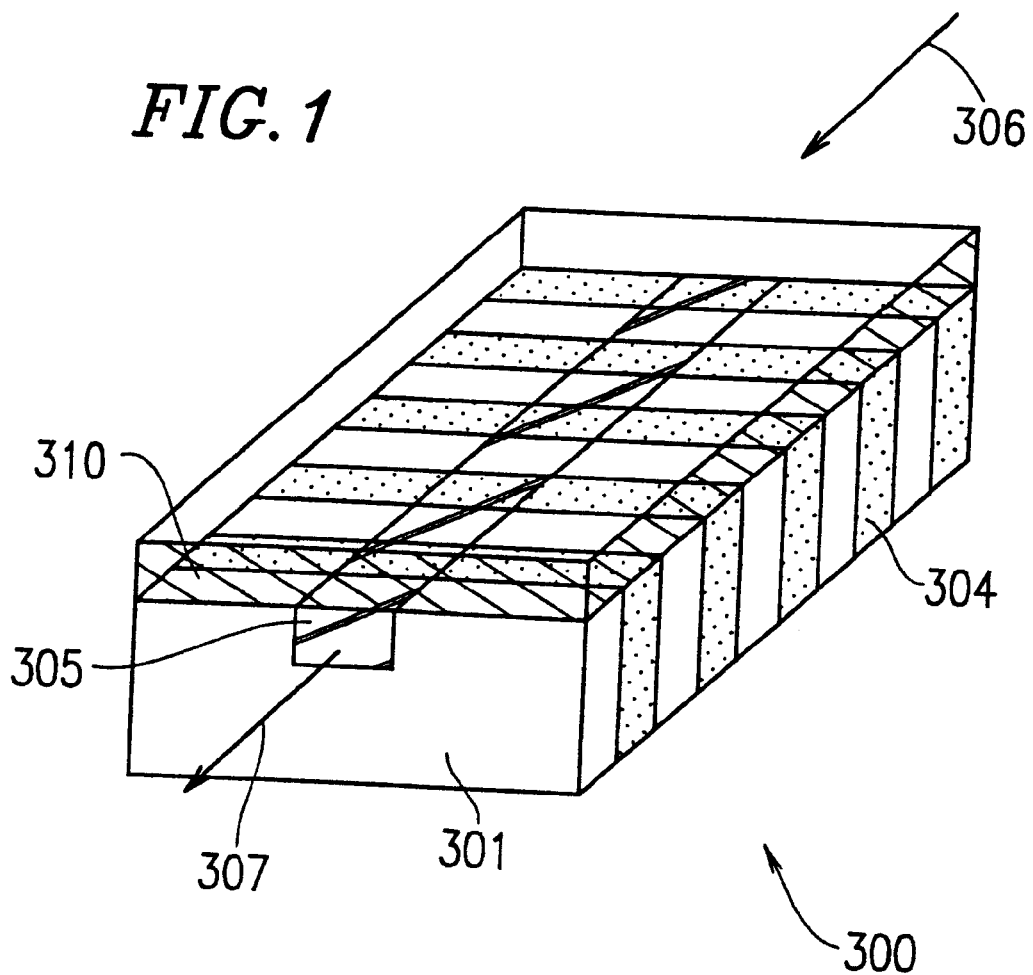

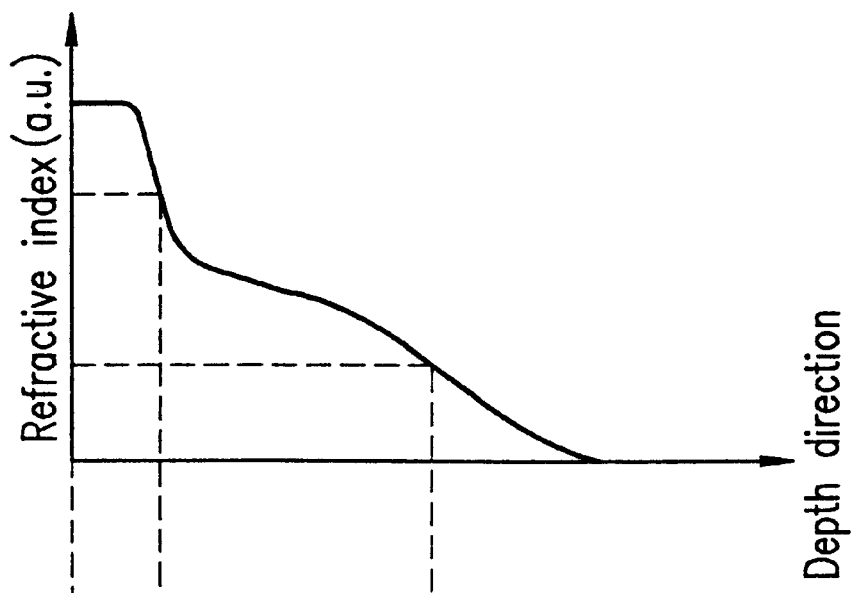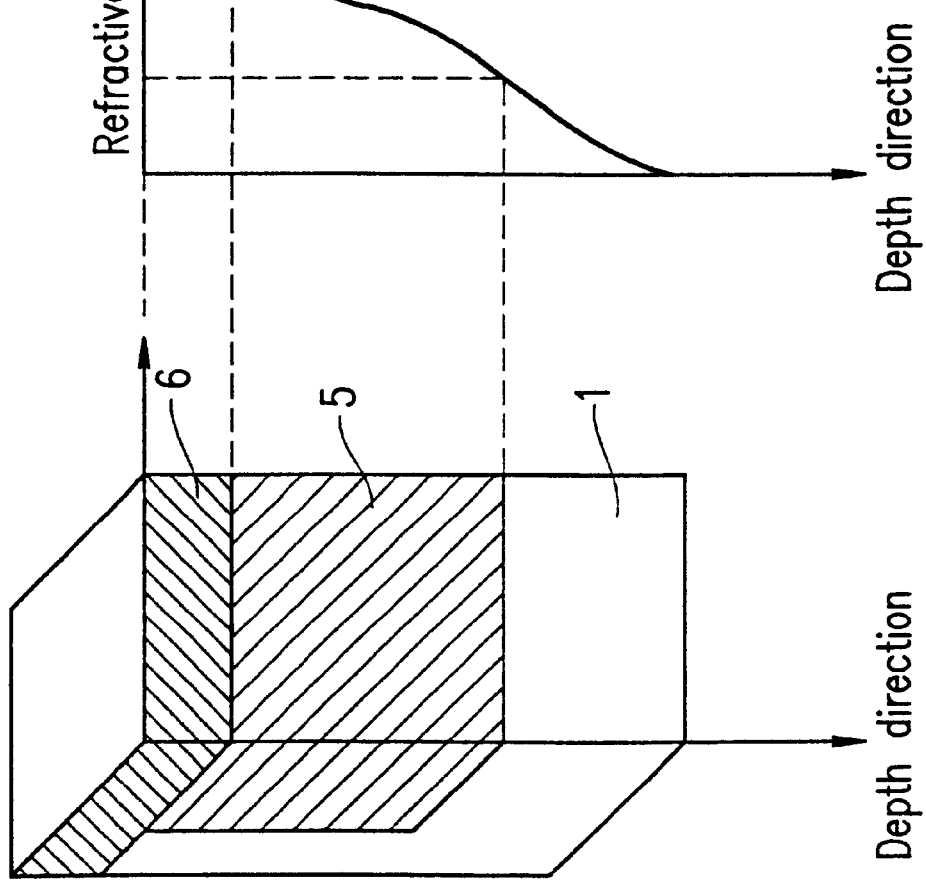

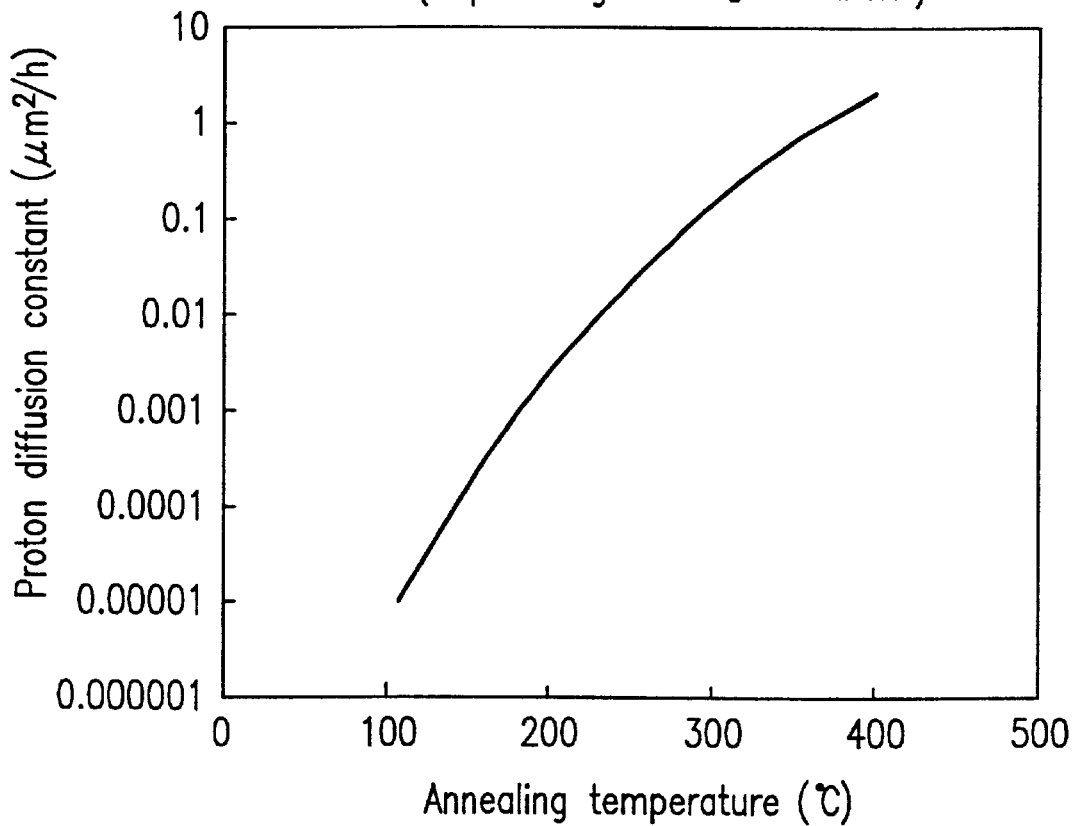
FIG. 4 Relationship between annealing temperature and proton diffusion constant (X plate MgO:LiNbO₃ substrate)

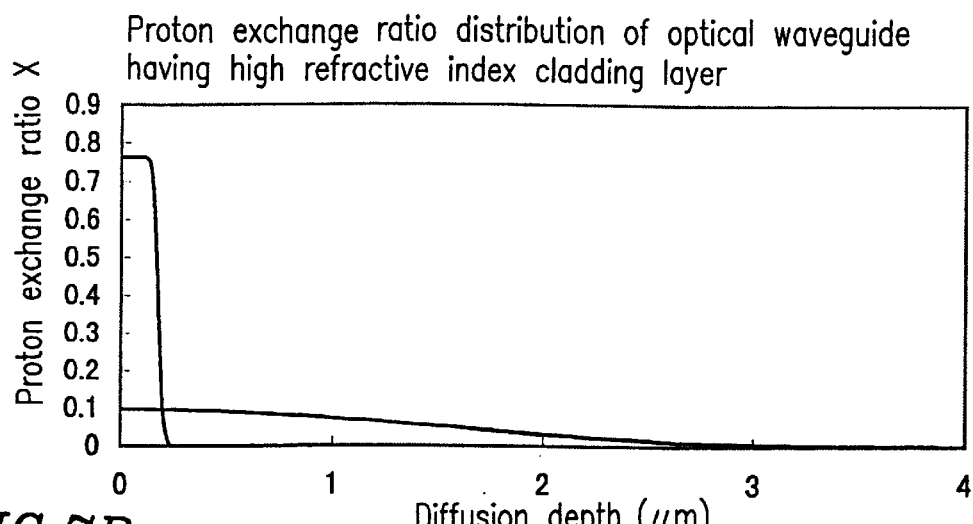
FIG. 7A  Proton exchange ratio distribution of optical waveguide having high refractive index cladding layer
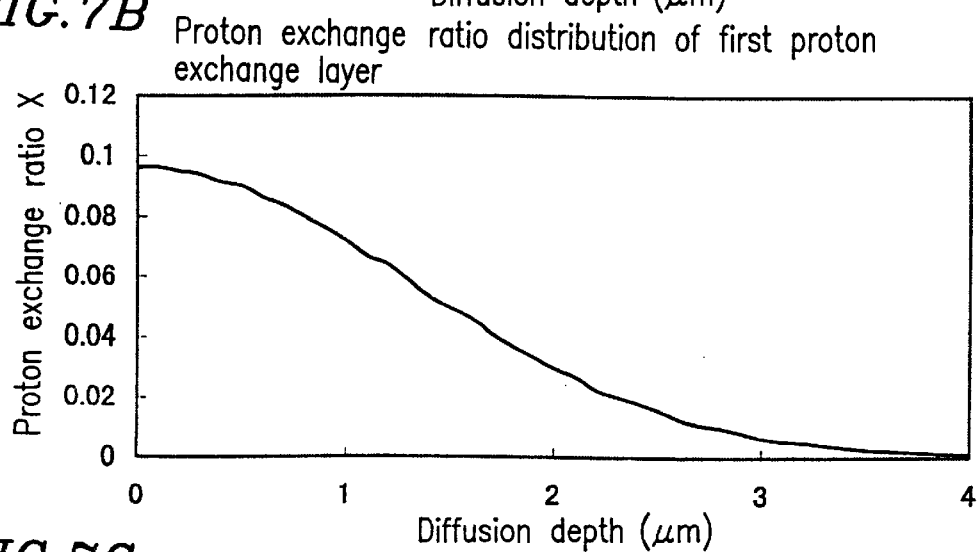
FIG. 7B  Proton exchange ratio distribution of first proton exchange layer
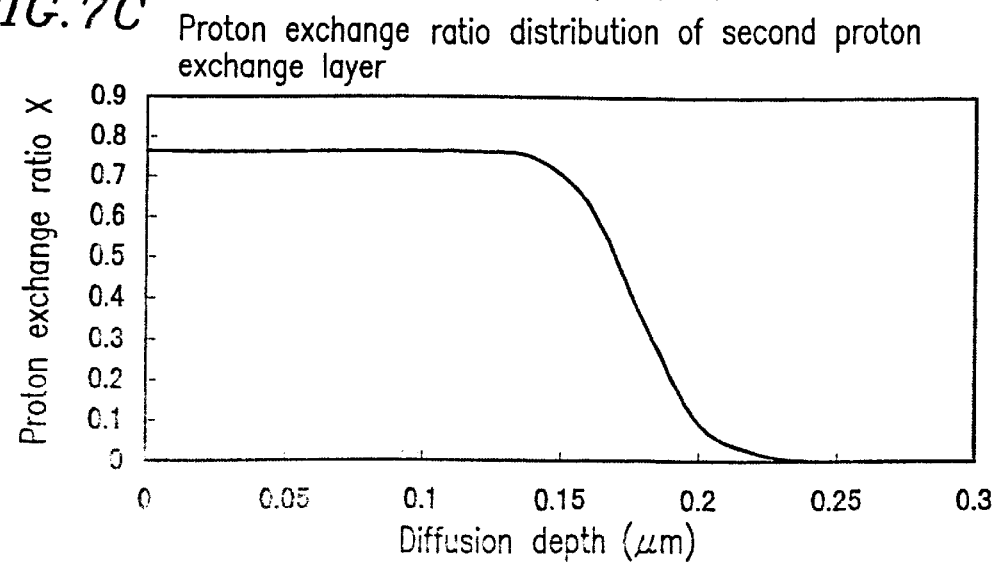
FIG. 7C  Proton exchange ratio distribution of second proton exchange layer Fundamental wave P1 (TM00 mode)

Higher harmonic wave P2 (TM10 mode)

Phase inversion point

Electric field strength

Electric field strength

P1 Fundamental wave
P2 Higher harmonic wave

Electric field strength

OPTICAL WAVEGUIDE, OPTICAL WAVELENGTH CONVERSION DEVICE, METHOD FOR PRODUCING THE SAME, SHORT WAVELENGTH LIGHT GENERATION APPARATUS USING THE SAME, OPTICAL INFORMATION PROCESSING APPARATUS USING THE SAME, COHERENT LIGHT GENERATION APPARATUS USING THE SAME, AND OPTICAL SYSTEM USING THE SAME

BACKGROUND OF THE INVENTION

1. Field of the Invention

The present invention relates to an optical waveguide used with a coherent light in the field of optical information processing or optical measurement, a light wavelength conversion device using the same, a short wavelength light generation apparatus using the same, an optical information processing apparatus using the same, and a method for producing the same. The present invention further relates to a coherent light generation apparatus and an optical system using the same.

2. Description of the Related Art

An optical waveguide has been used as an optical wave controlling means in a wide variety of technical fields, including optical communications, optical information processing, optical measurement, and the like. Particularly, the application of an optical waveguide to an optical wavelength conversion device has been actively studied. Such an optical wavelength conversion device can convert the wavelength of a semiconductor laser device to realize a small-size short wavelength light source.

A conventional optical wavelength conversion device 600 will now be described with reference to FIGS. 24A and 24B. FIG. 24A is a perspective view illustrating an exemplary structure of the conventional optical wavelength conversion device 600. FIG. 24B is a schematic diagram illustrating the conversion of a fundamental wave P1 to a higher harmonic wave P2 through the optical wavelength conversion device 600 of FIG. 24A.

A conventional optical wavelength conversion device as the optical wavelength conversion device 600 of FIG. 24A is disclosed in, for example, Japanese Laid-Open Publication No. 5-273624. In the conventional optical wavelength conversion device 600, a nonlinear deterioration layer is provided in the vicinity of the surface of the optical waveguide so as to achieve an increased efficiency and stabilization of the operation of the optical wavelength conversion device. Referring to FIG. 24A, the optical wavelength conversion device 600 includes an $LiTaO_3$ substrate 601, an optical waveguide 602, a polarization inverted region 603, and a nonlinear deterioration layer 605.

The TM00 mode fundamental wave P1 enters the optical waveguide 602 of the optical wavelength conversion device 600 illustrated in FIG. 24. Then, the TM00 mode fundamental wave P1 is converted into a TM10 mode higher harmonic wave P2 as it propagates through the optical waveguide 602 along which a plurality of the polarization inverted regions 603 are provided periodically. Typically, the nonlinear deterioration layer 605 has a thickness of about 0.45 $\mu$m, and the optical waveguide 602 has a thickness of 1.8 $\mu$m.

As illustrated in FIG. 24B, the TM10 mode higher harmonic wave P2 has two peak outputs of about the same amplitude, on the +E side and on the −E side, respectively. The efficiency of the wavelength conversion operation is increased by increasing the overlap between the TM10 mode higher harmonic wave P2 and the TM00 mode fundamental wave P1 each having an intensity distribution as illustrated in FIG. 24B. Moreover, by choosing TM10 mode for the mode of the higher harmonic wave P2 obtained by the wavelength conversion, it is possible to distribute the power density. Thus, it is possible to suppress optical damages even when the higher harmonic wave output is high.

Another conventional optical wavelength conversion device is disclosed in, for example, Japanese Laid-Open Publication No. 4-254834, in which a high refractive index layer having a higher refractive index than that of the optical waveguide is provided on the optical waveguide. FIG. 25A is a perspective view illustrating such a conventional optical wavelength conversion device 640 with a high refractive index layer. FIG. 25B is a schematic diagram illustrating the confinement of the fundamental wave P1 incident on the optical wavelength conversion device of FIG. 25A.

The fundamental wave P1 enters an end surface 645 of a proton exchange optical waveguide 642 provided on an $LiNbO_3$ substrate 641 of the optical wavelength conversion device 640 as illustrated in FIG. 25A. Then, the fundamental wave P1 is converted into the higher harmonic wave P2 as it propagates through the optical waveguide 642 along which a plurality of the polarization inverted regions 644 are provided periodically. The higher harmonic wave P2 is output through another end surface 646 of the optical waveguide 642.

The device illustrated in FIG. 25A further includes a $TiO_2$ high refractive index layer 643 on the surface of the optical waveguide 642. The refractive index of $TiO_2$ used in the high refractive index layer 643 is greater than that of the proton exchange optical waveguide 642. When such layer 643 having a high refractive index is provided on the optical waveguide 642, the confinement of the fundamental wave P1 into the optical waveguide 642 (strictly speaking, the polarization inverted regions 644 therein), as illustrated in FIG. 25B, thereby increasing the efficiency of the wavelength conversion operation of the optical wavelength conversion device 640.

Still another conventional structure for an optical waveguide of an optical wavelength conversion device is disclosed in, for example, Japanese Laid-Open Publication No. 1-238631. Japanese Laid-Open Publication No. 1-238631 discloses an optical wavelength conversion device which employs a ridge-shaped optical waveguide structure in order to increase the light confinement into the optical waveguide.

It has also been suggested in the prior art to provide on the optical waveguide a high refractive index cladding layer having a refractive index higher than that of the optical waveguide, so as to match the phase of the fundamental mode wave propagating through the optical waveguide with that of the higher mode wave, thereby increasing the overlap between the guided optical waves, and thus realizing an efficient wavelength conversion.

Japanese Laid-Open Publication No. 9-281536 discloses another conventional wavelength conversion technique, in which a proton exchange optical waveguide is provided through a proton exchange process and an annealing process, and a second proton exchange region is further provided, so as to convert a fundamental wave propagating through the optical waveguide into a second harmonic wave having a higher guide mode.

The problems associated with the above-described conventional optical wavelength conversion devices will now be described.

The conventional optical wavelength conversion device 600 illustrated in FIG. 24A, the nonlinear deterioration layer 605 is provided in the vicinity of the surface of the optical waveguide 602, as described above, so as to match the phase of the TM00 mode fundamental wave P1 and that of the TM10 mode higher harmonic wave P2, thereby increasing the efficiency of the wavelength conversion operation and improving the resistance against optical damages. With this conventional structure, the emitted TM10 mode higher harmonic wave P2 has an intensity distribution with two peaks on the +E side and the −E side, respectively. Therefore, the focusing characteristics may be low.

With this conventional structure, the output higher harmonic wave P2 has two peaks having about the same amplitude, so as to distribute the power density of the higher harmonic wave P2 among the higher mode peaks. In order to focus the higher harmonic wave output having such an intensity distribution, it is necessary to provide a special optical system. Such an optical system is complicated and difficult to downsize. Moreover, in order to focus the beam to the diffraction limit, it is necessary to shape the beam significantly, thereby reducing the efficiency of the output light to 50% or less.

Moreover, the nonlinear deterioration layer 605 does not act to increase the confinement of the fundamental wave P1. Therefore, it is not possible to increase the power density of the fundamental wave P1, thereby limiting the improvement in the efficiency.

In the conventional structure illustrated in FIG. 25A, the high refractive index layer 643 having a higher refractive index than that of the optical waveguide 642 is provided so as to increase the confinement into the optical waveguide 642, thereby increasing the efficiency. However, the conventional structure has a problem in that it uses a dielectric film having a high refractive index as the high refractive index layer 643 on the optical waveguide 642. Specifically, the high refractive index layer 643 on the optical waveguide 642 has a substantial influence on the effective refractive index of the optical waveguide 642, whereby a high precision is required for the uniformity in the thickness across the entire area of the optical waveguide 642. For example, in the case of an optical wavelength conversion device, the phase matching condition for the entire length of the optical waveguide is strictly dependent upon the effective refractive index of the optical waveguide. Therefore, if there is any change in the effective refractive index of the optical waveguide, the wavelength conversion efficiency considerably decreases. Thus, a strict uniformity is required for the thickness of the high refractive index layer 643.

In the above-described structure, a material different from that of the substrate 641 is deposited on the surface of the optical waveguide 642, whereby waveguide losses easily occur at the interface between the optical waveguide 642 and the high refractive index layer 643. Moreover, when a strain is introduced to the optical waveguide 642 due to a difference in the expansion coefficient between the high refractive index layer 643 and the substrate 641, the effective refractive index of the optical waveguide 642 will have a distribution along the propagation direction.

Furthermore, it has been found in the art that the propagation loss of the light propagating through the optical waveguide 642 due to the high refractive index layer 643 is problematic.

Generally, the propagation loss along the optical waveguide, which deteriorates the characteristics of the optical wavelength conversion device, is classified into the loss of higher harmonic wave and the loss of fundamental wave. It has been found in the art that the conventional high refractive index layer 643 made of a dielectric has less propagation loss for fundamental wave, but that has substantial propagation loss for the higher harmonic wave having shorter wavelengths. For example, an actual experiment has shown that dielectric films having various high refractive indices have substantial propagation loss of several decibels per cm for the higher harmonic wave in the 400 nm wavelength range. It was found that the wavelength conversion efficiency of the optical wavelength conversion device had been reduced by a factor of 2 or more.

Moreover, with the conventional structure having the nonlinear deterioration layer, since the nonlinear deterioration layer does not has a function of increasing the confinement of the fundamental wave, it is not possible to increase the power density of the fundamental wave, thereby limiting the improvement in the efficiency.

The other conventional optical wavelength conversion device aims to increase the overlap between the fundamental wave and the second harmonic wave. However, the guide mode has a substantial distribution through the optical waveguide due to the difference in the refractive index diffusion between the fundamental wave and the higher harmonic wave, thereby limiting the increase in the overlap between the modes, and it is difficult to significantly improve the wavelength conversion efficiency. Moreover, since the fundamental wave and the second harmonic wave do not overlap with each other over a large area, it is difficult to improve the resistance against optical damages.

With the optical wavelength conversion device as that disclosed in Japanese Laid-Open Publication No. 1-238631, which employs a ridge-shaped optical waveguide in order to improve the wavelength conversion efficiency, the wavelength conversion efficiency is improved by increasing the power density relying upon the confinement effect of the optical waveguide. However, for the fundamental wave, the direction in which the confinement effect can be increased by the ridge-shaped optical waveguide is limited to the lateral direction (the ridge width direction), and the confinement in the depth direction is not improved. Therefore, the overlap between the fundamental wave and the second harmonic wave (particularly, the increase in the overlap in the depth direction), which has the most substantial influence on the wavelength conversion efficiency, cannot be increased by such a ridge structure. Therefore, with the conventional structure, it is difficult to substantially increase the wavelength conversion efficiency.

Furthermore, the overlap between the fundamental wave and the second harmonic wave cannot sufficiently be increased for a loaded-type optical waveguide, as for the ridge structure.

With any of the conventional structures, it is possible to produce blue light of about 10 mW, but it is difficult to obtain a stable output over a long time for an output equal to or greater than 10 mW in view of the resistance against optical damages.

Another conventional optical wavelength conversion device employs a high refractive index cladding layer provided on the optical waveguide so as to realize an efficient wavelength conversion. In this conventional structure, a cladding layer having a refractive index higher than that of the optical waveguide is provided on the surface of the optical waveguide. For the cladding layer, a dielectric film having a high refractive index or a layer provided through an ion exchange process is used. With this structure, it is possible to obtain a high wavelength conversion efficiency and a desirable optical damage resistance. However, it has newly been found that the output becomes unstable over a long period of time.

An optical wavelength conversion device employing a nonlinear optical effect has been used in many different fields as it allows for an increase in the coherent light generation range through the optical wavelength conversion, e.g., second harmonic wave generation, parametric generation, sum frequency generation, difference frequency generation, and the like. Particularly, with an optical wavelength conversion device employing an optical waveguide, it is possible to realize a high power density by the light confinement effect, thereby providing advantages such as a long interaction length. These advantages allow for an efficient wavelength conversion. Thus, may optical devices have been proposed in the art as optical wavelength conversion devices employing an optical waveguide.

One major problem associated with the optical wavelength conversion device employing an optical waveguide is the possible optical damage. The optical damage as used herein refers to an optically induced change in the refractive index. More specifically, in an area where the light confinement is strong, such as along the optical waveguide, the optical power density is high, whereby the refractive index along the optical waveguide may be varied by the light propagating therethrough (optical damage). When there occurs such an optical damage, the phase matching state is varied by the change in the refractive index, thereby varying the output of the optical wavelength conversion device. This has been a problem which hinders the increase in the output of the optical waveguide-type optical wavelength conversion device. Particularly, the occurrence of the optical damages is significant when the substrate is made of a material such as $LiNbO_3$ or $LiTaO_3$, which has a large nonlinear optical constant, in which case optical damages occur for an output of several milliwatts to several ten milliwatts. In order to reduce such optical damages, it is effective to reduce the amount of impurity contained in the crystal and to reduce the propagation loss along the optical waveguide.

To address the problem of optical damages, it has been proposed in the art to dope an $LiNbO_3$ substrate with a metal element such as Zn, Mg, Sc or In so as to improve the optical damage resistance of the substrate itself. According to this method, the optical damage resistance of the crystal itself which forms the substrate can be increased by an order of magnitude by adding about 5 mol of a metal material to the substrate.

In order to improve the efficiency of the wavelength conversion from a fundamental wave to a higher harmonic wave in the case of an optical wavelength conversion device using an optical waveguide (an optical waveguide-type optical wavelength conversion device), it is necessary to increase the power density of the fundamental wave propagating through the optical waveguide, and to increase the electric field distribution overlap between the fundamental wave and the higher harmonic wave after the conversion.

As an optical wavelength conversion device using an optical waveguide, there has been proposed in the art an optical wavelength conversion device 160 using a plurality of optical waveguides as illustrated in FIG. 26. In this optical wavelength conversion device 160, two adjacent optical waveguides 151 are provided on the surface of an $LiNbO_3$ substrate through a proton exchange process so as to match the phase of a fundamental wave $P_w$ 152 which propagates through the two optical waveguides 151 and that of a higher harmonic wave $P2_w$ 153 which radiates through Cherenkov radiation. The central portion extending between the two optical waveguides 151 has not been subjected to a proton exchange process, and thus has a high nonlinear optical effect, thereby allowing for formation of a highly nonlinear optical waveguide. As a result, with the Cherenkov radiation type optical wavelength conversion device, it is possible to increase the conversion efficiency.

Moreover, Japanese Laid-Open Publication No. 3-261924 and Japanese Laid-Open Publication No. 5-188420, for example, disclose an optical wavelength conversion device which utilizes the coupling between a plurality of optical waveguides. Such a conventional structure includes a polarization inverted structure, an optical waveguide through which a fundamental wave propagates, and another optical waveguide through which a higher harmonic wave propagates, which are provided on the surface of the substrate, so that the fundamental wave and the higher harmonic wave propagate through the different optical waveguides, respectively, thereby improving the optical damage resistance and the conversion efficiency.

In connection with the conventional optical wavelength conversion device 160, it has been proposed in the art as described above to add a metal element to the substrate so as to improve the optical damage resistance of the substrate. With this method, however, it is not possible to sufficiently improve the optical damage resistance of the optical waveguide, where the optical waveguide is provided through a proton exchange process, or the like.

Moreover, the conventional optical wavelength conversion device 160 illustrated in FIG. 26 generates a higher harmonic wave which is in a radiation mode, and thus has poor focusing characteristics. Therefore, it is difficult to use such a device in an optical system, or the like, where it is necessary to focus the beam to the diffraction limit. Furthermore, the conditions under which the phase of a fundamental wave, which propagates in a guide mode, is matched with that of a higher harmonic wave, which propagates in radiation mode, hold over a wide range. Therefore, it is difficult to control the higher harmonic propagation mode, and it is difficult to select the phase matching relationship which allows for an efficient wavelength conversion.

Moreover, in the structure as those of Japanese Laid-Open Publication No. 3-261924 and Japanese Laid-Open Publication No. 5-188420, in which a fundamental wave and a higher harmonic wave propagate through different optical waveguides, respectively, there is only a small electric field distribution overlap between the fundamental wave and the higher harmonic wave, which propagates the respectively different optical waveguides. Thus, it is difficult to increase the conversion efficiency.

First, a conventional example in which an optical waveguide with an proton exchange process is employed in order to improve the operating characteristics of an optical wavelength conversion device will be described along with the problems that have been newly found in association with such a conventional example.

A conventional optical wavelength conversion device 300 will be described with reference to FIG. 1.

In FIG. 1, a stripe-shaped optical waveguide 305 is provided in the vicinity of the surface of an X-plate $LiNbO_3$ substrate 301, and a high refractive index layer 310 is provided in the vicinity of the surface of the optical waveguide 305. The LiNbO₃ substrate 301 includes a plurality of polarization inverted regions 304 which are provided periodically for phase matching. A fundamental wave 306 enters the optical waveguide 305, is converted into a second harmonic wave 307, and output from the optical waveguide 305.

FIG. 2A is a schematic diagram illustrating the conventional optical wavelength conversion device 300 in which an optical waveguide 2 is provided on a substrate 1, with a high refractive index layer 4 being provided in the vicinity of the surface of the optical waveguide 2. FIG. 2B illustrates the refractive index distribution along the depth direction of the structure illustrated in FIG. 2A. FIG. 2C illustrates the electric field distribution of the fundamental wave and the higher harmonic wave propagating through the structure illustrated in FIG. 2A along the depth direction. Specifically, the fundamental wave having a wavelength of 850 nm enters the optical waveguide 2 in a TE00 mode, and the phase of the fundamental wave is pseudo-matched with that of a TE10 mode higher harmonic wave in the optical waveguide 2.

The optical waveguide 2 is an optical waveguide formed by subjecting a proton exchange region to an annealing process. The annealing process changes the refractive index distribution pattern of the proton exchange region from a step pattern to a graded pattern and reduces the proton density. The high refractive index layer 4 has been provided through a proton exchange process but has not been subjected to an annealing process. Thus, the high refractive index layer 4 has a step distribution.

In the optical wavelength conversion device 300, the high refractive index layer 4 increases the confinement of the fundamental wave, and also increases the overlap between the fundamental wave in a fundamental mode and the higher harmonic wave in a higher mode, thereby realizing a high wavelength conversion efficiency.

However, various studies on the output characteristics of the conventional optical wavelength conversion device 300 have shown that there are various problems as follows.

First, it has been found that the phase matching wavelength varies over time. This causes the second harmonic wave output to be unstable.

The second problem is a reduced operating lifetime of the device. Specifically, it has been found that the characteristics of the optical wavelength conversion device deteriorate in a high temperature test.

Third, there is a large propagation loss through the optical waveguide.

Each of these problems will be described in detail below.

Regarding the first problem, slight variations in the phase matching state were observed as the output of second harmonic generation was increased. This problem is related to an optical damage occurring at the boundary between the high refractive index layer 4 and the optical waveguide 2. The cause of this problem will be further described in detail below.

The optical damage as known in the prior art is a phenomenon in which the phase matching state is destroyed across the entire optical waveguide, thereby reducing the output of the second harmonic wave. The problem that has been newly found by the present inventors is a phenomenon in which the phase matching wavelength shifts while retaining the phase matching curve. Thus, although the wavelength conversion efficiency is not reduced, the phase matching wavelength varies, whereby the second harmonic wave output gradually decreases if the wavelength of the fundamental wave is fixed. Therefore, a stable output cannot be obtained unless the phase matching wavelength is always set to an optimal value. When the phase matching wavelength varies, the second harmonic wave output becomes unstable because the phase matching wavelength tolerance of the optical wavelength conversion device is as narrow as 0.1 nm or less.

The second problem was found during a life test of the optical wavelength conversion device. Specifically, phenomena such as substantial variations in the phase matching wavelength of the optical wavelength conversion device or deterioration of the wavelength conversion efficiency were observed during a high temperature test at 80° C. for several tens of hours. The possible cause of these phenomena was studied. As a result, it has been found that the high refractive index layer 4 is altered during a high temperature test. The high refractive index layer 4 is a proton layer which is not subjected to an annealing process, and has a high proton concentration and a step-shaped proton concentration distribution pattern. Thus, the proton concentration is high and substantially different from that in the surrounding regions, thereby resulting in a large thermal diffusion constant. Moreover, it has been found that the thermal diffusion of the proton exchange region of the high refractive index layer 4 has a substantial influence on the characteristics of the optical waveguide 2, whereby the characteristics of the optical wavelength conversion device deteriorate due to the alteration of the proton exchange region of the high refractive index layer 4 during a high temperature test.

The third problem is primarily related to the first proton exchange region. In an optical waveguide structure with the high refractive index layer 4 being provided on the surface thereof, the light confinement is increased, whereby the propagation loss along the optical waveguide 2 is likely to increase. Moreover, the propagation loss along the optical waveguide 2 influences the characteristics of the first proton exchange region which has the greatest electric field in the electric field distribution. A study conducted by the present inventors has shown that there is a close relationship between the proton concentration of the first proton exchange region and the propagation loss along the optical waveguide.

SUMMARY OF THE INVENTION

According to one aspect of this invention, an optical waveguide includes: a nonlinear optical crystal; a first ion exchange region provided in the vicinity of a portion of a surface of the nonlinear optical crystal; and a second ion exchange region provided in the surface of the nonlinear optical crystal. The second ion exchange region covers a greater area of the surface than an area covered by the first ion exchange region. The second ion exchange region includes a region having an extent of 0.02 $\mu$m to 0.2 $\mu$m along a depth direction in which an ion exchange ratio varies along the depth direction.

In one embodiment of the invention, the second ion exchange region includes a region having an extent of 0.02 $\mu$m to 0.2 $\mu$m along a depth direction in which an amount of change in an ion exchange ratio is 5 $\mu$m$^{-1}$ to 50 $\mu$m$^{-1}$.

In one embodiment of the invention, the first ion exchange region has an amount of change in ion exchange ratio which is less than or equal to 0.06 $\mu$m$^{-1}$.

In one embodiment of the invention, the second ion exchange region includes a region having an extent of 0.03

μm to 0.1 μm along a depth direction in which an ion exchange ratio varies along the depth direction.

In one embodiment of the invention, the second ion exchange region has an amount of change in ion exchange ratio of 10 μm$^{-1}$ to 30 μm$^{-1}$.

In one embodiment of the invention, the first ion exchange region has a nonlinear optical constant which is equal to or greater than 90% of that of the crystal, and the second ion exchange region has a nonlinear optical constant which is less than or equal to 60% of that of the crystal.

In one embodiment of the invention, the first ion exchange region has a change of surface refractive index Δn which is less than or equal to 0.02 for light having a wavelength of 633 nm, and the second ion exchange region has a change of surface refractive index Δn which is equal to or greater than 0.11 for light having a wavelength of 633 nm.

In one embodiment of the invention, the optical waveguide is provided through an ion exchange process in the surface of the nonlinear optical crystal, the nonlinear optical crystal being made of LiNb$_x$Ta$_{1-x}$O$_3$ (0≦x≦1), and a molarity percentage of Li in the optical waveguide is equal to or greater than 40 mol %.

In one embodiment of the invention, the optical waveguide is provided through an ion exchange process in the surface of the nonlinear optical crystal, the nonlinear optical crystal being made of LiNb$_x$Ta$_{1-x}$O$_3$ (0≦x≦1) and doped with a metal element in the vicinity of the surface, and a molarity percentage Y of Li and a molarity Z of the metal element in the optical waveguide have a relationship of Y+Z≧45 mol %.

According to another aspect of this invention, an optical waveguide includes: a nonlinear optical crystal; a first ion exchange region provided in the vicinity of a portion of a surface of the nonlinear optical crystal: and a second ion exchange region provided in the surface of the nonlinear optical crystal. The second ion exchange region covers a greater area of the surface than an area covered by the first ion exchange region. The second ion exchange region has a refractive index higher than that of the first ion exchange region, and the second ion exchange region has a refractive index distribution which is in a step-like graded pattern.

In one embodiment of the invention, the first ion exchange region and the second ion exchange region have different graded patterns obtained by annealing processes at different temperatures, respectively.

In one embodiment of the invention, a depth of the first ion exchange region is expanded by an annealing process to be equal to or greater than 8 times that before the annealing process.

In one embodiment of the invention, a depth of the second ion exchange region is expanded by an annealing process to be equal to or greater than 1.2 times that before the annealing process.

In one embodiment of the invention, a depth of the second ion exchange region is expanded by an annealing process to be equal to or greater than 2 times that before the annealing process.

In one embodiment of the invention, a surface refractive index of the second ion exchange region is substantially equal to that before an annealing process.

In one embodiment of the invention, the step-like graded pattern of the refractive index distribution of the second ion exchange region is provided by an annealing process which satisfies the relationship represented by Expressions 1 and 2 below:

$$C(k,t)=CO \times 0.5 \times \{Erf[(h+k)/2/\sqrt{Dp \times t}]+Erf[(h-k)/2/\sqrt{Dp \times t}]\}$$ Expression 1

(where C(k,t) is an ion exchange concentration, k is a depth (μm), t is an annealing time (hour), CO is an initial ion exchange concentration, Erf[ ] is an error function, h is an initial ion exchange depth (μm), and Dp is an ion diffusion constant by an annealing process (μm$^2$/hour)); and $$1.5 < (h+k)/2/\sqrt{Dp \times t} < 20.$$ Expression 2

In one embodiment of the invention, the nonlinear optical crystal is an LiNb$_x$Ta$_{1-x}$O$_3$ (0≦x≦1) crystal.

In one embodiment of the invention, each of an ion exchange process for providing the first ion exchange region and an ion exchange process for providing the second ion exchange region is a proton exchange process.

In one embodiment of the invention, the optical waveguide is provided through an ion exchange process in the surface of the nonlinear optical crystal, the nonlinear optical crystal being made of LiNb$_x$Ta$_{1-x}$O$_3$ (0≦x≦1), and a molarity percentage of Li in the optical waveguide is equal to or greater than 40 mol %.

In one embodiment of the invention, the optical waveguide is provided through an ion exchange process in the surface of the nonlinear optical crystal, the nonlinear optical crystal being made of LiNb$_x$Ta$_{1-x}$O$_3$ (0≦x≦1) and doped with a metal element in the vicinity of the surface, and a molarity percentage Y of Li and a molarity Z of the metal element in the optical waveguide have a relationship of Y+Z≧45 mol %.

According to still another aspect of this invention, an optical waveguide includes: a nonlinear optical crystal; a first ion exchange region provided in the vicinity of a portion of a surface of the nonlinear optical crystal; and a second ion exchange region provided in the surface of the nonlinear optical crystal. The second ion exchange region covers a greater area of the surface than an area covered by the first ion exchange region. The second ion exchange region has an ion concentration higher than that of the first ion exchange region, and the second ion exchange region has an ion concentration distribution which is in a step-like graded pattern.

In one embodiment of the invention, the first ion exchange region and the second ion exchange region have different graded patterns obtained by annealing processes at different temperatures, respectively.

In one embodiment of the invention, a depth of the first ion exchange region is expanded by an annealing process to be equal to or greater than 8 times that before the annealing process.

In one embodiment of the invention, a depth of the second ion exchange region is expanded by an annealing process to be equal to or greater than 1.2 times that before the annealing process.

In one embodiment of the invention, a depth of the second ion exchange region is expanded by an annealing process to be equal to or greater than 2 times that before the annealing process.

In one embodiment of the invention, a surface ion concentration of the second ion exchange region is substantially equal to that before an annealing process.

In one embodiment of the invention, the step-like graded pattern of the ion concentration distribution of the second ion exchange region is provided by an annealing process which satisfies the relationship represented by Expressions 1 and 2 below:

$$C(k,t)=CO \times 0.5 \times \{Erf[(h+k)/2/\sqrt{Dp \times t}]+Erf[(h-k)/2/\sqrt{Dp \times t}]\}$$ Expression 1

(where C(k,t) is an ion exchange concentration, k is a depth ($\mu$m), t is an annealing time (hour), CO is an initial ion exchange concentration, Erf[ ] is an error function, h is an initial ion exchange depth ($\mu$m), and Dp is an ion diffusion constant by an annealing process ($\mu$m$^2$/hour)); and $$1.5 < (h+k)/2/\sqrt{Dp \times t} < 20 \quad \text{Expression 2}$$

In one embodiment of the invention, the nonlinear optical crystal is an LiNb$_x$Ta$_{1-x}$O$_3$ ($0 \leq x \leq 1$) crystal.

In one embodiment of the invention, each of an ion exchange process for providing the first ion exchange region and an ion exchange process for providing the second ion exchange region is a proton exchange process.

In one embodiment of the invention, the optical waveguide is provided through an ion exchange process in the surface of the nonlinear optical crystal, the nonlinear optical crystal being made of LiNb$_x$Ta$_{1-x}$O$_3$ ($0 \leq x \leq 1$), and a molarity percentage of Li in the optical waveguide is equal to or greater than 40 mol %.

In one embodiment of the invention, the optical waveguide is provided through an ion exchange process in the surface of the nonlinear optical crystal, the nonlinear optical crystal being made of LiNb$_x$Ta$_{1-x}$O$_3$ ($0 \leq x \leq 1$) and doped with a metal element in the vicinity of the surface, and a molarity percentage Y of Li and a molarity Z of the metal element in the optical waveguide have a relationship of $Y+Z \geq 45$ mol %.

According to still another aspect of this invention, an optical wavelength conversion device includes: an optical waveguide of the present invention; and a periodic polarization inverted structure. The optical waveguide allows for propagation of a fundamental wave having a wavelength of $\lambda$ and a second harmonic wave having a wavelength of $\lambda/2$ therethrough. A refractive index and a depth of the second ion exchange region included in the optical waveguide satisfy a waveguide condition for the second harmonic wave while satisfying a cut-off condition for the fundamental wave.

In one embodiment of the invention, a phase of a fundamental wave in a fundamental mode and a phase of a second harmonic wave in a higher mode are matched with each other in the optical waveguide.

According to still another aspect of this invention, there is provided an optical wavelength conversion device includes: an optical waveguide of the present invention; and a periodic polarization inverted structure. The optical waveguide allows for propagation of a fundamental wave having a wavelength of $\lambda$ and a second harmonic wave having a wavelength of $\lambda/2$ therethrough. A refractive index and a depth of the second ion exchange region included in the optical waveguide satisfy a waveguide condition for the second harmonic wave while satisfying a cut-off condition for the fundamental wave.

In one embodiment of the invention, a phase of a fundamental wave in a fundamental mode and a phase of a second harmonic wave in a higher mode are matched with each other in the optical waveguide.

According to still another aspect of this invention, an optical wavelength conversion device includes: an optical waveguide of the present invention; and a periodic polarization inverted structure. The optical waveguide allows for propagation of a fundamental wave having a wavelength of $\lambda$ and a second harmonic wave having a wavelength of $\lambda/2$ therethrough. A refractive index and a depth of the second ion exchange region included in the optical waveguide satisfy a waveguide condition for the second harmonic wave while satisfying a cut-off condition for the fundamental wave.

In one embodiment of the invention, a phase of a fundamental wave in a fundamental mode and a phase of a second harmonic wave in a higher mode are matched with each other in the optical waveguide.

According to still another aspect of this invention, there is provided an optical wavelength conversion device, including a optical waveguide group including a plurality of optical waveguides adjacent to one another on a surface of a nonlinear optical crystal, the optical wavelength conversion device being provided for converting in the optical waveguide group an input fundamental wave into light having a different wavelength. The fundamental wave propagates through the optical waveguide group in a single mode, while the converted light propagates through at least one of the optical waveguides of the optical waveguide group in a guide mode, or the converted light propagates through the optical waveguide group in a single mode, while the fundamental wave propagates through at least one of the optical waveguides of the optical waveguide group.

In one embodiment of the invention, the optical waveguide group includes a plurality of optical waveguides having different propagation directions.

In one embodiment of the invention, at least one of the optical waveguides satisfies a cut-off condition for either one of the fundamental wave or the converted light, while satisfying a waveguide condition for the other one of the fundamental wave and the converted light.

In one embodiment of the invention, at least one of the optical waveguides has a propagation constant which is different from those of the other optical waveguides.

In one embodiment of the invention, the optical waveguide group satisfies a single mode propagation condition for either one of the fundamental wave or the converted light, and a phase of the one of the fundamental wave and the converted light is matched with a phase of the other one of the fundamental wave and the converted light, which propagates through at least one of the optical waveguides.

In one embodiment of the invention, the optical waveguide group includes an odd number of optical waveguides and has a symmetric arrangement with respect to a center optical waveguide.

In one embodiment of the invention, the optical waveguide group includes three optical waveguides having a substantially equal propagation direction. A center optical waveguide has a propagation constant which is different from that of the side optical waveguides. A phase of either one of the fundamental wave and the converted light propagating through the optical waveguide group in a single mode is matched with a phase of the other one of the fundamental wave and the converted light propagating through a center optical waveguide of the optical waveguide group.

In one embodiment of the invention, the number of optical waveguides of the optical waveguide group is varied in the vicinity of either an input section and an output section.

According to still another aspect of this invention, there is provided an optical wavelength conversion device, including an optical waveguide which is provided through an ion exchange process in a surface of a crystal of LiNb$_x$Ta$_{1-x}$O$_3$ ($0 \leq x \leq 1$), wherein a molarity percentage of Li in the optical waveguide is equal to or greater than 40 mol %.

According to still another aspect of this invention, there is provided an optical wavelength conversion device, including an optical waveguide which is provided through an ion exchange process in a surface of a crystal, the crystal being made of LiNb$_x$Ta$_{1-x}$O$_3$ ($0 \leq x \leq 1$) and doped with a metal element in the vicinity of the surface, and a molarity percentage Y of Li and a molarity Z of the metal element in the optical waveguide have a relationship of $Y+Z \geq 45$ mol %.

In one embodiment of the invention, the metal element is one of Mg, Zn, Sc and In, or a mixture of two or more of Mg, Zn, Sc and In.

According to still another aspect of this invention, there is provided a short wavelength light generation apparatus, including: a semiconductor laser device; and an optical wavelength conversion device of the present invention. A wavelength of light emitted from the semiconductor laser device is converted by the optical wavelength conversion device to a predetermined higher harmonic wave.

In one embodiment of the invention, a guide mode of the higher harmonic wave obtained by the conversion by the optical wavelength conversion device is a higher mode. An intensity distribution of the higher mode of the higher harmonic wave has a plurality of peaks, including a main peak having the maximum intensity and one or more sub peaks. A width of at least one of the one or more sub peaks is smaller than a diffraction limit for the higher harmonic wave.

In one embodiment of the invention, the higher mode of the higher harmonic wave is a first mode.

In one embodiment of the invention, the higher mode of the higher harmonic wave is TE10 mode.

According to still another aspect of this invention, there is provided an optical information processing apparatus, including: a short wavelength light generation apparatus of the present invention; and a focusing optical system. Light having a short wavelength emitted from the short wavelength light generation apparatus is focused by the focusing optical system.

According to still another aspect of this invention, there is provided a method for producing an optical wavelength conversion device, including the steps of: providing a periodic polarization inverted structure in a nonlinear optical crystal; providing a first ion exchange region in the polarization inverted structure; performing a first annealing process for the first ion exchange region; providing a second ion exchange region in a surface of the first ion exchange region; and performing a second annealing process for the second ion exchange region. A first annealing temperature for the first annealing process and a second annealing temperature for the second annealing process are different from each other.

In one embodiment of the invention, the first annealing temperature is equal to or greater than 300° C., and the second annealing temperature is less than or equal to 250° C.

In one embodiment of the invention, the step of providing the polarization inverted structure includes a step of subjecting the provided polarization inverted structure to a heat treatment at a temperature equal to or greater than 400° C.

In one embodiment of the invention, the second annealing temperature is in a range of 130° C. to 200° C.

In one embodiment of the invention, the second annealing process satisfies the relationship represented by Expressions 1 and 2 below:

$$C(k,t) = CO \times 0.5 \times \{Erf[(h+k)/2/\sqrt{Dp \times t}] + Erf[(h-k)/2/\sqrt{Dp \times t}]\} \quad \text{Expression 1}$$

(where C(k,t) is an ion exchange concentration, k is a depth ($\mu$m), t is an annealing time (hour), CO is an initial ion exchange concentration, Erf[ ] is an error function, h is an initial ion exchange depth ($\mu$m), and Dp is an ion diffusion constant by an annealing process ($\mu$m$^2$/hour)); and $$1.5 < (h+k)/2/\sqrt{Dp \times t} < 20, \quad \text{Expression 2}$$

and wherein a refractive index distribution of the provided second ion exchange region has a step-like graded pattern.

In one embodiment of the invention, the nonlinear optical crystal is an LiNb$_x$Ta$_{1-x}$O$_3$ ($0 \leq x \leq 1$) crystal.

In one embodiment of the invention, each of an ion exchange process for providing the first ion exchange region and an ion exchange process for providing the second ion exchange region is a proton exchange process.

According to still another aspect of this invention, there is provided a coherent light generation apparatus, including: an optical wavelength conversion device of the present invention; and a semiconductor laser device. A wavelength of light from the semiconductor laser device is converted by the optical wavelength conversion device.

According to still another aspect of this invention, there is provided an optical system including: a coherent light generation apparatus of the present invention; and a focusing optical system. Light output from the optical wavelength conversion device is focused by the focusing optical system.

The functions of the present invention will now be described.

The present invention provides an optical wavelength conversion device for converting, based on the nonlinear optical effect, the wavelength of a fundamental wave propagating through an optical waveguide into a higher harmonic wave, a parametric wave, a sum frequency wave, a difference frequency wave, and the like. In order to improve the optical damage resistance, the efficiency of the wavelength conversion, and the beam characteristics of the emitted light, the present invention employs a special structure different from those in the prior art for the optical waveguide which is used in the optical wavelength conversion device.

According to Embodiments 7 and 8 of the present invention to be described later, a group of optical waveguides adjacent to one another is provided on the surface of a nonlinear optical crystal. The wavelength conversion from a fundamental wave to a higher harmonic wave, a parametric wave, a sum frequency wave, a difference frequency wave, and the like, is realized by using the optical waveguide group. With such a structure, the phase matching state is controlled so that the optical waveguide group can provide different propagations for the fundamental wave and for the converted light, respectively. For example, as shown in Embodiment 7 to be described below, a fundamental wave can be propagated through the optical waveguide group in a single mode, while a higher harmonic wave or a sum frequency wave is propagated through the optical waveguide in a guide mode. Alternatively, as shown in Embodiment 8 to be described below, a fundamental wave can be propagated through the optical waveguide in a single mode, while a parametric wave or a difference frequency wave is propagated through the optical waveguide group in a single mode. By such an optical waveguide structure, it is possible to reduce the area across which proton exchange, metal diffusion, or the like, occurs, and thus to reduce the damaged area along the optical waveguide surface, thereby significantly reducing the absorption scatterIng along the optical waveguide. Thus, according to the present invention, it is possible to significantly reduce the optical damage which would otherwise occur due to absorption of light having a short wavelength among the fundamental wave and the converted light. Moreover, it is possible to increase the electric field distribution overlap between the fundamental wave propagating through the optical waveguide and the converted light, thereby increasing the efficiency of the wavelength conversion by controlling the propagation mode of one of the fundamental wave or the converted light by the waveguide while controlling the propagation mode of the other by the optical waveguide group. Furthermore, by appropriately selecting the propagation state of the converted light, it is possible to control the aspect ratio of the guide mode and to realize an emission having desirable focusing characteristics.

When the optical waveguide group is formed by a plurality of optical waveguides having different propagation directions, it is possible to provide a distribution in the propagation constant of the optical waveguide group, thereby increasing the tolerance of the optical wavelength conversion device. Moreover, it is possible to produce a tapered waveguide (a waveguide is tapered in either direction along the propagation direction).

When the converted light has a wavelength which is shorter than that of the fundamental wave (e.g., a higher harmonic wave or a sum frequency wave), the width of the optical waveguide can be set so as to satisfy the cut-off condition with respect to the fundamental wave, whereby it is possible to provide a propagation in a single mode through the optical waveguide group as a single waveguide. While the cut-off condition can be defined by the width and the thickness of the waveguide, it is herein defined by the width of the waveguide. Then, the optical waveguide can be set so as to satisfy the waveguide condition for the light having a wavelength obtained by converting the fundamental wave. Thus, as compared to a conventional optical wavelength conversion device with which a higher harmonic wave is guided in a radiation mode, it is possible to easily control the propagation mode of the converted light and to control the phase matching between the fundamental wave and the converted light. When the wavelength of the converted light is longer than that of the fundamental wave (e.g., a parametric wave or a difference frequency wave), the fundamental wave can propagate through any waveguide while the converted light can propagate in a single mode through the optical waveguide group. In such a case, it is possible to easily control the propagation mode of the fundamental wave and to control the phase matching between the fundamental wave and the converted light.

When the converted light has a wavelength which is shorter than that of the fundamental wave (e.g., a higher harmonic wave or a sum frequency wave), the propagation constant of at least one of the optical waveguides can be set to a value different from the propagation constants of the other optical waveguides, whereby the light having the wavelength obtained by converting that of the fundamental wave selectively propagates through that optical waveguide, thereby allowing for improvement of the conversion efficiency and/or stabilization of the output light. Herein, the propagation constant is defined by the width of the optical waveguide. When the wavelength of the converted light is longer than that of the fundamental wave (e.g., a parametric wave or a difference frequency wave), the fundamental wave selectively propagates through the optical waveguide, thereby allowing for improvement of the conversion efficiency and/or stabilization of the output light. In contrast, with a conventional optical waveguide, the same effect is not provided when the wavelength of the converted light is longer than that of the fundamental wave (e.g., a parametric wave or a difference frequency wave). Specifically, if the optical waveguide is designed in accordance with the propagation condition of the converted light, the optical waveguide will be a multiple mode optical waveguide for the fundamental wave, thereby significantly reducing the conversion efficiency.

When the optical waveguide group is asymmetrical along the left-right direction, the beam shape of the emitted light will also be asymmetrical, thereby deteriorating the focusing characteristics. Therefore, it is preferred to provide a structure in which the group of optical waveguides are arranged symmetrically about the center optical waveguide. It is preferred that the number of the optical waveguides is an odd number, so that the center of the power density is localized along the center optical waveguide both for the fundamental wave and the converted light, thereby increasing the overlap between the fundamental wave and the converted light and thus obtaining a high conversion efficiency. For example, when the converted light has a wavelength which is shorter than that of the fundamental wave (e. g., a higher harmonic wave or a sum frequency wave), the optical waveguide group may formed by three optical waveguides having substantially the same propagation direction, with the propagation constant of the center optical waveguide being different from those of the side optical waveguides, whereby phase matching is achieved between the fundamental wave which propagates through the optical waveguide group in a single mode and the converted light which propagates through the center optical waveguide. When the wavelength of the converted light is longer than that of the fundamental wave (e.g., a parametric wave or a difference frequency wave), the optical waveguide group may be formed such that phase matching is achieved between the converted light which propagates through a single mode and the fundamental wave which propagates through the center optical waveguide. It is expected that as the number of optical waveguides provided is increased, the overall size of the optical waveguide group increases, thereby reducing the power density and thus the conversion efficiency. Therefore, the optical waveguide group preferably includes three optical waveguides, i.e., as few optical waveguides as possible with which a symmetrical structure can be obtained.

Moreover, it is possible to adjust the beam shape and/or to improve the coupling efficiency by increasing or decreasing the number of optical waveguides in at least one of an area near the input side of the optical waveguide group and an area near the output side of the optical waveguide group.

It has been reported in the prior art that the optical damage resistance may be improved in the proton exchange layer by providing a proton exchange layer on an $LiNbO_3$ substrate or an $LiTaO_3$ substrate. However, a study conducted by the present inventors has shown that the optical damage resistance of an $LiNbO_3$ substrate subjected to a proton exchange process is not sufficient. For example, while an $LiNbO_3$ substrate with a proton exchange process exhibits an optical damage resistance which is greater than that of an $LiNbO_3$ substrate without a proton exchange process by about an order of magnitude, the $LiNbO_3$ substrate with a proton exchange process exhibits an optical damage resistance which is lower than that of an Mg-doped $LiNbO_3$ substrate without a proton exchange process by a factor of 1 to 10. This is believed to be because the optical damage resistance which has been increased by the doping material is reduced by a proton exchange process. Thus, the present inventors have directed attention to the relationship between the optical damage resistance and the Li concentration in the proton exchange layer. As shown in Embodiment 9 to be described below, an optical waveguide is provided through a proton exchange process on the surface of an $LiNb_xTa_{1-x}O_3$ ($0 \leq x \leq 1$) substrate, while setting the molarity percentage of Li to 40 mol % or more. Alternatively, an optical waveguide is provided through a proton exchange process on the surface of an $LiNb_xTa_{1-x}O_3$ ($0 \leq x \leq 1$) substrate with a metal element such as Mg, Zn, Sc or In being added to at least near the surface of the substrate, while setting the molarity percentage Y of Li and the molarity Z of the metal element so as to satisfy the relationship Y+Z≧45 mol %. Thus, it is possible to reduce the crystal defect of the proton exchange layer and to improve the optical damage resistance of the optical waveguide.

The coherent light generation apparatus of the present invention uses the optical wavelength conversion device of the present invention which has a desirable optical damage resistance, thereby realizing a high output and stable output characteristics.

Moreover, the optical system of the present invention uses the coherent light generation apparatus of the present invention having reduced small output variations and a high output, whereby it is possible to reduce noise.

Thus, the invention described herein makes possible the advantages of (1) providing an optical waveguide which has a desirable optical damage resistance and is capable of outputting a stable second harmonic wave over a long period of time, thereby realizing an optical wavelength conversion device with a large overlap between the fundamental wave and the higher harmonic wave; (2) providing an optical wavelength conversion device using such an optical waveguide; (3) providing a short wavelength light generation apparatus and an optical information processing apparatus using such an optical wavelength conversion device; (4) providing a method for producing the same; (5) providing an optical wavelength conversion device, a coherent light generation apparatus, and an optical system having a desirable optical damage resistance; and (6) providing an optical waveguide-type optical wavelength conversion device, a coherent light generation apparatus, and an optical system capable of performing an efficient wavelength conversion from a fundamental wave into a parametric wave, a sum frequency wave, a difference frequency wave, and the like, and generating wavelength-converted light having desirable focusing characteristics by improving the beam characteristics thereof.

These and other advantages of the present invention will become apparent to those skilled in the art upon reading and understanding the following detailed description with reference to the accompanying figures.

BRIEF DESCRIPTION OF THE DRAWINGS

FIG. 1 is a perspective view illustrating a structure of a conventional optical wavelength conversion device;

FIG. 3A is a cross-sectional view illustrating a structure of a proton exchange optical waveguide (optical waveguide) according to Embodiment 1 of the present invention;

FIG. 3B illustrates a refractive index distribution along the depth direction of the structure shown in FIG. 3A;

FIG. 4 illustrates an annealing temperature dependency of a proton diffusion constant in an annealing process;

FIG. 7A illustrates a proton exchange ratio distribution in a waveguide including first and second proton exchange layers;

FIG. 7B is an enlarged view illustrating a proton exchange ratio distribution in the first proton exchange layer;

FIG. 7C is an enlarged view illustrating a proton exchange ratio distribution in the second proton exchange layer;

Figure 9A:
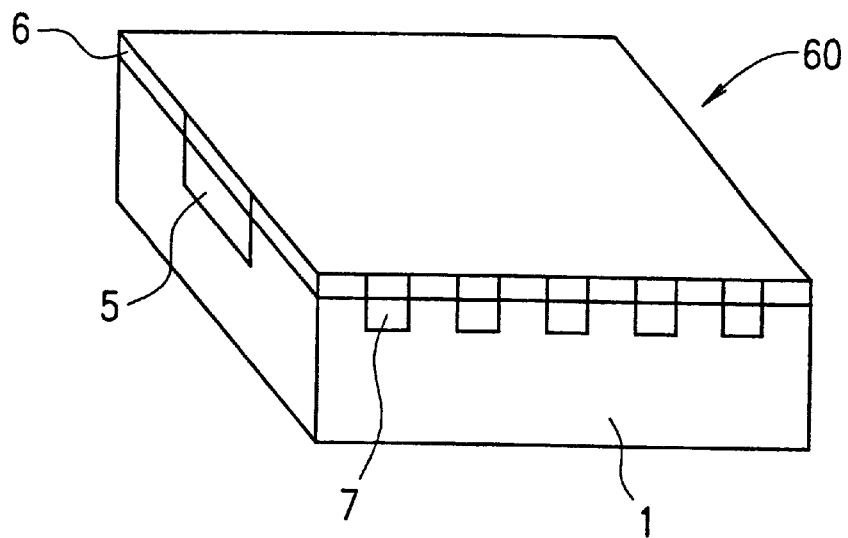
Figure 9B:
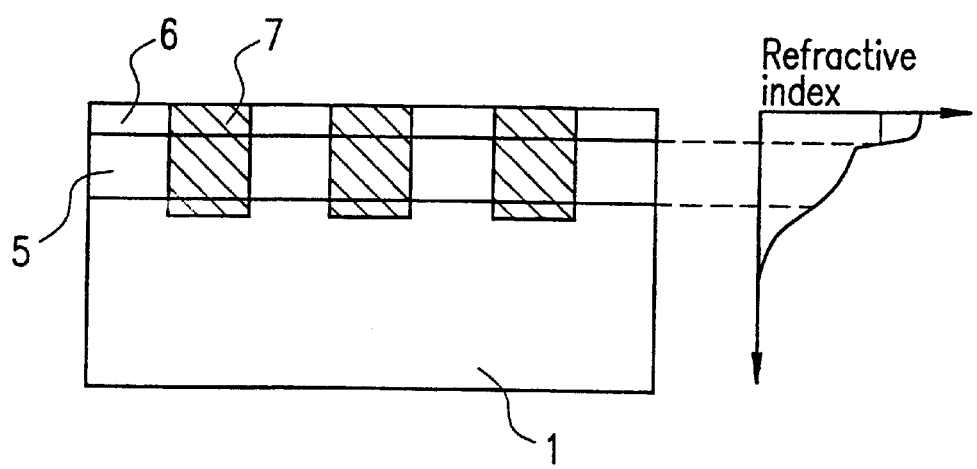
Figure 10:
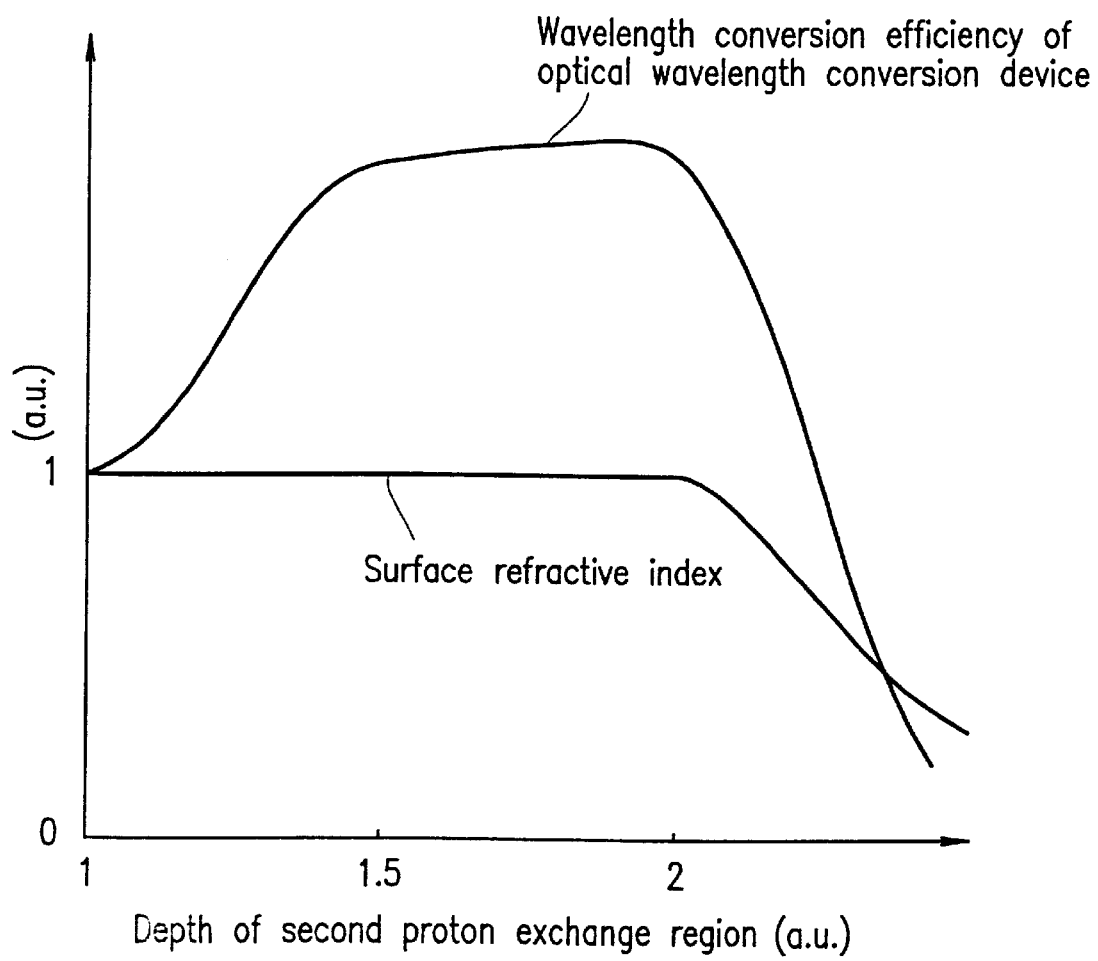
Figure 11:
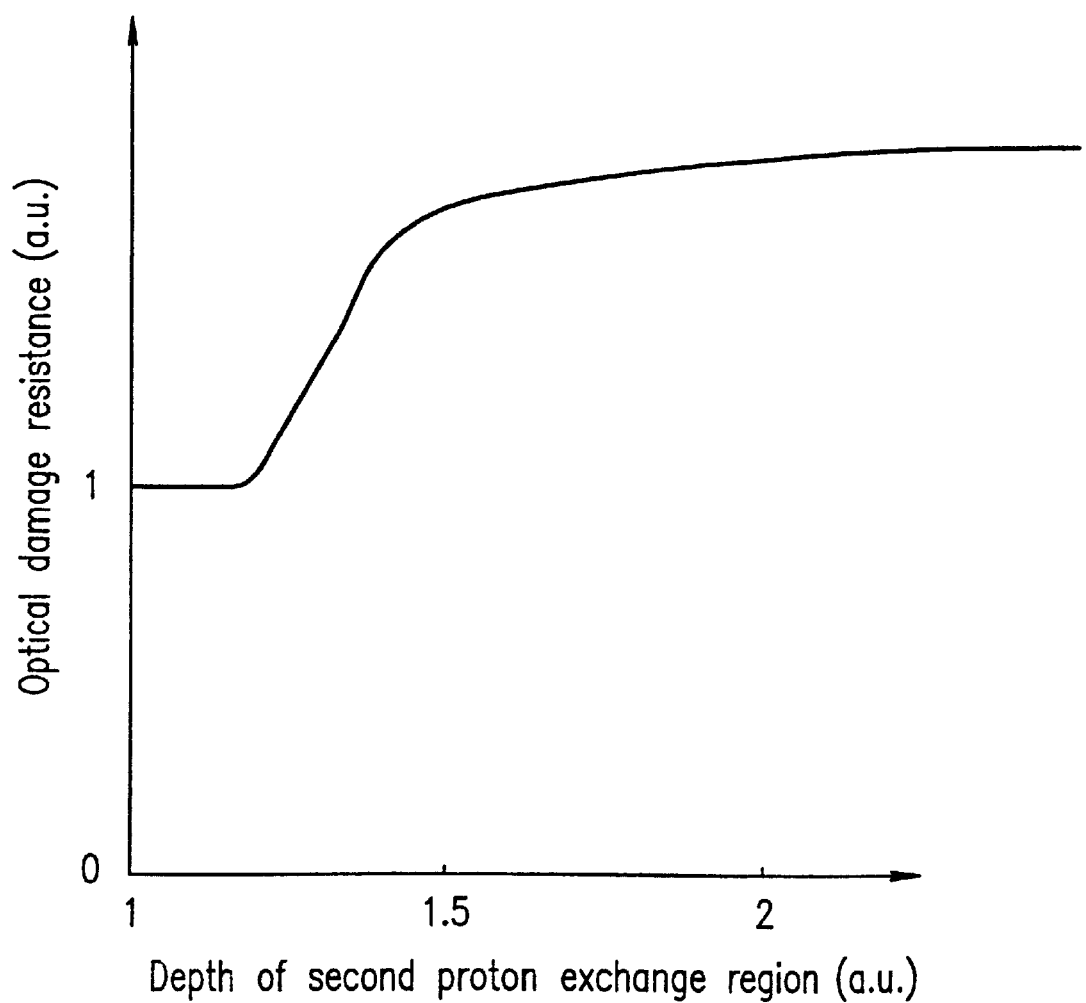
Figure 12:
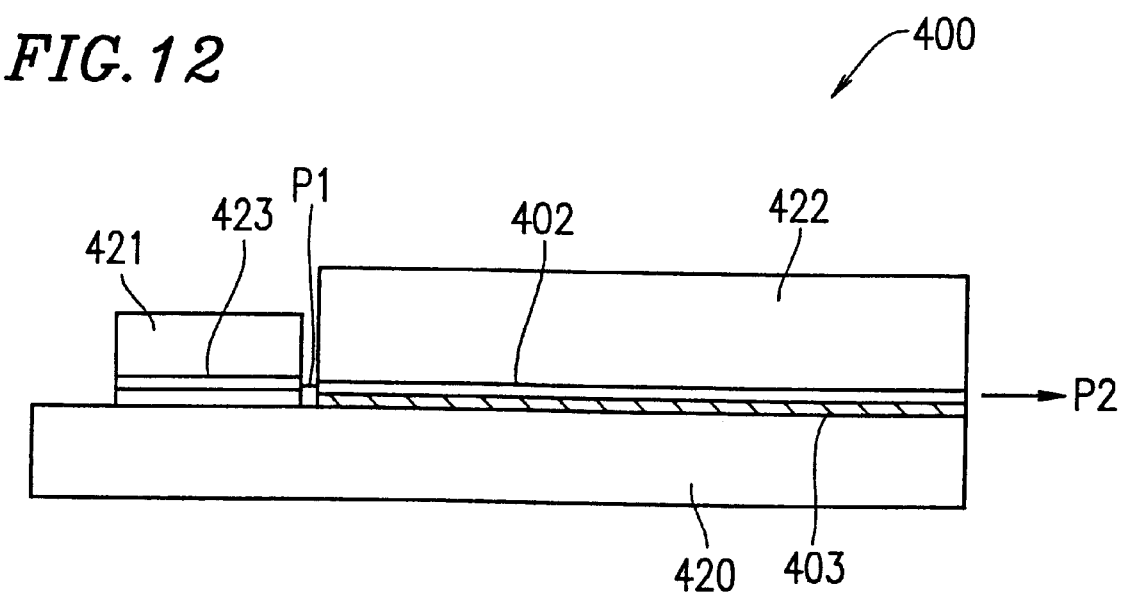
Figure 13:
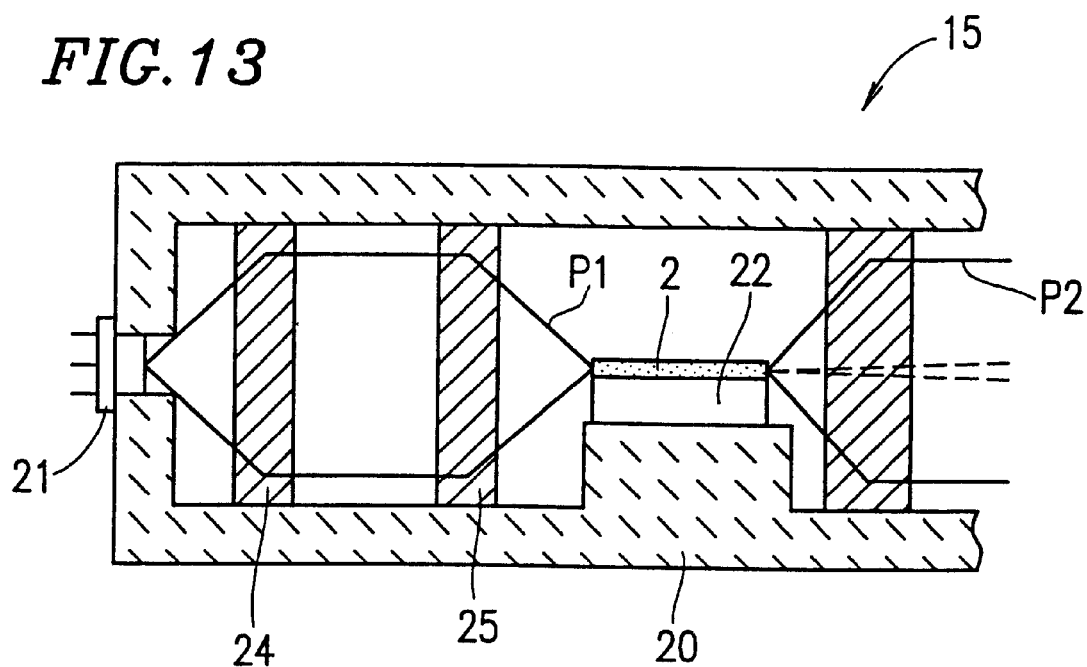
Figure 14:
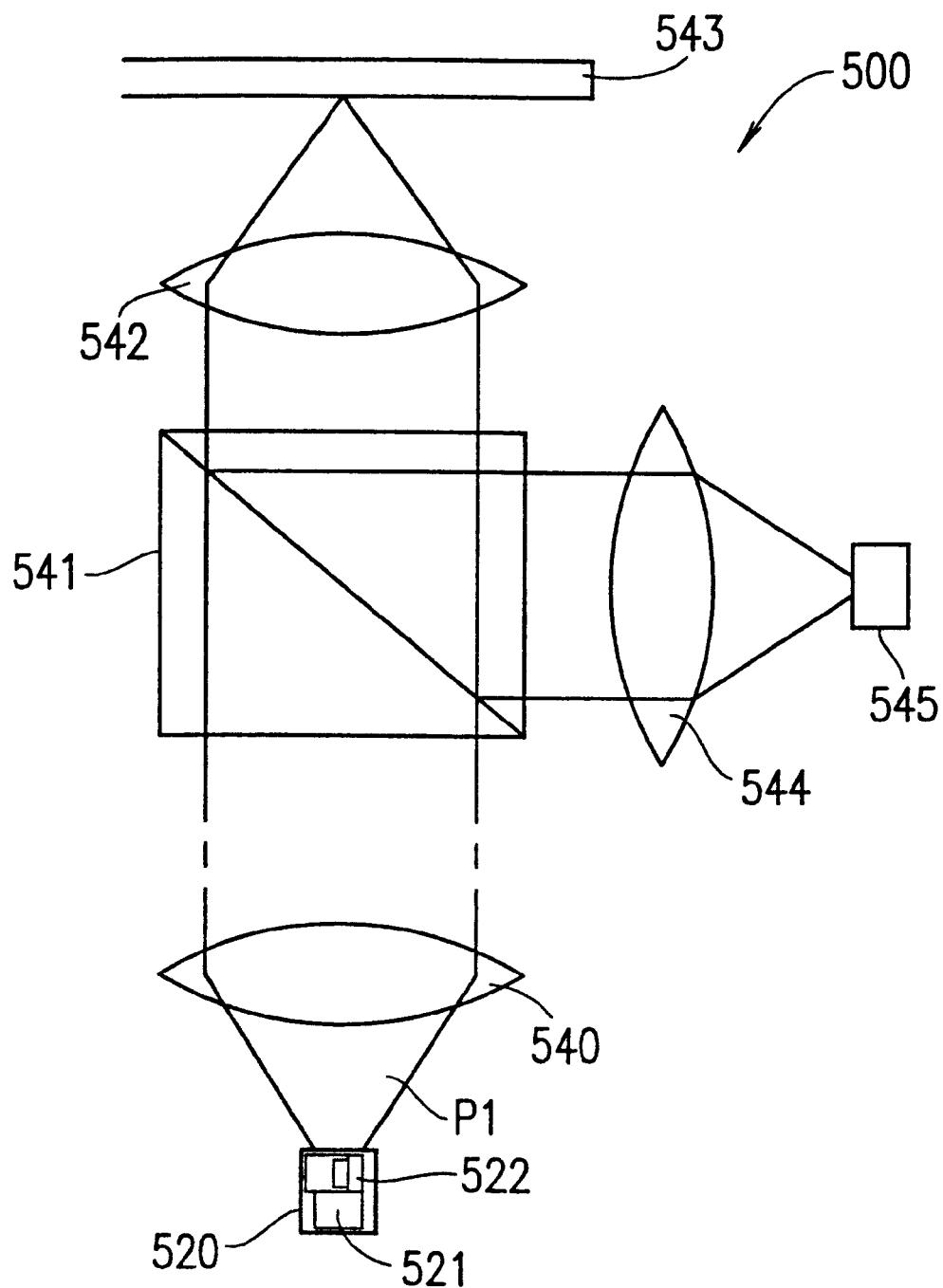
Figure 15:
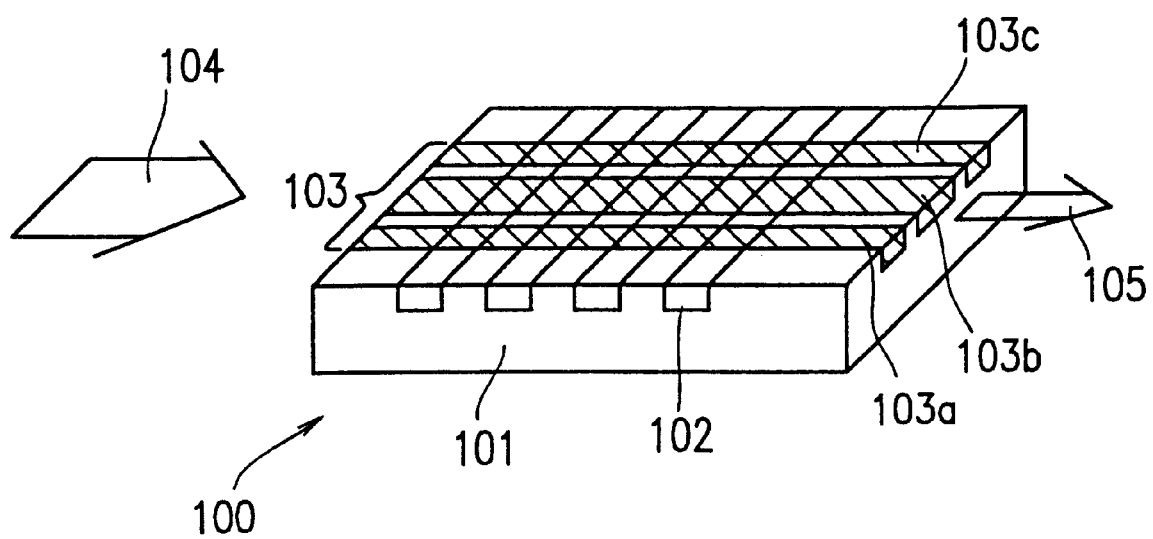
Figure 16A:
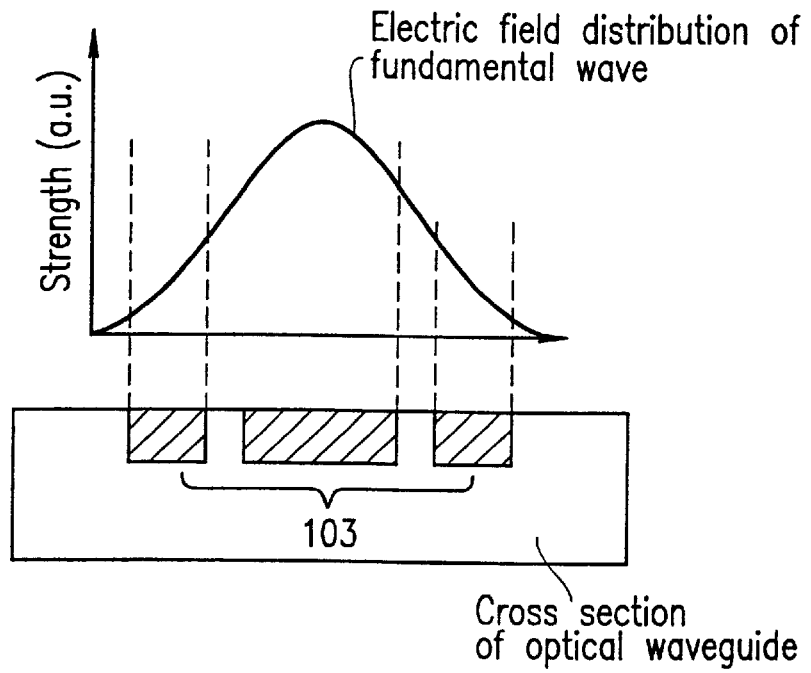
Figure 16B:
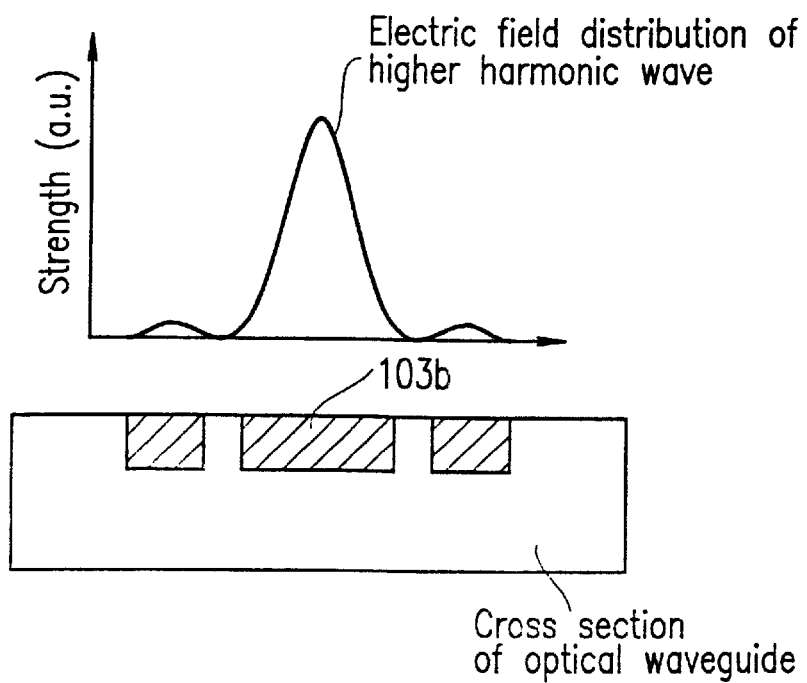
Figure 17:
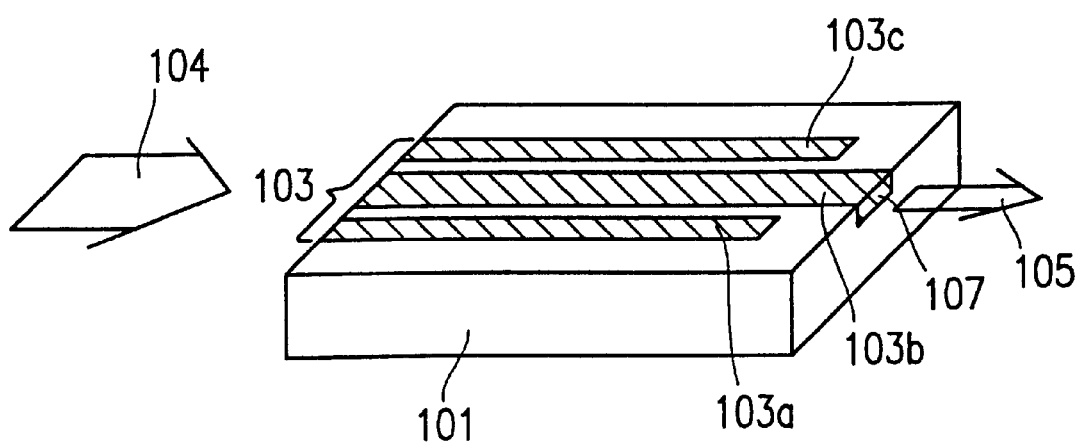
Figure 18A:
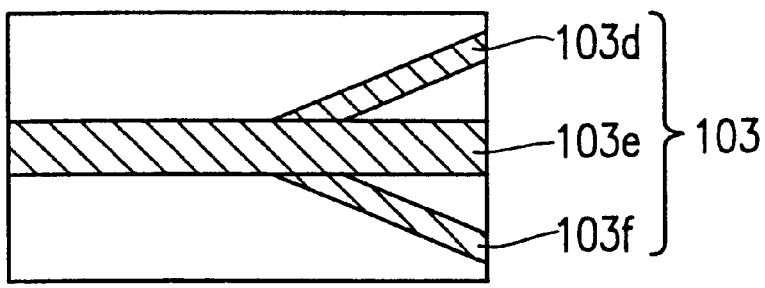
Figure 18B:
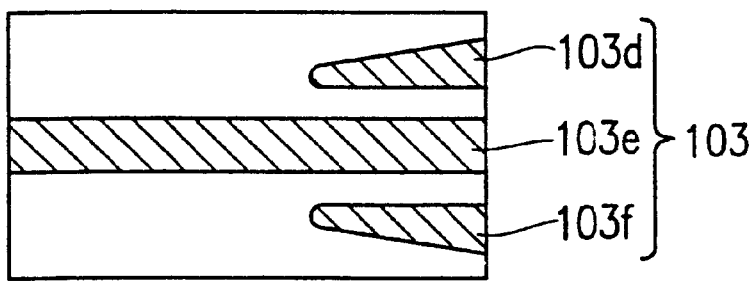
Figure 19:
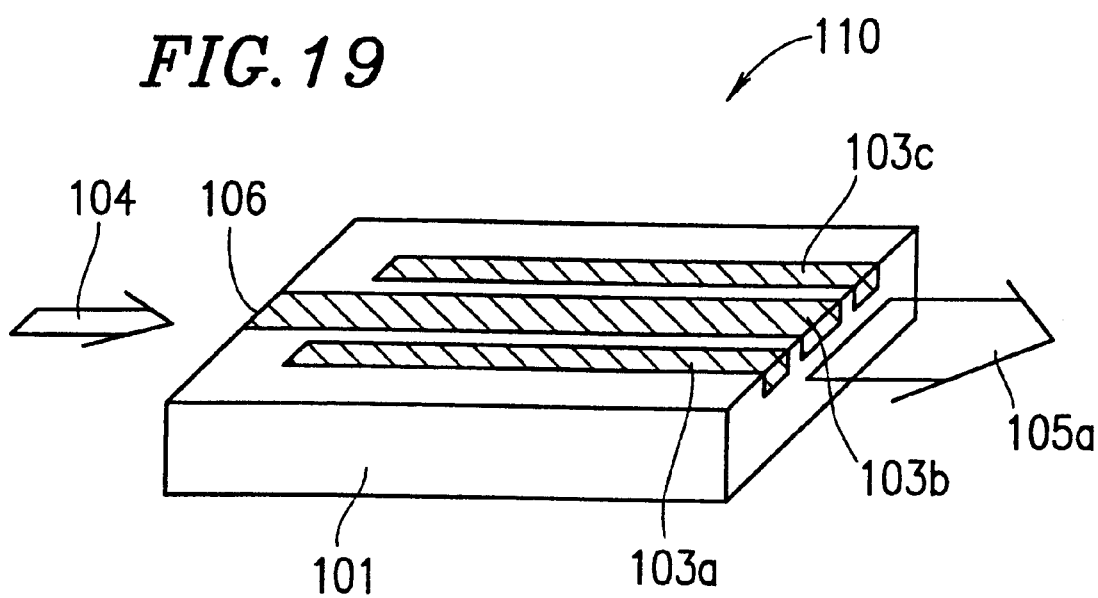
Figure 20:
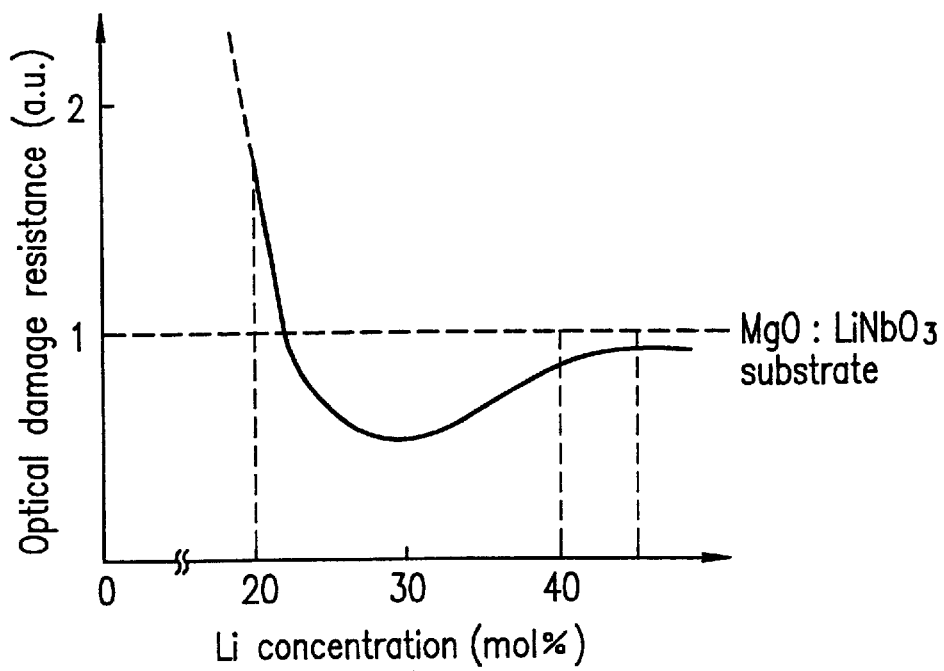
Figure 21:
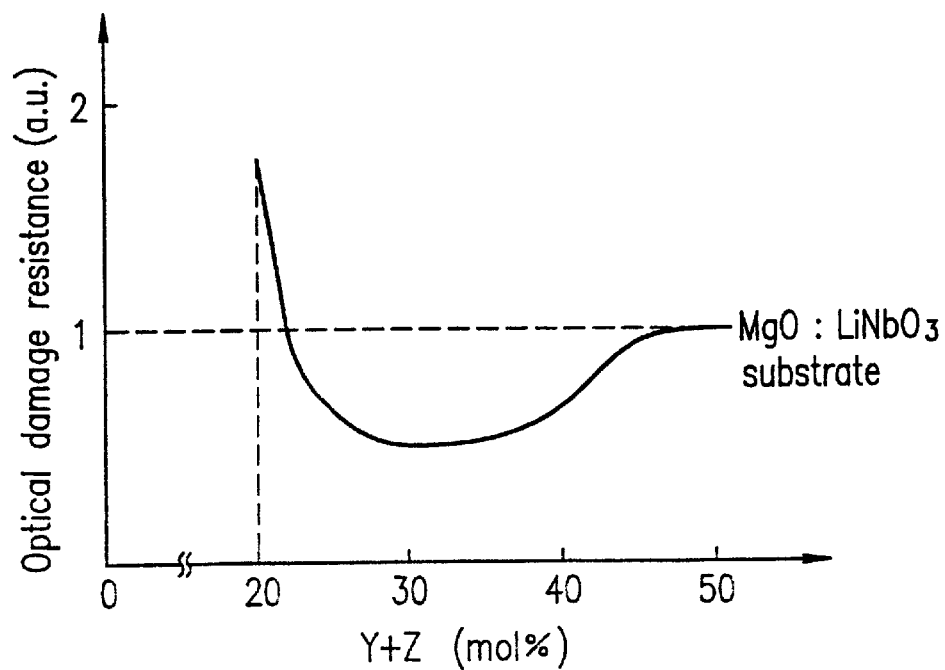
Figure 22:
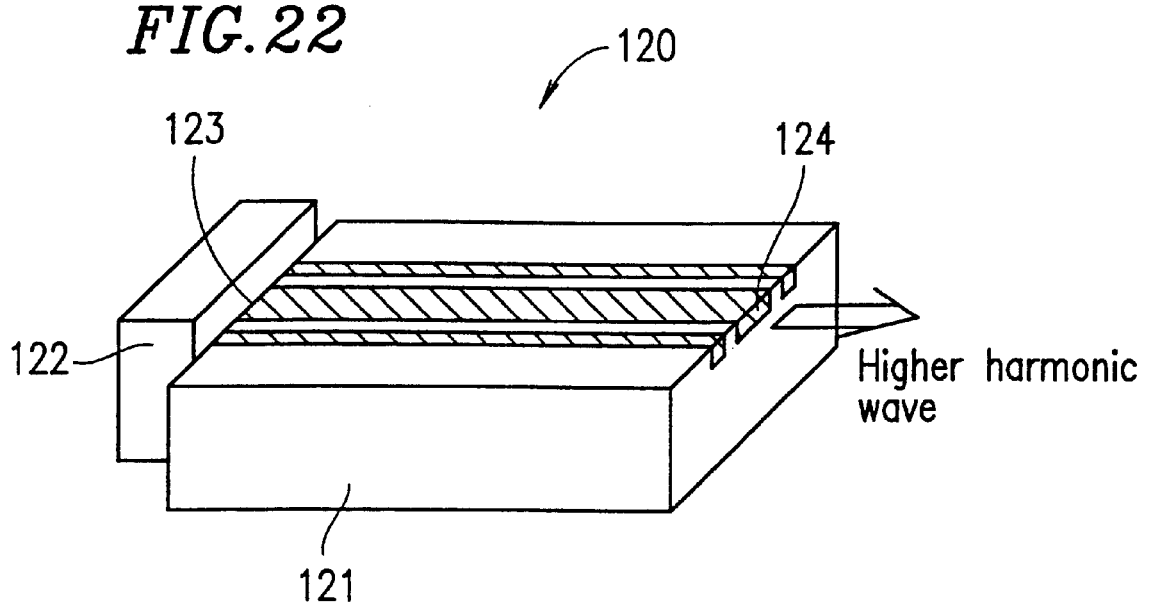
Figure 23:
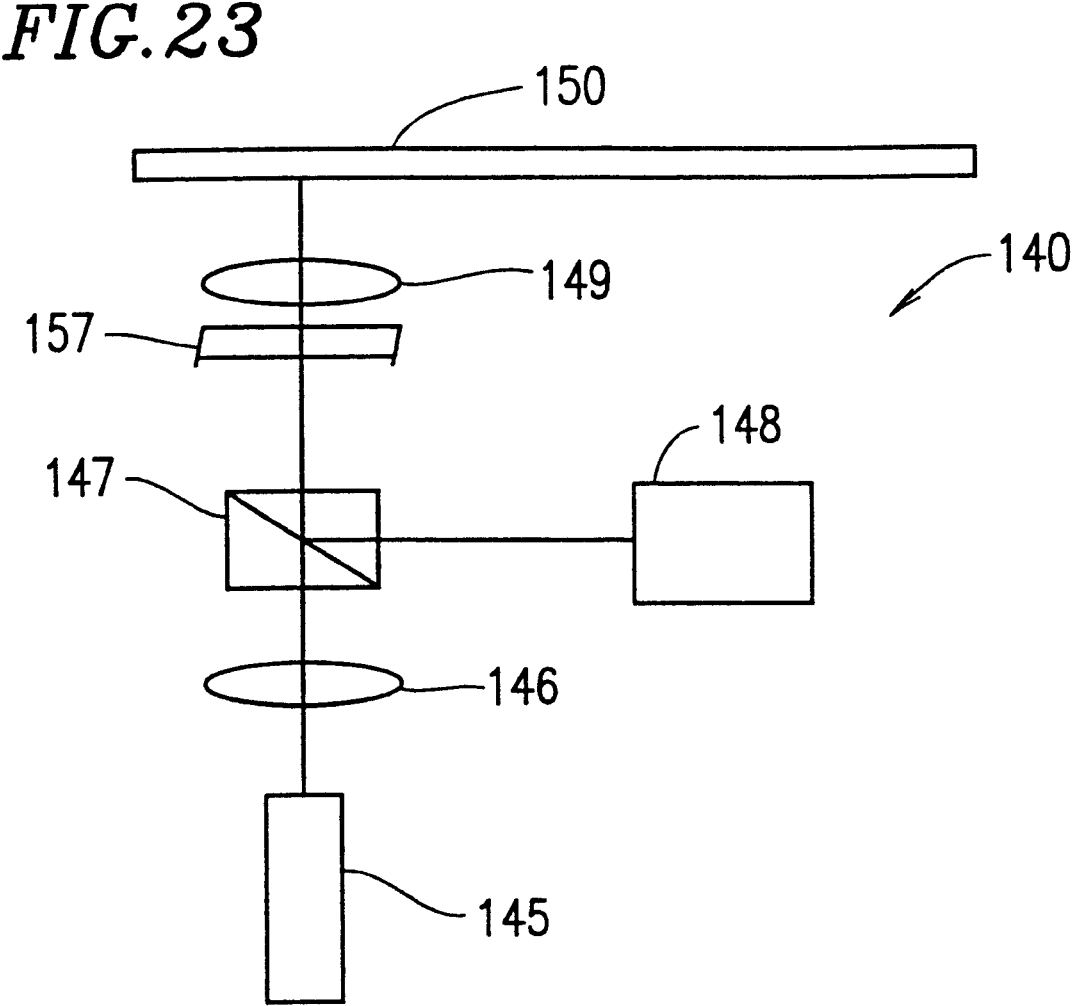
Figure 24A:
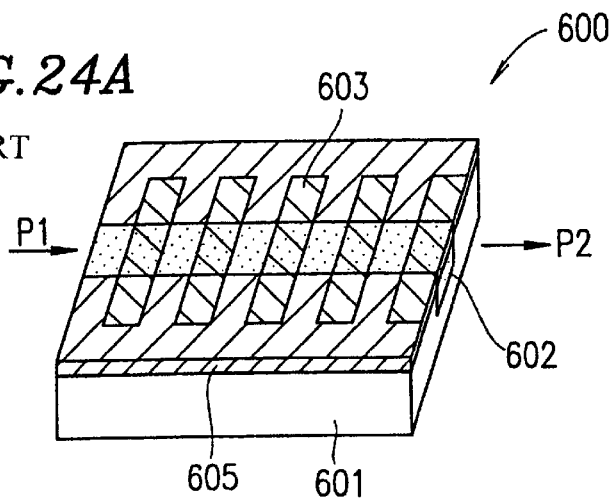
Figure 24B:
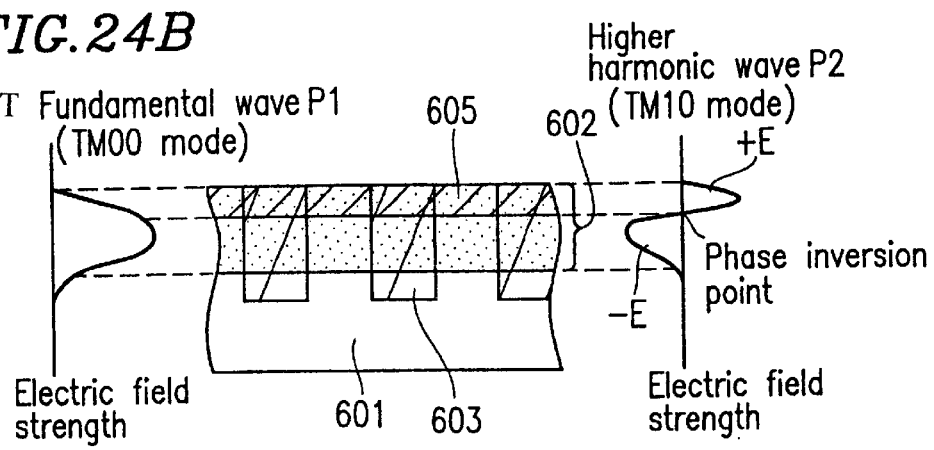
Figure 25A:
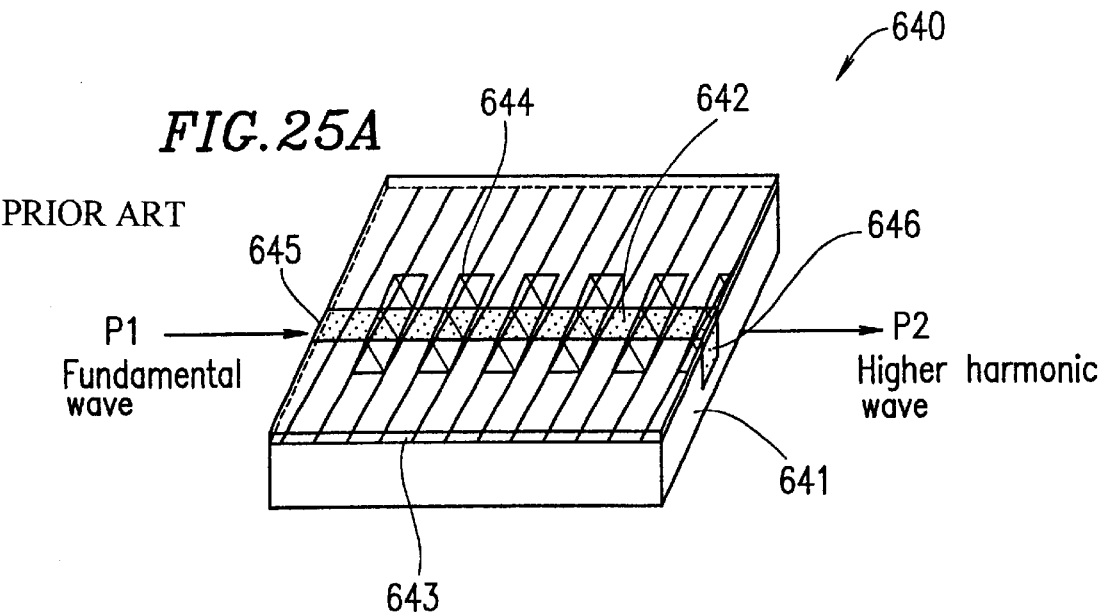
Figure 25B:
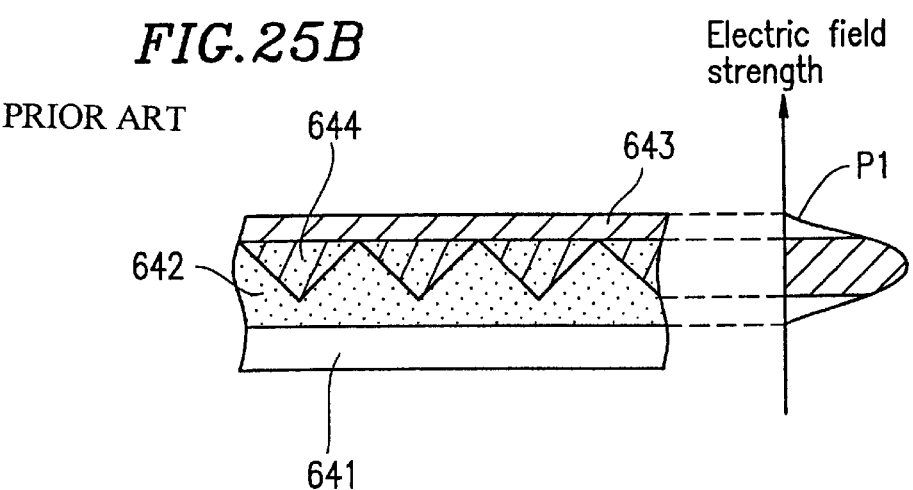
Figure 26:
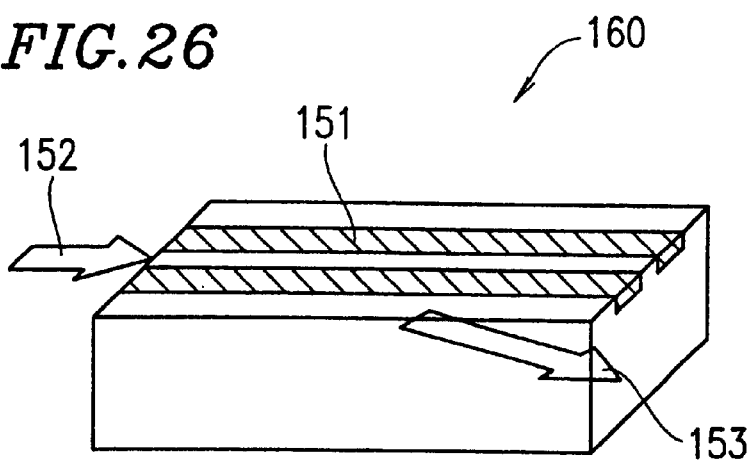

Each of FIGS. 8B to 8E is a schematic cross-sectional view illustrating a step in a method for producing an optical waveguide according to the present invention, also illustrating a refractive index distribution pattern along the depth direction of the structure obtained by the step;

FIG. 9A is a perspective view illustrating an optical wavelength conversion device of the present invention;

FIG. 9B illustrates a cross section of an optical waveguide included in the optical wavelength conversion device, also illustrating a refractive index distribution along the depth direction thereof;

FIG. 10 illustrates the relationship between the wavelength conversion efficiency of the optical wavelength conversion device and the depth of the second proton exchange layer and the relationship between the surface refractive index and the depth of the second proton exchange layer;

FIG. 11 illustrates the relationship between the optical damage resistance of the optical wavelength conversion device and the depth of the second proton exchange layer;

FIG. 12 illustrates a structure of a short wavelength generation apparatus according to Embodiment 4 of the present invention;

FIG. 13 illustrates a structure of a short wavelength generation apparatus according to Embodiment 5 of the present invention;

FIG. 14 illustrates a structure of an optical information processing apparatus of the present invention;

FIG. 15 is a perspective view illustrating a structure of an optical wavelength conversion device according to Embodiment 7 of the present invention;

FIG. 16A illustrates a cross section of an optical waveguide in the optical wavelength conversion device of Embodiment 7 of the present invention, also illustrating a graph of an electric field distribution of light (fundamental wave) propagating through the optical waveguide;

FIG. 16B illustrates a cross section of an optical waveguide in the optical wavelength conversion device of Embodiment 7 of the present invention, also illustrating a graph of an electric field distribution of light (converted light) propagating through the optical waveguide:

FIG. 17 is a perspective view illustrating an alternative structure of an optical wavelength conversion device according to Embodiment 7 of the present invention;

FIGS. 18A and 18B are each a plan view illustrating an alternative optical waveguide structure in the optical wavelength conversion device according to Embodiment 7 of the present invention;

FIG. 19 is a perspective view illustrating a structure of an optical wavelength conversion device according to Embodiment 8 of the present invention;

FIG. 20 is a graph illustrating the relationship between an optical damage resistance of an optical wavelength conversion device according to Embodiment 9 of the present invention and a molarity percentage of Li in a proton exchange layer;

FIG. 21 is a graph illustrating the relationship between the optical damage resistance of the optical wavelength conversion device according to Embodiment 9 of the present invention and the sum Y+Z of the molarity percentage Y of Li and the molarity Z of an added metal element in the proton exchange layer;

FIG. 22 is a perspective view illustrating a structure of a coherent light generation apparatus according to Embodiment 10 of the present invention;

FIG. 23 is a cross-sectional view illustrating a structure of an optical system according to Embodiment 12 of the present invention;

FIG. 24A is a perspective view illustrating an exemplary structure of a conventional optical wavelength conversion device;

FIG. 24B schematically illustrates how fundamental wave P1 which has entered the optical wavelength conversion device shown in FIG. 24A is converted into higher harmonic wave P2;

FIG. 25A is a perspective view illustrating a structure of another conventional optical wavelength conversion device;

FIG. 25B schematically illustrates how fundamental wave P1 which has entered the optical wavelength conversion device shown in FIG. 25A is confined into an optical waveguide; and FIG. 26 is a perspective view illustrating a structure of a conventional optical wavelength conversion device.

DESCRIPTION OF THE PREFERRED EMBODIMENTS

The present invention provides a novel structure for an optical wavelength conversion device utilizing a second harmonic generation (SHG), in which the overlap between a fundamental wave in a fundamental mode and a second harmonic wave in a higher mode is increased based on phase matching therebetween so as to increase the efficiency of the wavelength conversion into SHG. The novel structure aims to dramatically improve the optical damage resistance. Specifically, a first ion exchange region provided through an ion exchange process is enlarged through an annealing process, and a second ion exchange region is provided in the vicinity of the surface of the first ion exchange region. The present inventors have discovered that it is possible to significantly reduce the propagation loss along the optical waveguide and to improve the optical damage resistance by further subjecting the structure to a special annealing process. The principle will be described.

The ion exchange process performed in the present invention for the purpose as described above may be, for example, a proton exchange process. In such a case, the first and second ion exchange regions are first and second proton exchange regions, respectively. In the following description of the present invention, a proton exchange process will be described as an exemplary ion exchange process for providing a proton exchange region. However, the present invention is not limited such an application where a proton exchange process is performed, but similar effects as those which will be described hereinbelow can be also obtained when using any similar ion exchange process to provide an ion exchange region other than a proton exchange region.

Specific embodiments of the present invention, which have been achieved based on the above-described studies, will now be described with reference to the accompanying drawings.

(Embodiment 1)

The present embodiment provides a novel optical waveguide structure, based on the above-described studies, aiming to solve the problems associated with conventional optical waveguides formed by a proton exchange process.

As described above, the present inventors have studied the problems associated with an optical wavelength conversion device using an optical wavelength conversion device having a high refractive index cladding layer, and found that problems occur at the boundary between the optical waveguide and the overlying high refractive index layer. More specifically, the present inventors have found that the step-shaped pattern of the refractive index distribution is the cause of the problems.

Therefore, the present inventors have conducted various studies on the refractive index distribution pattern of the proton exchange region which forms the high refractive index layer. As a result, the present inventors have found that where the first and second proton exchange regions are formed through a proton exchange process and an annealing process, the characteristics of the optical waveguide can be improved significantly with a special refractive index distribution pattern of the proton exchange region.

Figure 2C:
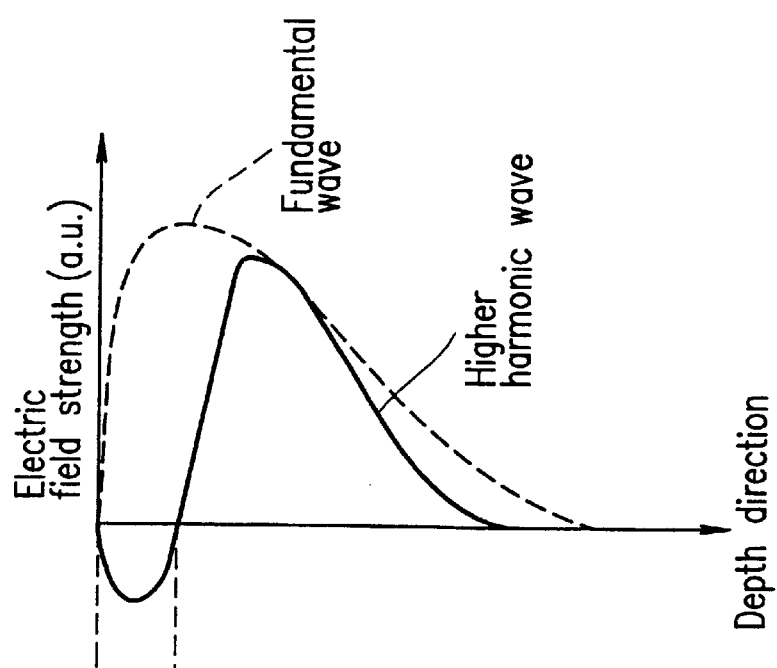
FIG. 2C illustrates an electric field distribution of each of a fundamental wave and a higher harmonic wave propagating through the structure shown in FIG. 2A.
Figure 2B:
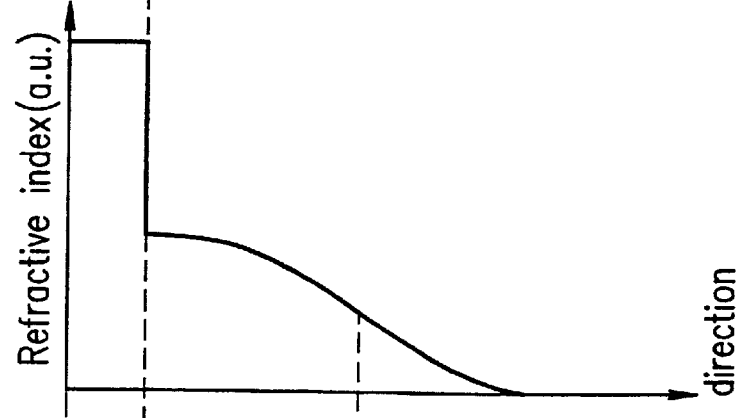
FIG. 2B illustrates a refractive index distribution along the depth direction in the structure shown in FIG. 2A.

FIG. 3A is a cross-sectional view illustrating the structure of a proton exchange waveguide (optical waveguide) according to the present embodiment. The illustrated structure includes a first proton exchange region 5 (a portion which acts as an optical waveguide) provided on a substrate 1 through a proton exchange process and an annealing process, and a second proton exchange region 6 (a portion which acts as a high refractive index layer) provided in the vicinity of the surface of the first proton exchange region 5. FIG. 3B illustrates a refractive index distribution along the depth direction of the structure illustrated in FIG. 3A. A comparison between FIG. 2B and FIG. 3B shows that in the optical waveguide of the present embodiment, unlike the conventional optical waveguide, has a refractive index distribution in the second proton exchange region 6 which is in a step-like graded pattern by the annealing process.

Conventionally, a film having a stepped refractive index distribution such as a non-annealed proton exchange region or a dielectric film having a high refractive index has been used for the second proton exchange region which acts as a high refractive index layer (a high refractive index cladding layer). However, the studies by the present inventors have shown that it is possible to significantly increase the optical damage resistance by changing the refractive index distribution of the second proton exchange region, which is a high refractive index layer, from a stepped pattern to a step-like graded pattern.

The reasons for this will be described.

In order to realize an efficient optical wavelength conversion device, the first proton exchange region 5 is used as a waveguide layer, and the second proton exchange region 6 is used as a high refractive index cladding layer, so as to increase the overlap between the fundamental wave and the higher harmonic wave based on the effect of the high refractive index cladding layer. In order for a layer to efficiently function as a high refractive index cladding layer, the layer needs to have a higher refractive index than that of the waveguide layer and to have a step-shaped refractive index distribution pattern. However, it has been found that in a structure having a high refractive index cladding layer, the phase matching wavelength shifts due to optical damages. The present inventors have made various studies on this problem in order to identify the cause of the problem. As a result, it has been found that due to the stepped refractive index distribution pattern at the boundary between the high refractive index layer and the waveguide layer, a rapid change in the higher harmonic wave power density occurs as described above with reference to FIG. 2C. The optical damage is a phenomenon in which the refractive index is varied by the electro-optical effect due to photoexcitation of the impurity level, which causes an internal electric field. Since the intensity difference in the internal electric field increases depending upon the light intensity distribution difference, thereby causing optical damages, if the higher harmonic wave power density rapidly changes at the boundary between the high refractive index layer and the waveguide layer, the change in the high refractive index around the boundary increases, thereby increasing the optical damage effect. Moreover, changes in the physical properties, refractive index, and optical power density, occurring at the boundary are also factors that increase the optical damage effect.

The present inventors presumed that it would be effective to reduce this problem to reduce the rate of change in the refractive index distribution and to increase the area of the boundary. Based on the presumption, the present inventors increased the boundary area between the first proton exchange region 5 and the second proton exchange region 6, to discover a particular structure capable of significantly reducing the occurrence of optical damages. Specifically, by changing the refractive index distribution of the second proton exchange region 6 from a stepped pattern to a step-like graded pattern, it is possible to increase the area of the boundary between the first proton exchange region 5 and the second proton exchange region 6 and to significantly reduce the occurrence of optical damages. However, when the boundary area between the proton exchange regions 5 and 6 is excessively increased, the wavelength conversion efficiency of the optical wavelength conversion device is reduced significantly. Thus, in order to realize both a high wavelength conversion efficiency and a high optical damage resistance, it is necessary to appropriately control the refractive index distribution of the second proton exchange region 6.

Next, the step-like graded pattern will be described.

The refractive index distribution of a proton exchange region is dependent upon the proton diffusion distribution. Generally, the proton diffusion distribution in a proton exchange region has a step-shaped pattern upon completion of the proton exchange process, but the pattern is changed to a graded distribution pattern by performing an annealing process after the proton exchange process. The relationship between the proton concentration distribution and the annealing time is represented by Expression 1 below.

$$C(k,t) = CO \times 0.5 \times \{Erf[(h+k)/2/\sqrt{Dp \times t}] + Erf[(h-k)/2/\sqrt{Dp \times t}]\} \quad \text{Expression 1}$$

In Expression 1 above, $C(k,t)$ is the proton exchange concentration, k is the depth ($\mu m$), t is the annealing time (hour), CO is the initial proton exchange concentration, Erf[ ] is the error function, and h is the initial proton exchange depth ($\mu m$). Moreover, Dp is the constant of proton diffusion by annealing ($\mu m^2$/hour), whose temperature dependency is shown in FIG. 4.

As used herein, "a refractive index distribution having a step-like graded pattern" is defined as a refractive index distribution between a stepped refractive index distribution pattern which is obtained by a stepped proton concentration distribution and a graded refractive index distribution pattern which is obtained by a graded proton concentration distribution. Such a step-like graded pattern is realized within a range in which the proton exchange concentration at the surface is substantially equal to the initial value CO, i.e., a range in which $C(0,t)$ has a value which is substantially equal to CO. In practice, such a condition can be defined by the value of $h/2/(Dp \times t)^{1/2}$ in Expression 1. More specifically, a refractive index distribution having a step-like graded pattern is realized within a range in which the relationship represented by Expression 2 below holds true.

$$1.5 < (h+k)/2/\sqrt{Dp \times t} < 20 \quad \text{Expression 2}$$

For example, where the initial proton exchange depth h is equal to 0.18 $\mu m$, the range of Expression 2 for realizing a refractive index distribution having a step-like graded pattern is defined to be about 2 hours to about 50 hours in terms of the annealing time for an annealing temperature of 140° C. and about 10 minutes to about 5 hours in terms of the annealing time for an annealing temperature of 180° C.

As discussed above, the proton concentration distribution in the proton exchange region generally has a step-shaped pattern after the proton exchange process and before the annealing process. Then, upon the annealing process, protons thermally diffuse to change the pattern from the stepped pattern to a graded pattern which is close to the Gaussian distribution. Since the refractive index of the proton exchange region is proportional to the proton concentration, the change in the proton concentration distribution pattern by the annealing process is followed by the change in the refractive index distribution pattern from a step pattern to a graded pattern.

Figure 5A:
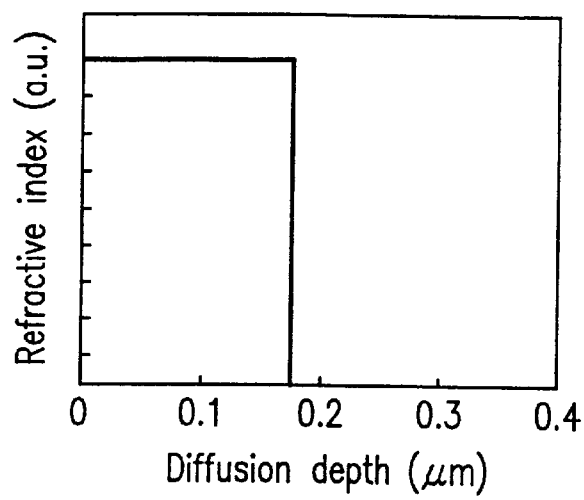
FIG. 5A illustrates a refractive index distribution pattern (step pattern) which changes along with a change in a proton concentration distribution by an annealing process.
Figure 5B:
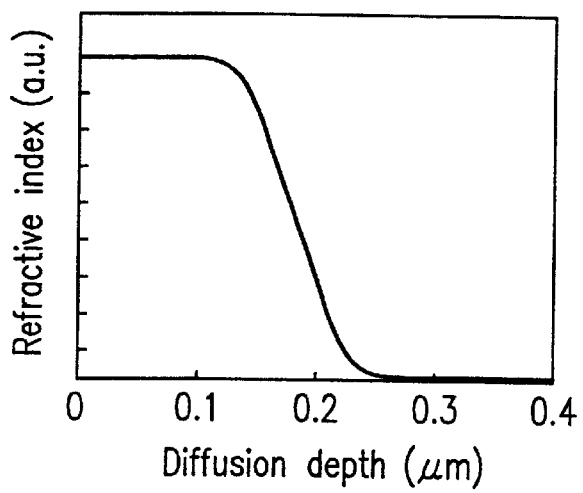
FIG. 5B illustrates a refractive index distribution pattern (step-like graded pattern) which changes along with a change in a proton concentration distribution by an annealing process.
Figure 5C:
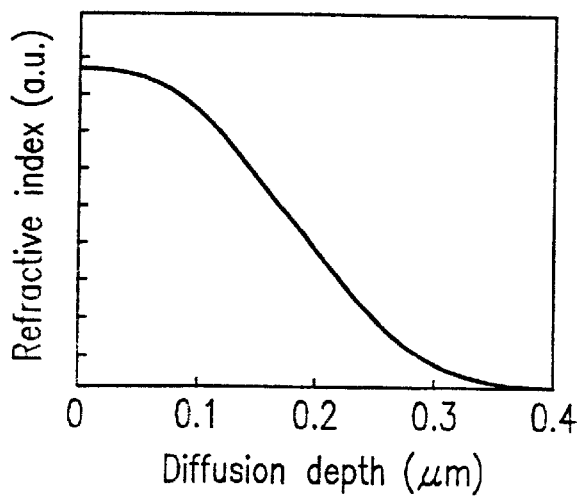
FIG. 5C illustrates a refractive index distribution pattern (graded pattern) which changes along with a change in a proton concentration distribution by an annealing process.

FIGS. 5A to 5C illustrate how the refractive index distribution pattern is changed as the proton concentration distribution is changed by an annealing process.

As illustrated in the figures, an annealing process changes the refractive index distribution pattern of the proton exchange region from a step pattern (FIG. 5A) to a step-like graded pattern (FIG. 5B) and further to a graded pattern which is close to the Gaussian distribution (FIG. 5C). The step-like graded pattern (FIG. 5B) is a pattern between the step pattern (FIG. 5A) and the graded pattern (FIG. 5C). The proton diffusion distribution pattern substantially retains the step-like pattern within a range in which the surface proton exchange concentration does not decrease.

Figure 6:
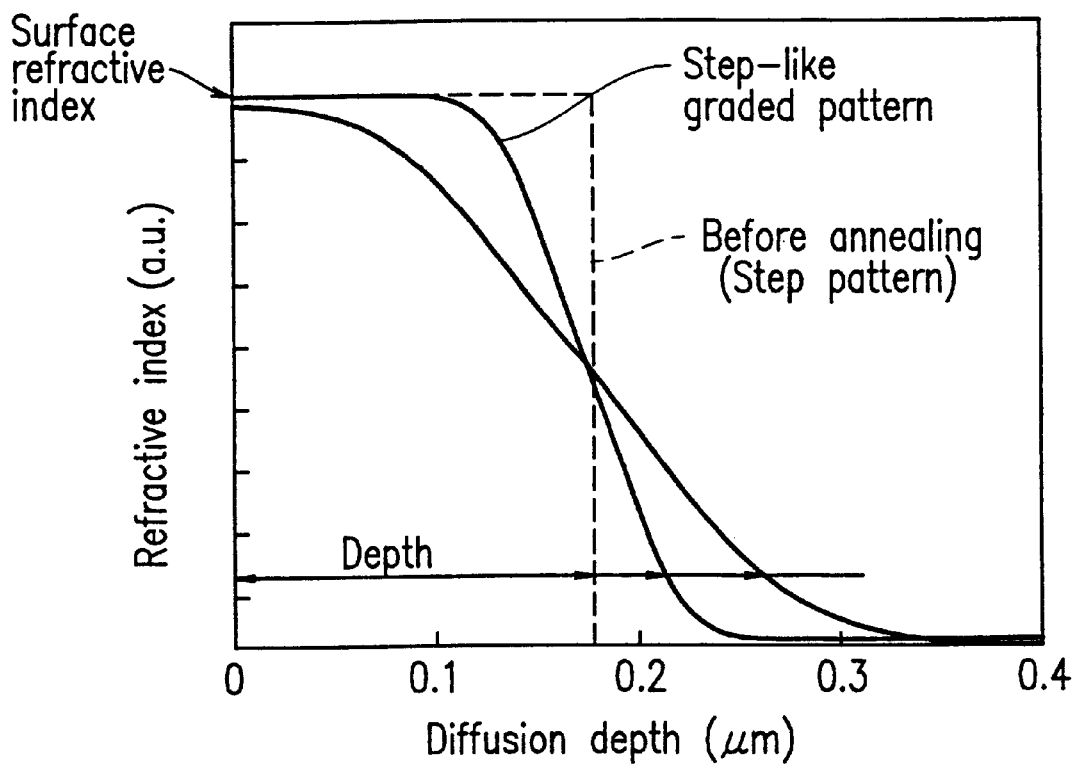
FIG. 6 illustrates a change in a refractive index distribution by an annealing process.

More strictly, the change in the refractive index distribution is dependent upon the pre-anneal proton exchange depth, the annealing process temperature and the annealing process time. FIG. 6 illustrates the change in the refractive index distribution by an annealing process. In FIG. 6, the expansion factor of the refractive index distribution is defined by the width of an area where the refractive index is $1/e^2$ of the maximum value. When the expansion factor of the proton exchange region by the annealing process is about 2 or more, the refractive index distribution changes from a step-like pattern to a near Gaussian distribution pattern. In order to obtain a step-like refractive index distribution pattern, it is necessary to keep the factor of expansion of the proton exchange region depth by an annealing process in a range of about 1.1 to about 2.

Moreover, it can be seen from FIG. 6 that the surface refractive index immediately after proton exchange is maintained while the refractive index distribution has a step-like pattern. However, when the refractive index distribution is changed to be closer to the Gaussian distribution, and the width of the refractive index distribution is increased by a factor of about 2, the surface refractive index starts to decrease gradually. In an experiment, the value of the surface refractive index of the proton exchange region for which a step-like refractive index distribution is maintained was about 90% or higher.

From the above, it is clear that the phenomenon in which the wavelength conversion efficiency of the optical wavelength conversion device is reduced when annealing the second proton exchange region over a long period of time is due to a decrease in the surface refractive index of the second proton exchange region. Specifically, the confinement of light being propagated is weakened by the reduction in the surface refractive index of the second proton exchange region, thereby reducing the wavelength conversion efficiency. Therefore, the annealing process for the second proton exchange region is preferably performed to a degree such that the process does not reduce the surface refractive index. Moreover, a high surface refractive index is necessary for increasing the efficiency of the optical wavelength conversion device, and the second proton exchange region 6 in an optical waveguide having a high refractive index cladding layer is required to have a step-like refractive index distribution. Therefore, it is preferable to suppress the expansion factor of the second proton exchange region 6 to be 2 or less.

The experimental results obtained by the present inventors have shown that the refractive index distribution of the second proton exchange region 6 has to have the intermediate refractive index distribution between the step pattern and the completely graded pattern close to the Gaussian distribution (see FIG. 5B) in order to realize a high wavelength conversion efficiency and a desirable optical damage resistance. This intermediate pattern is referred to herein as a "step-like graded pattern". On the other hand, the first proton exchange region 5 is a waveguide layer having a small propagation loss, and has to have a completely graded pattern (an error function pattern) in order to improve the overlap by the high refractive index cladding layer.

Thus, it has been found that a necessary requirement for realizing an optical wavelength conversion device having a high efficiency and a desirable optical damage resistance is that the first proton exchange region 5 and the second proton exchange region 6 have different graded refractive index distribution patterns (i.e., different graded proton concentration distribution patterns).

The refractive index distribution pattern (the proton concentration distribution pattern) of the proton exchange region can easily be changed to a graded pattern close to the Gaussian distribution pattern by an annealing process. In order to control the refractive index distribution of the second proton exchange region 6 to a step-like graded pattern, it is necessary to precisely control the annealing process condition for the second proton exchange region 6. The present inventors have found that it is possible to improve the characteristics of an optical wavelength conversion device by precisely controlling the anneal so as to obtain a step-like graded pattern, which is obtained before the refractive index distribution pattern changes to a graded pattern.

FIGS. 7A to 7C illustrate a proton exchange ratio distribution in the first proton exchange region 5 and the second proton exchange region 6. The composition of an $LiNbO_3$ crystal is changed to $Li_{(1-x)}H_xNbO_3$ by a proton exchange process. The proton exchange ratio X as shown in the figure represents the ratio of exchange between Li and H in the crystal, and is expressed as X=H/(Li+H) wherein Li and H denote the molar number of Li and H, respectively. A crystal before a proton exchange process has a proton exchange ratio X of 0. When Li is completely exchanged with H, the proton exchange ratio X is about 1. An actual proton exchange layer immediately after a proton exchange process and before an annealing process has a proton exchange ratio which slightly varies depending upon the proton exchange temperature, the acid used in the proton exchange process, and the proton exchange time. For example, for benzoic acid, which is an acid typically used in a proton exchange process, X=0.67±0.02. When the proton exchange process is performed with pyrophosphoric acid, which can produce a proton exchange layer with a high refractive index, X is about 0.76±0.02. Thus, about 70% of total Li content in the crystal is exchanged with proton. A proton exchange process is preferably performed with pyrophosphoric acid because it is then possible to produce a proton exchange layer with a high refractive index.

FIG. 7A illustrates a proton exchange ratio distribution in a waveguide produced by using pyrophosphoric acid and including the first and second proton exchange layers. The proton exchange ratio of the second proton exchange region is about 0.76 in the vicinity of the surface thereof. On the other hand, the proton exchange ratio of the first proton exchange layer is about 0.1 in the vicinity of the surface thereof. By providing such a substantial difference in the proton exchange ratio, a sufficient refractive index difference between the second proton exchange layer and the first proton exchange layer is ensured. As can be seen from the figures, in order to produce the second proton exchange layer, it is necessary to perform an annealing process under conditions such that the proton diffusion is minimized. It is necessary to control the process temperature and the process time so that the proton concentration distribution is not destroyed and the first proton exchange layer is not influenced. Therefore, the second proton exchange layer is produced while setting the process temperature to be 200° C. or less and controlling the temperature such that the diffusion distribution is not destroyed.

FIGS. 7B and 7C illustrate enlarged proton exchange ratio distribution patterns of the first and second proton exchange layers, respectively. As can be seen, the proton exchange ratio distribution patterns of FIGS. 7B and 7C are totally different from each other. The proton exchange ratio distribution in the first proton exchange layer has a completely graded pattern due to the annealing process. On the other hand, the second proton exchange layer has a step-like graded pattern. Another significant difference between the first and second proton exchange layers is the difference therebetween in terms of the amount of change of the proton exchange ratio along the depth direction. In the first proton exchange layer, the proton concentration at the surface thereof is reduced while the amount of change of the proton exchange ratio X along the depth direction is very small. On the other hand, in the second proton exchange layer, the proton exchange ratio rapidly changes along the depth direction. The amount of change of the proton exchange ratio X along the depth direction ($\mu m^{-1}$) is defined as follows.

The amount of change of proton exchange ratio=$|\Delta X/\Delta depth|$

Then, the annealing state of proton exchange can be represented by an absolute value of the change in the proton exchange ratio. First, the amount of change of the proton exchange ratio in the first proton exchange layer is about 0.04 $\mu m^{-1}$. In order to reduce the proton concentration of the proton exchange layer and to sufficiently recover the nonlinear optical constant, the amount of change in the proton exchange ratio has to be at least 0.1 $\mu m^{-1}$ or less, and is preferably 0.06 $\mu m^{-1}$ in order to improve the efficiency.

On the other hand, in the second proton exchange layer, the extent of the range where the proton concentration changes along the depth direction is important. As described above, such a range where the proton concentration changes exists around the boundary between the first and second proton exchange layers. It is possible to form an optical waveguide having a desirable optical damage resistance by producing this range by an annealing process. Specifically, the range where the proton exchange ratio changes is about 0.05 $\mu m$ in the second proton exchange region, as illustrated in FIG. 7C. The range is about 0.01 $\mu m$ or less immediately after the proton exchange process. It is preferred to subject the second proton exchange region to an annealing process so as to expand the range where the proton exchange ratio changes to a range in the range of 0.02 $\mu m$ to 0.2 $\mu m$. It is more preferable to suppress the range to a range in the range of about 0.03 $\mu m$ to about 0.1 $\mu m$ in order to realize an efficient conversion. A significant difference between the first and second proton exchange layers is in this range. In the first proton exchange layer, which has a completely graded proton distribution pattern, the range where the proton exchange ratio changes is as large as several micrometers. On the other hand, in the second proton exchange region, which has a step-like graded proton distribution pattern, the range where the proton exchange ratio changes is 0.02 $\mu m$ to 0.2 $\mu m$. Another difference between the first and second proton exchange regions is in the amount of change in the proton exchange ratio. In the first proton exchange region, which has a completely graded proton exchange ratio pattern, the rate of change of X is about 0.04 $\mu m^{-1}$. On the other hand, in the second proton exchange region, X is as large as about 15 $\mu m^{-1}$. In order to realize a step-like graded pattern which allows for efficient conversion, the amount of change in the proton exchange ratio is preferably set to about 5 $\mu m^{-1}$ to about 50 $\mu m^{-1}$. Moreover, in order to increase the optical damage resistance, the amount of change is preferably set to about 10 $\mu m^{-1}$ to about 30 $\mu m^{-1}$.

Figure 2A:
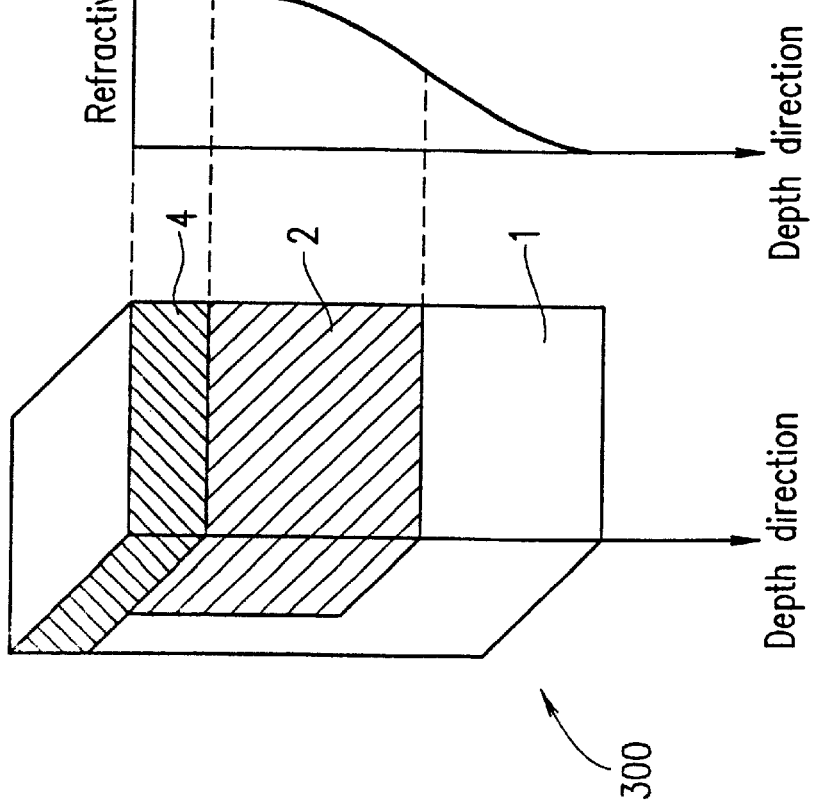
FIG. 2A is a schematic diagram illustrating a structure of a conventional optical waveguide device.

In the first and second ion exchange layers, the phase relationship between the fundamental wave and SHG is reversed (see FIG. 2), an increase in the nonlinear optical effect in the second ion exchange layer means a decrease in the conversion efficiency. Therefore, the lower the nonlinear optical effect in the second ion exchange layer, the higher is the conversion efficiency. The nonlinear optical constant is preferably reduced to 60% or less of the original value by performing a proton exchange process with a high proton exchange concentration.

Next, the results of an in-depth study on the proton concentration distribution pattern of the second proton exchange region 6 which produces an optical waveguide having a desirable optical damage will be discussed.

First, the production conditions which would allow for a desirable refractive index distribution in the second proton exchange region 6 were discussed.

In FIGS. 10 and 11, the expansion of the second proton exchange region 6 occurring upon an annealing process is represented by the change in the depth of the second proton exchange region 6 (full width at half maximum of the size of the proton exchange region). The change in the depth of the second proton exchange region 6 is a parameter taken along the horizontal axis. Thus, FIGS. 10 and 11 illustrate the relationship of the depth of the second proton exchange region 6 with respect to the wavelength conversion efficiency and the surface refractive index of the optical wavelength conversion device (FIG. 10), and with respect to the optical damage resistance (FIG. 11). The value along the horizontal axis is normalized by the depth of the second proton exchange region 6 before the initiation of the annealing process. Therefore, the value of each of the wavelength conversion efficiency and the surface refractive index (FIG. 10) and the optical damage resistance (FIG. 11) along the vertical axis is the value taken before the initiation of the annealing process.

As illustrated in FIG. 11, the optical damage resistance starts to rapidly increase when the depth of the second proton exchange region is increased by the annealing process by a factor of about 1.2 from that before the annealing process. Thereafter, a continued annealing process gradually increases the optical damage resistance. This is because such a continued annealing process changes the refractive index distribution pattern of the second proton exchange region 6 to a graded pattern, thereby increasing the boundary area between the first and second proton exchange regions 5 and 6.

Another phenomenon was found during this study. It was found that the wavelength conversion efficiency of the optical wavelength conversion device is significantly increased by annealing the second proton exchange region 6, as illustrated in FIG. 10.

More specifically, the wavelength conversion efficiency increased as (the depth of) the second proton exchange region 6 increased, and reached its maximum at a point in time when the depth was increased to be about 1.5 times as large as the depth before the annealing process. At such a point in time, the wavelength conversion efficiency was close to twice as much as the value obtained before the annealing process, and a significant improvement in the wavelength conversion efficiency was confirmed. However, with a continued annealing process, the wavelength conversion efficiency started to decrease around a point in time when the depth of the second proton exchange region 6 was about twice as much as that before the annealing process. Thereafter, the wavelength conversion efficiency kept decreasing as the annealing process was continued. This is because the surface refractive index of the second proton exchange region 6 also started to decrease around such a point in time, as is also shown in FIG. 10.

There are two possible reasons why the wavelength conversion efficiency is increased by annealing the second proton exchange region 6.

First, while the depth of the second proton exchange region 6 is increased by an annealing process, the effective refractive index increases in a range where the refractive index distribution has a step-like graded pattern and thus there is a little decrease in the surface refractive index. Therefore, the confinement of light being propagated into the optical waveguide is increased, and thus the power density of the light being propagated is increased, thereby improving the wavelength conversion efficiency.

The second possible reason is the influence of the improvement in the uniformity of the second proton exchange region 6. Specifically, the second proton exchange region 6, when not subjected to an annealing process, has a crystalline strain in the vicinity of the boundary between the first proton exchange region 5 and the second proton exchange region 6, which presents a cause of non-uniformity of the optical waveguide (the first proton exchange region 5). The non-uniformity of the optical waveguide (the first proton exchange region 5) has a significant influence on the wavelength conversion efficiency, thereby causing the efficiency to decrease. On the other hand, when the second proton exchange region 6 is subjected to an annealing process, the crystalline strain is reduced, thereby increasing the uniformity of the optical waveguide (the first proton exchange region 5). Thus, the wavelength conversion efficiency improves significantly.

In view of the optical damage resistance, the depth of the second proton exchange region 6 is preferably equal to or greater than 1.2 times the depth before the annealing process. More preferably, the depth is increased to be equal to or greater than 1.5 times the depth before the annealing process, so as to further improve the optical damage resistance. In view of the wavelength conversion efficiency, the depth of the second proton exchange region 6 is preferably about 1.2 to about 2.5 times the depth before the annealing process. More preferably, the depth of the second proton exchange region 6 is about 1.5 to 2 times the depth before the annealing process, thereby doubling the wavelength conversion efficiency.

It has also been found that deterioration of the optical wavelength conversion device over time can be eliminated by controlling the refractive index distribution of the second proton exchange region 6 to a step-like graded pattern. This will be described below.

As described above, the characteristics of an optical wavelength conversion device employing a proton exchange optical waveguide deteriorate in a high temperature reliability test at about 80° C. A study by the present inventors has shown that the primary factor of the characteristic deterioration is the increase in the depth of the second proton exchange region 6 over time. This is because the depth of the non-annealed proton exchange region easily changes over time and even a slight amount of change in the depth of a stepped refractive index distribution pattern has a significant influence on the optical wavelength conversion device. More specifically, experiments conducted by the present inventors showed that non-annealed samples had variations in the phase matching wavelength of about 0.2 nm to about 0.6 nm in a high temperature reliability test at 80° C. for about 100 hours. On the other hand, annealed samples had substantially no such variation. Specifically, the annealed samples had variations in the phase matching wavelength of only about 0.02 nm or less even in a high temperature reliability test at 80° C. for about 1000 hours.

When the second proton exchange region 6 is annealed according to the present invention so as to provide a graded shape, there are substantially no such variations over time. This is because the potential variations which may occur later in a produced device are effectuated in advance by the annealing process, thereby significantly reducing the variations over time in the characteristics of the produced device, particularly, the amount of change over time in the refractive index distribution at high temperatures. Moreover, it is believed that since the refractive index distribution of the second proton exchange region 6 is changed from a step pattern to a step-like graded pattern, the boundary area between the first and second proton exchange regions 5 and 6 has a constant area, thereby significantly reducing the influence of variations in the refractive index distribution along the depth direction on the optical wavelength conversion device.

An in-depth study on the relationship between the expansion of the proton exchange region and the characteristic variations over time showed that there are no characteristic variations over time until the depth of the proton exchange layer is increased by an annealing process to about 1.1 times the depth before the annealing process, and that there is no characteristic deterioration in a high temperature test when the depth is increased to about 1.3 times the original depth.

The first proton exchange region 5 is closely related to the propagation loss along the optical waveguide. By expanding the first proton exchange region 5 by an annealing process, it is possible to significantly reduce the propagation loss along the optical waveguide. For example, during an annealing process at 330° C. for 3 hours, at a point in time when the proton distribution in the first proton exchange region 5 (the depth of the first proton exchange region 5) was increased to about 8 times that before the annealing process, the propagation loss along the optical waveguide was reduced to 1 dB/cm or less, exhibiting the minimum level. Thereafter, a continued annealing process did not provide further reduction in the propagation loss.

Thus, in order to provide an optical waveguide with reduced propagation loss, it is necessary to increase the depth of the first proton exchange region 5 by 8-fold or more by an annealing process.

Next, a process for producing an optical waveguide through a proton exchange process will be described.

Referring to FIGS. 8A to 8E, a method for producing an optical waveguide will be described. Each of FIGS. 8A to 8E is a schematic cross-sectional view illustrating a step in the production process. Moreover, each of FIGS. 8B to 8E additionally shows a refractive index distribution pattern along the depth direction which is obtained after the respective step.

Figure 8A:
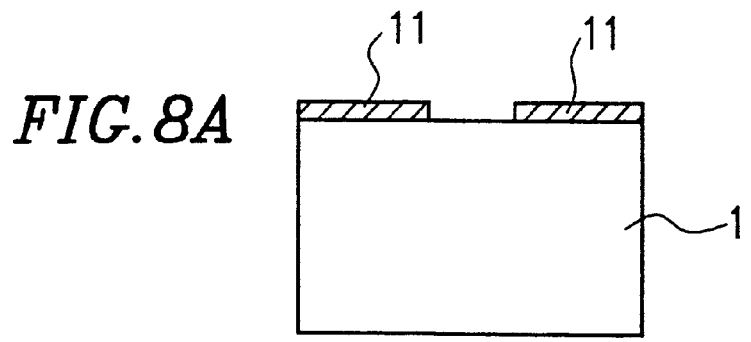
FIG. 8A is a schematic cross-sectional view illustrating a step in a method for producing an optical waveguide according to the present invention.
Figure 8B:
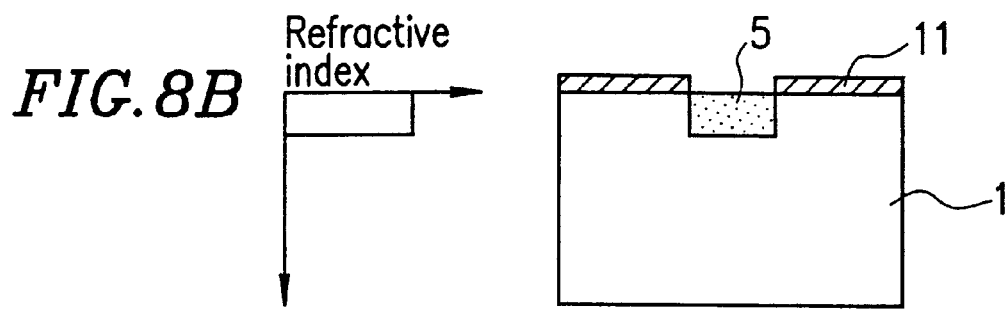
Figure 8C:
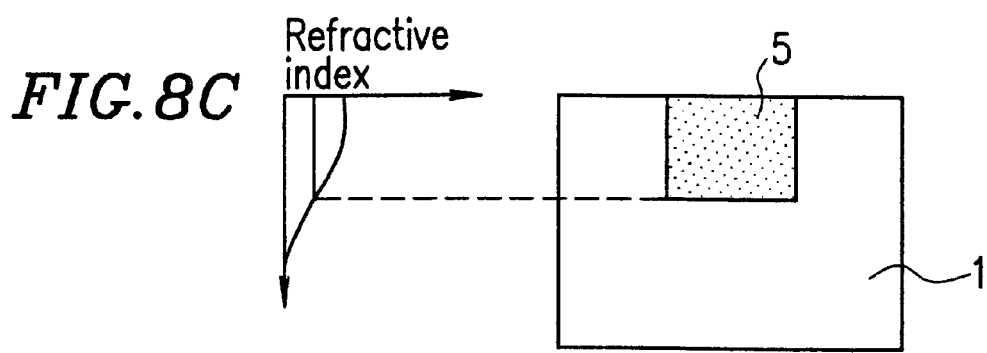
Figure 8D:
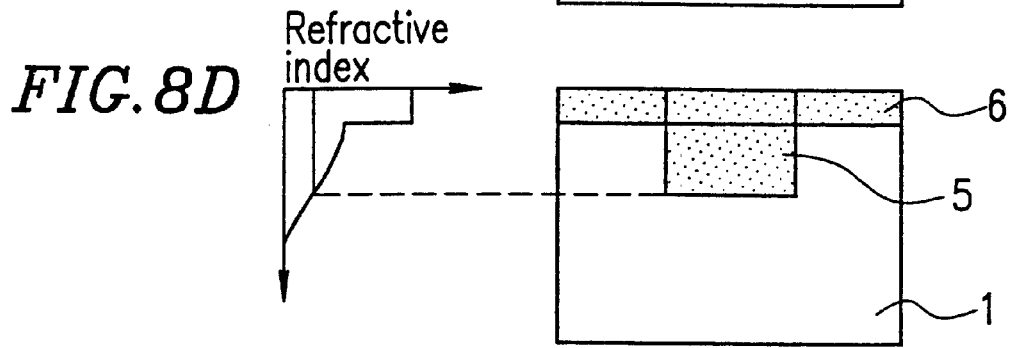
Figure 8E:
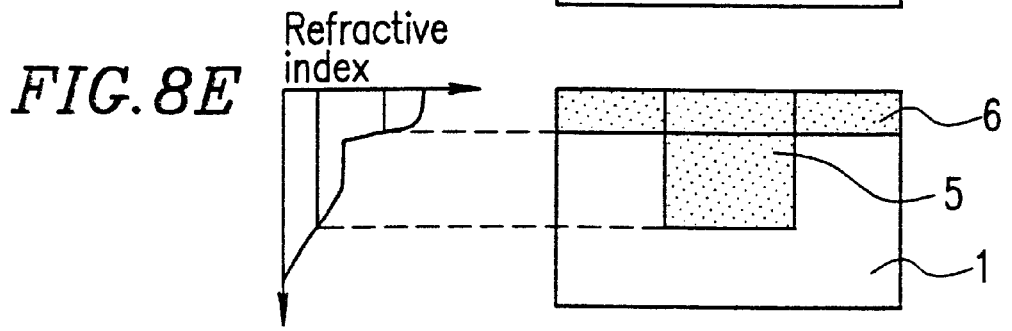

The substrate 1 may be an X plate LiNbO$_3$ doped with MgO. First, as illustrated in FIG. 8A, a stripe-shaped mask pattern 11 for an optical waveguide is formed on the substrate 1 as illustrated in FIG. 8A by using, for example, tantalum (Ta). Then, a heat treatment in pyrophosphoric acid at 200° C. is performed to form the first proton exchange region 5 in areas of the substrate 1 which are not covered with the mask pattern 11, as illustrated in FIG. 8B. After removal of the Ta mask pattern 11, a first annealing process is performed so as to thermally diffuse the first proton exchange region 5, as illustrated in FIG. 8C. Then, the second proton exchange region 6 is formed on the surface of the substrate 1, as illustrated in FIG. 8D, by using a pyrophosphoric acid at 200° C. Then, a second annealing process is performed so as to thermally diffuse the second proton exchange region 6, as illustrated in FIG. 8E.

The depth (thickness) of the first proton exchange region 5 is typically about 0.17 µm to about 0.25 µm. With such a depth (thickness), light having a wavelength near 850 nm as a fundamental wave can be propagated in a single mode after depositing the high refractive index cladding layer.

Appropriate temperatures of the first annealing process for annealing the first proton exchange region 5 having such a depth (thickness) were studied.

In the first annealing process, it is necessary to expand the first proton exchange region 5 to have a depth of 2 µm or more, for the following purposes. The first purpose is to control the refractive index distribution in the optical waveguide section in a completely graded pattern so as to reduce the propagation loss. The second purpose is to recover the nonlinearity of the substrate 1 which has been reduced significantly by the proton exchange process. In order to realize an efficient optical wavelength conversion device, it is necessary to control the nonlinearity of the optical waveguide to a sufficiently high value. By reducing the proton exchange ratio by 8-fold or more through an annealing process, it is possible to recover the nonlinearity of the proton exchange region to a value close to that of the substrate 1. The third purpose is to produce an optical waveguide structure having a high refractive index cladding layer. By reducing the surface refractive index of the first proton exchange region 5, thereby providing a significant refractive index difference between the first proton exchange region 5 and the second proton exchange region 6, it is possible to realize a high refractive index cladding layer through a proton exchange process.

In order to satisfy such conditions, the annealing temperature for the first proton exchange region 5 is preferably 300° C. or more. When the annealing temperature is less than or equal to 300° C., the necessary refractive index distribution cannot be provided even after performing an annealing process for several ten hours, thereby significantly reducing the process efficiency. Moreover, the purpose of reducing the propagation loss along the optical waveguide by the annealing process is more efficiently realized by setting the annealing temperature for the first proton exchange region 5 to 300° C. or more.

The thermal diffusion and the propagation loss of the proton exchange region by the annealing process is dependent upon the annealing process temperature. The higher the annealing process temperature, the lower is the propagation loss along the optical waveguide for the same amount of proton diffusion. Thus, a high temperature annealing process is required to provide an optical waveguide with reduced propagation loss. A study on the relationship between the annealing temperature and the propagation loss has showed that the propagation loss can be reduced to 1 dB/cm or less by setting the annealing process temperature for the first proton exchange region 5 to 300° C. or more.

On the other hand, the depth (thickness) of the second proton exchange region 6 is preferably about 0.15 $\mu$m to about 0.21 $\mu$m for a fundamental wave having a wavelength of about 850 nm. This is a range where the fundamental wave light is cut off in the second proton exchange region 6.

Moreover, the studies made by the present inventors have shown that the depth of the second proton exchange region 6 is more preferably set to be less than or equal to 90% of the depth of the boundary where the fundamental wave is cut off (the boundary between the waveguide condition and the cut-off condition) for the following reasons.

The effective refractive index of the second proton exchange region 6 increases by an annealing process. When the depth of the second proton exchange region 6 is set in the vicinity of the cut-off condition boundary, the effective refractive index of the second proton exchange region 6 can be increased by an annealing process for the second proton exchange region 6, while the fundamental wave can propagate through the second proton exchange region 6. The studies made by the present inventors have shown that as a result of the above, the wavelength conversion efficiency is reduced significantly. In order to prevent this, it is necessary to set the depth of the second proton exchange region 6 to be less than or equal to 90% of the depth of the cut-off condition boundary so that the depth of the second proton exchange region 6 maintains the cut-off condition for the fundamental wave even after the annealing process.

It has been shown that the second annealing temperature when annealing the second proton exchange region 6 needs to be less than or equal to 250° C. for two reasons: the controllability of the refractive index distribution; and the reduction in the amount of decrease in the surface refractive index.

In the second annealing process, it is necessary to control the refractive index distribution of the second proton exchange region 6 in a step-like graded pattern. thus, it is necessary to precisely control the time of the annealing process. At the same time, it is necessary to provide a high uniformity in the annealing process distribution across the optical wavelength conversion device surface in order to obtain uniformity in the optical waveguide (the first proton exchange region 5) after the annealing process. The thermal diffusion rate in the proton exchange region by an annealing process increases as the temperature increases. Therefore, when the annealing process temperature is equal to or greater than 250° C., the annealing process time is about several seconds, whereby it is difficult to precisely control the temperature of the process. In a short-time high temperature process, a phenomenon was observed where a distribution is produced in the optical waveguide propagation constant due to the temperature distribution in the substrate, thereby deteriorating the uniformity of the optical waveguide.

In view of the above, it is preferred to perform an annealing process at a low temperature for a long period of time in order to precisely produce a uniform refractive index distribution which is required for the second proton exchange region 6. Specifically, the annealing temperature for the second proton exchange region 6 is preferably equal to or greater than 5–6 hours at 150° C., several hours at 180° C., or several minutes at a temperature equal to or greater than 200° C.

For example, when the second proton exchange region 6 was annealed at 140° C., an optimal step-like graded distribution pattern was obtained when the annealing time was in the range of 2 hours to 20 hours. Particularly, when the annealing process was performed for 3 hours or more, the optical damage resistance was improved significantly. When the second proton exchange region 6 was annealed at 180° C., a desirable distribution pattern was obtained with an annealing process for 3 hours or less. However, when an annealing process was performed at an annealing temperature of 180° C. for a period of time exceeding 10 hours, the second proton exchange region 6 was excessively expanded, thereby producing a completely graded pattern, thereby reducing the wavelength conversion efficiency.

In view of the above, the annealing process temperature of the second annealing process for the second proton exchange region 6 needs to be less than or equal to 250° C. in order to realize a refractive index distribution necessary for the optical waveguide with a good controllability. Preferably, the temperature is less than or equal to 200° C. in order to achieve a uniform optical waveguide.

It has also been found that the amount of decrease in the surface refractive index of the second proton exchange region 6 by an annealing process increases in proportion to the annealing temperature. In order to realize an efficient optical wavelength conversion device, the surface refractive index of the second proton exchange region 6 needs to be increased as much as possible. Specifically, the surface refractive index preferably has a value that is substantially equal to the surface refractive index before the annealing process. However, as the annealing process temperature increases, the refractive index of the surface of the crystal forming the second proton exchange region 6 is reduced. It is believed that this is because the crystalline structure of a proton exchange region varies according to the annealing temperature. A study on the relationship between the annealing temperature and the surface refractive index has shown that the surface refractive index is reduced significantly when the annealing temperature exceeds about 250° C.

In view of the above, the annealing temperature for the second proton exchange region 6 (the temperature of the second annealing process) is preferably set to be less than or equal to 250° C.

A study on the lower limit of the annealing process temperature for the second proton exchange region 6 has shown that when the annealing process temperature is less than or equal to 130° C., there is provided only little change in the refractive index distribution irrespective of how long the second proton exchange region 6 is annealed, whereby it is not possible to obtain the required step-like graded pattern. Therefore, the second annealing process temperature for the second proton exchange region 6 is preferably equal to or greater than 130° C.

In the present embodiment, an X plate MgO:LiNbO$_3$ substrate is used as the substrate 1. Alternatively, any other substrate having a different crystalline orientation such as a Z plate or a 87°-cut Z plate may be used to obtain effects similar to those described above. A substrate in which the crystalline axis and the substrate surface are inclined with respect to each other may be used. Particularly, it has been reported in the art that when using an X plate substrate (a substrate obtained by cutting a crystal along a plane orthogonal to the X axis of the crystal) in which the X axis is inclined by several degrees, it is possible to produce a deeper polarization inverted structure, and thus to produce an optical wavelength conversion device having a higher efficiency.

When using a substrate in which the crystalline axis is inclined, it is important to reduce the propagation loss along an optical waveguide produced by a proton exchange process. It has been found that a substrate in which the crystalline axis is inclined has a propagation loss which is significantly dependent upon the annealing process, whereby the propagation loss increases more easily than a normal X plate. In order to solve this problem, it is preferred to perform an annealing process for the first proton exchange region 5 at a temperature equal to or greater than 300° C. Moreover, as discussed above in the present embodiment, it has been found that it is very effective to anneal the second proton exchange region 6 so as to change the pattern of the proton exchange concentration distribution (refractive index distribution pattern) from a step pattern to a step-like graded pattern.

The substrate 1 is not limited to the Mg-doped LiTaO$_3$ substrate as described above, but may alternatively be a substrate of any other suitable material (nonlinear optical crystal), such as Zn- or In-doped LiTaO$_3$, LiNbO$_3$, LiTaO$_3$, a mixed crystal thereof (e.g., LiNb$_x$Ta$_{1-x}$O$_3$ crystal ($0 \leq x \leq 1$)), or such a mixed crystal doped with Mg, Zn, In, or the like. A proton exchange process can be performed on any of these substrates, and the annealing characteristics of the proton exchange region will be substantially the same, whereby the same effects as those described above can be obtained.

(Embodiment 2)

Next, an optical wavelength conversion device according to Embodiment 2 of the present invention will be described with reference to FIGS. 9A and 9B.

FIG. 9A is a perspective view illustrating an optical wavelength conversion device 60 of the present embodiment, and FIG. 9B is a cross-sectional view illustrating an optical waveguide included therein. FIG. 9B also shows the refractive index distribution along the depth direction.

Referring to FIG. 9A, the stripe-shaped first proton exchange region 5 is provided in the vicinity of the X plate LiNbO$_3$ substrate 1. The second proton exchange region 6 is provided in the vicinity of the surface of the first proton exchange region 5. A plurality of polarization inverted regions 7 for phase matching are provided periodically in the LiNbO$_3$ substrate 1. The first proton exchange region 5 has a width W1 of about 5 μm and a depth D1 of about 2.5 μm, and the second proton exchange region 6 has a depth D2 of about 0.22 μm.

The first proton exchange region 5 is formed by annealing LiNbO$_3$ after a proton exchange process, and has a composition of Li$_{1-x}$H$_x$O$_3$ ($0 \leq x \leq 1$), wherein some Li atoms in the LiNbO$_3$crystal are exchanged with H atoms. Specifically, the first proton exchange region 5 is first formed as a proton exchange region with a depth of about 0.2 μm, followed by an annealing process at 330° C. for 3 hours to expand the depth to 2.5 μm.

The second proton exchange region 6 is similarly formed by a proton exchange process. The second proton exchange region 6 is first formed as a proton exchange region with a depth of about 0.18 μm, followed by an annealing process at 180° C. for 1 hour to expand the depth to 0.22 μm, thereby providing a step-like refractive index distribution.

In the structure of the optical wavelength conversion device 60 obtained as described above, the first proton exchange region 5, which functions as a waveguide section, and the second proton exchange region 6, which functions as a high refractive index cladding layer, have respectively different graded refractive index distribution patterns, as illustrated in FIG. 9B. A fundamental wave having a wavelength of 850 nm in TE00 mode enters the optical wavelength conversion device, and the phase thereof is pseudo-matched with a TE10 mode higher harmonic wave in the optical waveguide.

The principle based on which the optical wavelength conversion device 60 can efficiently convert a fundamental wave to a higher harmonic wave will be described.

In an optical waveguide having a high refractive index layer (the second proton exchange region 6), the overlap between the fundamental wave and the higher harmonic wave increases, thereby increasing the confinement of the light being propagated, and thus allowing for a wavelength conversion with a high efficiency. This is because the electric field distribution of the fundamental wave is attracted by the high refractive index layer toward the surface of the substrate 1, thereby increasing the light confinement into the optical waveguide. Thus, the optical power density also increases. The generated second harmonic wave is not influenced by the increased light confinement into the optical waveguide by the high refractive index cladding layer because a higher TE10 mode is selected as the propagation mode thereof. Thus, it is possible to increase the overlap between the fundamental wave, for which the light confinement is increased, and the second harmonic wave obtained by the wavelength conversion. It is possible to significantly improve the wavelength conversion by the increase in the power density of the fundamental wave and by the increase in the overlap between the fundamental wave and the second harmonic wave.

Moreover, it is possible to significantly improve the optical damage resistance by controlling the second proton exchange region 6, which forms the high refractive index cladding layer, in a step-like graded pattern through an annealing process. As a result, it is possible to stably output a blue light emission of 10 mW or more over a period of time as long as several hundred hours or more. Moreover, the variations in the characteristics of the optical wavelength conversion device over time are eliminated, and the variations in the characteristics were not observed in a shelf test for several tens of thousand hours at room temperature and for several thousand hours under an environment at 60° C.

Thus, it is possible to realize an optical wavelength conversion device which is viable in practical use.

In order to realize operating characteristics (wavelength conversion characteristics) with high efficiencies by the use of a high refractive index cladding structure, the second proton exchange region 6 needs to satisfy conditions such that the fundamental wave propagating through the optical waveguide (the first proton exchange region 5) is cut off, while the second harmonic wave can be propagated therethrough. Since the fundamental wave is cut off in the second proton exchange region 6, the fundamental wave can propagate through the waveguide section (the first proton exchange region 5). Moreover, under conditions such that a higher harmonic wave can propagate through the high refractive index layer (the second proton exchange region 6), the higher guide mode of the higher harmonic wave can be used for an efficient wavelength conversion.

In view of the focusing characteristics, it is required to satisfy a predetermined relationship in refractive index between the high refractive index layer (the second proton exchange region 6) and the waveguide section (the first proton exchange region 5).

When focusing propagated light having a sub peak by using a lens system, the focusing characteristics deteriorate depending upon the magnitude of the sub peak. In order to obtain a focused spot as a single spot and obtain a focused spot having a size that is less than or equal to the diffraction limit, it is necessary to reduce the sub peak of the guide mode to be less than or equal to the diffraction limit of the focusing lens. The width of the sub peak is defined by the width of the high refractive index layer (the second proton exchange region 6) and the high refractive index thereof. In practice, the width of the sub peak is substantially equal to the depth of the high refractive index layer. Therefore, in order to suppress the width of the sub peak to be less than or equal to the diffraction limit, the depth D2 of the high refractive index layer (the second proton exchange region 6) needs to be suppressed to be less than or equal to the diffraction limit of the higher harmonic wave. Thus, the expansion of the depth D2 of the second proton exchange region 6 due to the annealing process needs to be suppressed to remain less than or equal to twice as much as the value before the annealing process.

When the depth D2 of the second proton exchange region 6 was about 0.5 $\mu$m, the focusing characteristics were significantly improved. When D2<0.4 $\mu$m, a focusing characteristic (the spot size) less than or equal to the diffraction limit was obtained. Assuming the aperture ratio NA of the focusing lens is 1 and the wavelength is 425 nm, the diffraction limit can be calculated to be about 0.34 $\mu$m. Thus, an emitted beam having desirable characteristics can be obtained when the depth D2 of the second proton exchange region 6 is smaller than the diffraction limit.

In the present embodiment, an X plate substrate is used as the substrate 1. Alternatively, the substrate 1 may be a Y plate substrate, a Z plate substrate, or a substrate in which the crystalline axis is inclined from the substrate surface. For example, the use of a Z plate substrate or a substrate in which the crystalline axis is inclined from the substrate surface may be desirable, because it allows for a deep polarization inverted structure to be formed easily, thereby improving the efficiency.

In the present embodiment, a TE mode polarization direction is used in order to match the polarization direction of light emitted from an ordinary semiconductor laser device with the polarization direction of the optical waveguide. By employing an optical waveguide having the same polarization direction as that of the semiconductor laser device, it is possible to couple an optical waveguide to another optical waveguide with reduced loss. Alternatively, it is possible to use an optical waveguide of a TM mode polarization. When using an optical waveguide of a TM mode polarization, it is possible to reduce the coupling loss by controlling the polarization direction with a $\lambda/2$ plate.

An optical wavelength conversion device using an optical waveguide has been described above in the present embodiment. However, the optical waveguide of the present invention can also be used effectively with any other optical waveguide device. By forming a high refractive index layer (the second proton exchange region 6) on the optical waveguide (the first proton exchange region 5), the electric field distribution of the light being propagated through the optical waveguide is strongly attracted toward the surface, whereby the influence of a planar electrode or a grating element formed on the optical waveguide can be strongly imparted to the light being propagated. Thus, it is possible to obtain efficient modulation and diffraction effects.

(Embodiment 3)

In the present embodiment, the structure of another optical wavelength conversion device will be described.

The optical wavelength conversion device of the present invention includes a plurality of polarization inverted regions provided periodically and an optical waveguide on an X plate MgO:LiNbO$_3$ substrate. The MgO:LiNbO$_3$ substrate is a substrate obtained by cutting a crystal so that the Z axis of the crystal is inclined by 3° with respect to the surface of the substrate. When using such a substrate in which the crystalline axis is inclined, it is possible to provide a deep polarization inverted structure, whereby it is possible to provide an optical wavelength conversion device having a high efficiency. This is because the polarization inverted structure is formed along the Z axis from the surface of the substrate into the substrate.

In the present embodiment, an optical wavelength conversion device is provided by utilizing this phenomenon. In the resultant optical wavelength conversion device, the polarization inverted regions are formed in the substrate. The polarization inverted regions are provided such that there is a periodic polarization inverted structure extending from a portion of the surface near the boundary between the first proton exchange region and the second proton exchange region into the substrate, and there is no polarization inverted structure in the second proton exchange region. Thus, it is possible to increase the efficiency of the wavelength conversion operation of the optical wavelength conversion device.

The wavelength conversion efficiency of an optical wavelength conversion device is dependent upon the amount of overlap between the fundamental wave and the higher harmonic wave propagating through the polarization inverted structure and the optical waveguide, respectively. However, a higher guide mode (TE10 mode) is typically employed for the higher harmonic wave for higher efficiency, whereby the electric field distribution of the higher harmonic wave is such that the electric field strength phase of the higher harmonic wave is inverted at the boundary between the high refractive index layer (the second proton exchange region 6) and the optical waveguide section (the first proton exchange region 5). Thus, the electric field strength of the higher harmonic wave is 0 at the boundary between the second proton exchange region 6, which forms the high refractive index cladding layer, and the first proton exchange region 5, which forms the waveguide section. When the strength of the higher harmonic wave rapidly changes at the boundary, there is produced a power distribution in the higher harmonic wave, thereby causing optical damages. In order to avoid this, it is effective to expand the distribution at the boundary by annealing the second proton exchange region 6 to provide a graded pattern.

The optical waveguide (the first proton exchange region 5) formed in the periodic polarization inverted structure has a higher propagation loss than that of the optical waveguide which is formed on the substrate without a polarization inverted structure. It is believed that this is because an internal electric field is generated when forming the periodic polarization inverted structure by an applied electric field, thereby causing a change in the high refractive index in the polarization inverted section. Thus, the optical waveguide is influenced by the periodic change in the refractive index due to the polarization inverted structure, thereby increasing the propagation loss.

In order to reduce the propagation loss in the polarization inverted structure, a study was made on how to remove the internal electric field in the polarization inverted structure 7 so as to reduce the change in the refractive index.

The internal electric field is generated when an electric charge is trapped at an impurity level. Thus, an attempt was made to excite the impurity level, which forms the internal electric field, by performing a heat treatment so as to discharge the electric charge, thereby reducing the internal electric field. Specifically, the polarization inverted structure 7 was subjected to a heat treatment before forming the optical waveguide (the first proton exchange region 5). As a result, it was found that the internal electric field can be reduced by performing a heat treatment at a high temperature.

The change in the propagation loss along the optical waveguide was observed after performing a heat treatment at various temperatures. When the heat treatment temperature was less than or equal to 350° C., there was substantially no change in the propagation loss, and it was found that a heat treatment at 400° C. or more is necessary to reduce the propagation loss. Over 400° C., the propagation loss was reduced in proportion to the heat treatment time. A heat treatment at 500° C. or more is preferred in order to completely eliminate the change in the refractive index. However, it was found that with an LiNbO$_3$ substrate or an MgO:LiNbO$_3$ substrate, if the heat treatment temperature exceeds 800° C., the polarization inverted structure shrinks, thereby reducing the thickness of the polarization inverted structure, and thus deteriorating the characteristics of the optical wavelength conversion device.

Thus, it was found that a temperature of 400° C. to 800° C. is preferred for the annealing process on the polarization inverted structure which is performed for the above-described purposes, and that a temperature of 500° C. to 800° C. is more preferred in order to further reduce the propagation loss along the optical waveguide.

In a structure having a high refractive index cladding layer, the confinement of the fundamental wave is increased, thereby increasing the occurrence of propagation losses due to the change in the refractive index. Particularly, the overlap between the fundamental wave and the higher harmonic wave in the area of the high refractive index layer (the second proton exchange region 6) reduces the efficiency of the conversion into a higher harmonic wave. In order to avoid this, it is necessary to ensure that the overlap between the fundamental wave and the higher harmonic wave in the high refractive index layer does not influence the wavelength conversion.

Thus, it is possible to eliminate the periodic polarization inverted structure in the second proton exchange region 6 so that the phase matching condition in the high refractive index layer can be selectively controlled so that the phase matching condition does not hold. Thus, it is possible to increase the efficiency of the optical wavelength conversion device.

While the present embodiment employs a crystal in which the crystalline axis is inclined by 3°, any other crystal may alternatively be used as long as the crystalline axis inclination is less than or equal to about 10°, whereby it is possible to produce a deep polarization inverted structure. Particularly, crystals in which the crystalline axis inclination is 3° to 0.5° may be preferred because the polarization inverted structure will then have a small inclination, thereby increasing the area to be used.

(Embodiment 4)

In the present embodiment, a short wavelength light generation apparatus (a short wavelength light source) which uses an optical wavelength conversion device of the present invention will be described with reference to the accompanying drawings.

FIG. 12 illustrates the structure of a short wavelength light generation apparatus 400 of the present embodiment.

The short wavelength light generation apparatus 400 includes a semiconductor laser device 421 and a light wavelength conversion device 422. A fundamental wave P1 is emitted from an emission region 423 of the semiconductor laser device 421, and enters an optical waveguide 402 (the first proton exchange region) formed in the light wavelength conversion device 422. A second proton exchange region 403 is formed on the surface of the optical waveguide 402. Each of these components is fixed to an Si mount 420.

The fundamental wave P1 enters the light wavelength conversion device 422, propagates therethrough in TE00 mode, and is converted into an optical wave P2 of TE10 mode, which is a higher mode of a higher harmonic wave. The higher harmonic wave P2 which is emitted from the light wavelength conversion device 422 is used as a short wavelength laser beam.

Herein, attention should be drawn to the mode profile of the TE10 mode of the higher harmonic wave P2 which propagates through the optical waveguide 402 of the light wavelength conversion device 422. TE10 mode is a higher guide mode, and thus has two peaks in its intensity distribution. The larger peak of the two peaks will be referred to as a main peak and the other smaller peak will be referred to as a sub peak.

Typically, TE10 mode having a sub peak results in a focused spot having substantially the same sub peak as that of the guide mode which is focused by a focusing optical system, and thus is problematic when it is used as focused light having a single peak near the diffraction limit. The present inventors have discovered a novel method for substantially eliminating the sub peak which is problematic when focusing the higher harmonic wave P2. By the novel method, the width of the sub peak in a guide mode can be reduced to a sufficiently small value with respect to the diffraction limit of the focusing optical system. Specifically, by suppressing the width of the sub peak to a width less than or equal to the resolution of the focusing optical system, it is possible to eliminate the influence of the sub peak on the focused spot.

An experiment was conducted in which a higher harmonic wave with a wavelength of 425 nm was focused by using a focusing lens having an aperture ratio NA of 0.95. The diffraction limit of light in air is about 0.34 μm. The optical waveguide 402 of the light wavelength conversion device 422 was designed so that the width of the sub peak is 0.32

μm or less. Then, no sub peak was observed in the resultant focused spot. Thus, it was found that a higher guide mode having a sub peak does not influence the focused spot and thus can be used effectively, if the width of the sub peak is less than or equal to about the diffraction limit of light in air (0.8·λ/NA). Thus, it was possible to improve the efficiency of the output, which is reduced by a beam shaping process, to be equal to or greater than 80%.

It was also found that when propagated light having a sub peak of a width less than or equal to the diffraction limit is used, there is provided a super-resolution effect with which it is possible to focus a light beam to a spot size less than or equal to the diffraction limit of the lens. When TE00 mode light was focused, a width of the focused beam close to the diffraction limit of the lens (0.8·λ/NA) was obtained. It was found that when a higher TE10 mode light having a sub peak is focused, the beam shape on the sub peak side has a sharp pattern, whereby the light can be focused to a level such that the width of the focused spot is about 90% of the diffraction limit, thereby providing the super-resolution effect. It was found in an experiment that the width of the focused spot is reduced to be smaller than the diffraction limit (0.8·λ/NA) of the lens used (aperture ratio: NA) when the width of the sub peak is reduced to be less than or equal to the diffraction limit of light in air (about 0.8λ). Thus, it is possible to obtain a smaller focused spot by focusing a guide mode having a sub peak with a width less than or equal to the diffraction limit.

More detailed studies on the relationship between the sub peak width W and the focused spot have shown the following.

(1) When $W<0.8\times\lambda$,
   a focusing characteristic (super-resolution effect) less than or equal to the diffraction limit is obtained.
(2) When $0.8\times\lambda\times(1+0.2(1/NA-1))\leq W<0.8\times\lambda\times(1+0.5(1/NA-1))$,
   a focused spot substantially equal to the diffraction limit, with no deterioration in the focusing characteristic due to the sub peak is observed.
(3) When $W<0.8\times\lambda\times(1+0.7(1/NA-1))$,
   a a sub peak appears in the focused spot, deteriorating the focusing characteristics.

Thus, in order to prevent the deterioration in the focusing characteristics due to a sub peak, it is preferred to suppress the width of the sub peak to be less than or equal to about $0.8\times\lambda\times(1+0.5(1/NA-1))$. Moreover, it is very effective to design the optical waveguide such that the sub peak width is less than or equal to $0.8\times\lambda$, whereby it is possible to obtain a focused spot which is smaller than the diffraction limit of the focusing lens. When the width of the focused spot is greater than the diffraction limit (0.8×λ/NA) of the lens used, the focused spot has substantially the same shape as that of the guide mode, whereby there is provided a two-peak focused spot having a sub peak, and a single-peak focused spot is not obtained.

The size of the sub peak of the light being propagated is dependent upon the refractive index and the depth of the second proton exchange region 6 so that as the depth of the second proton exchange region 6 increases, the sub peak width also increases. As the surface refractive index of the second proton exchange region 6 decreases, the difference between the refractive index of the second proton exchange region 6 and that of the first proton exchange region 5 decreases, thereby increasing the sub peak width. When an annealing process is performed to control the second proton exchange region 6 to have a step-like graded pattern, the focusing characteristics of the light being propagated deteriorate as described above unless the increase in the sub peak width is limited. In order to prevent the focusing characteristics from deteriorating, it is preferred to prevent the surface refractive index of the second proton exchange region 6 from being reduced by the annealing process. It has also been found that it is more preferable to suppress the expansion (the increase in the depth) of the second proton exchange region 6 by the second annealing process to be 1.8 or less with respect to the depth before annealing.

In the short wavelength light source of the present embodiment, the fundamental wave P1 is converted into the higher harmonic wave P2 while converting the mode of the wave to a higher mode having a sub peak of a width less than or equal to the diffraction limit. Alternatively, propagated light having a sub peak can be focused to obtain substantially the same effects. For example, a periodic grating structure can be provided on the optical waveguide so as to convert TE00 mode light into TE10 mode light and to focus the TE10 mode light, whereby it is possible to obtain a focused spot having a size less than or equal to the diffraction limit by the super-resolution effect.

In the example described above, TE10 mode light having a single sub peak is used. Alternatively, a higher guide mode can be used to obtain substantially the same effects as long as the sub peak width is equal to the diffraction limit. For example, the use of TE20 mode having a sub peak on each side of its main peak may be effective because the super-resolution effect is then further increased, thereby obtaining a small spot diameter. Alternatively, TE01 mode or TE02 mode, which has a sub peak along the width direction instead of the depth direction, or TE11 mode or TE22 mode, which has a sub peak along both the width and depth directions, may be used effectively because it is then possible to obtain a smaller focused spot size.

In the example described above, TE modes are employed. Alternatively, TM modes may be employed to obtain substantially the same effect.

(Embodiment 5)

In the present embodiment, another short wavelength generation apparatus (short wavelength light source) 15 using the optical wavelength conversion device of the present invention will be described with reference to FIG. 13.

With the optical wavelength conversion device having the structure described above in the previous embodiments, it is possible to realize an efficient and stable optical wavelength conversion device. Attempts have been made to produce a short wavelength light source using such an optical wavelength conversion device. As illustrated in FIG. 13, the short wavelength generation apparatus 15 includes a semiconductor laser device 21 whose wavelength is in an 800 nm band, focusing optical systems 24 and 25, and an optical wavelength conversion device 22. These elements 21, 24, 25 and 22 are mounted on a supporting member 20 having an appropriate shape.

With such a structure, light P1 emitted from the semiconductor laser device 21 is focused onto an edge surface of the optical waveguide 2 of the optical wavelength conversion device 22 via the focusing optical systems 24 and 25, and the guide mode is excited. Then, second harmonic generation (SHG) light P2 is obtained by wavelength conversion and is output through the opposite edge surface of the optical waveguide 2 of the optical wavelength conversion device 22.

As described above, the optical wavelength conversion device 22 with a high wavelength conversion efficiency has been realized by the present invention, whereby blue SHG light P2 of 20 mW is obtained by using the semiconductor laser device 21 which has an output of about 100 mW. Moreover, the optical wavelength conversion device 22 used herein has a desirable optical damage resistance and can produce a stable output. Thus, it is possible to suppress the output variations within 2% or less, and to obtain a stable output. The 400 nm band wavelength which is obtained by the short wavelength light source 15 is desirable for a wide variety of technical fields such as plate-making, bioengineering, special measurement such as fluorescence spectrometry, or the optical disk field. The short wavelength light source of the present embodiment using the optical wavelength conversion device of the present invention satisfies the requirements of these technical fields in view of both the output characteristics and the stability.

In the structure illustrated in FIG. 13, light P1 from the semiconductor laser device 21 is coupled to the optical waveguide 2 of the optical wavelength conversion device 22 by using the focusing optical systems 24 and 25. Alternatively, the semiconductor laser device 21 and the optical waveguide 2 (optical wavelength conversion device 22) can be coupled directly with each other. For example, by using an optical waveguide which allows for propagation of TE mode light therethrough, the guide mode of the semiconductor laser device can be equal to the electric field distribution of light being propagated, whereby it is possible to realize an efficient coupling without using a focusing lens. It was confirmed in an experiment that it is possible to realize a direct coupling with a coupling efficiency of 80%, i.e., substantially the same coupling characteristics as those of a coupling via a lens. The use of a direct coupling may be desirable because it is then possible to realize a small and inexpensive short wavelength light source.

(Embodiment 6)

In the present embodiment, an optical information processing apparatus of the present invention will be described with reference to FIG. 14.

FIG. 14 illustrates a structure of an optical information processing apparatus 500 according to the present embodiment, which has a short wavelength light generation apparatus (short wavelength light source) 520 including a semiconductor laser device 521 and an optical wavelength conversion device 522 as those described in Embodiment 5 above. A beam P1 having an output of 10 mW emitted from the short wavelength light generation apparatus (short wavelength light source) 520 is collimated by a collimator lens 540, passes through a beam splitter 541, and is illuminated through a lens 542 onto an optical disk 543 as an information reproduction medium. The reflected light from the optical disk 543 is collimated by the lens 542, reflected by the beam splitter 541 toward a detector 545, and focused by a lens 544 onto the detector 545. The detector 545 reads signals from the focused light.

By modulating the intensity of the output from the short wavelength light generation apparatus 520, it is possible to write information on the optical disk 543. While TE10 mode light with a sub peak is output from the short wavelength light generation apparatus 520, the output light can be focused to obtain a focused beam having a small spot diameter which is less than or equal to the diffraction limit of the lens 542. Thus, it is possible to obtain a small spot diameter by virtue of the super-resolution effect in addition to the focusing characteristics inherent to the short wavelength light. Thus, it is possible to increase the recording density by a factor of 1.2 from that in the prior art.

As described above, the optical wavelength conversion device of the present invention has a desirable optical damage resistance and is capable of producing high output blue light. Therefore, the optical wavelength conversion device can be used not only in a read (reproduction) operation for reading information from an optical disk but also in a write operation for writing information onto an optical disk. Moreover, the characteristics of the optical wavelength conversion device do not deteriorate even in a high temperature test over a long period of time. Thus, it is possible to improve the temperature characteristics of an optical information processing apparatus. Moreover, by using a semiconductor laser as a light source for a fundamental wave, it is possible to significantly reduce the overall apparatus size, thereby enabling its applications in small consumer optical disk reproduction/recording apparatuses.

(Embodiment 7)

FIG. 15 is a perspective view illustrating a structure of an optical wavelength conversion device 100 according to Embodiment 7. The optical wavelength conversion device 100 includes an MgO:LiNbO$_3$ (lithium niobate doped with magnesium) substrate 101, and a number (e.g., four) of parallel polarization inverted regions 102 which are arranged at regular intervals in the vicinity of the surface of the substrate 101, thereby providing a periodic polarization inverted structure. In the vicinity of the surface of the substrate 101, there is also provided a group of optical waveguides 103 including, for example, three optical waveguides 103a, 103b and 103c, which are arranged in a direction to cross the polarization inverted regions 102 (perpendicular in the illustrated example). A fundamental wave 104 enters the optical waveguide group 103, and propagates through the optical waveguide group 103 while it is converted into a higher harmonic wave or sum frequency wave 105 in the optical waveguides 103a, 103b and 103c. Then, the converted wave 105 is output through an output section located opposite to an input section of the optical wavelength conversion device 100.

The optical wavelength conversion device 100 can be produced by, for example, the method described below. First, a comb-shaped electrode pattern is formed on a substrate, and a high voltage is applied therethrough so as to provide a periodic polarization inverted structure whose polarization is partially inverted. Then, a stripe-shaped mask pattern for optical waveguide formation is provided, after which the substrate is processed in an acidic solution so as to effect proton exchange to provide an optical waveguide.

With the optical wavelength conversion device 100 of the present embodiment having such a structure, it is possible to reduce the absorption loss along the optical waveguide and thus to improve the optical damage resistance. Thus, it is possible to effect an efficient wavelength conversion on a fundamental wave. Moreover, it is also possible to improve the focusing characteristics of the converted light. In the following description, the improvement of the optical damage resistance will be described first.

One possible cause of optical damages is the optically-induced refractive index variations due to the generated higher harmonic wave or sum frequency wave. The optically-induced refractive index variations are dependent upon the optical absorptivity of the optical waveguide. When an optical waveguide is produced through a proton exchange process, it is possible to reduce the optical absorption by performing an annealing process after a proton exchange process. However, the substrate surface may be chemically damaged by the initial proton exchange, whereby light is easily scattered and/or absorbed in the vicinity of the surface. Therefore, it is preferred to reduce the area across which the initial proton exchange is effected.

However, when the width of the optical waveguide is reduced in order to reduce the area of proton exchange, a fundamental wave is likely to be cut off, whereby it is not possible to obtain, in the optical waveguide, conditions such that the overlap between the fundamental wave and the higher harmonic wave or sum frequency wave is optimized. In an experiment conducted by the present inventors, when converting, for example, a fundamental wave having a wavelength of 850 nm into a second harmonic wave having a wavelength of 425 nm, the optimal optical waveguide width was about 4 µm to about 6 µm, and the conversion efficiency was reduced significantly when the optical waveguide width was less than or equal to 3 µm. Thus, by using the optical waveguide group including a plurality of optical waveguides as in the present embodiment, it is possible to freely design the width of the optical waveguide and the optical waveguide group and to reduce the area of proton exchange.

The chemical damages from the proton exchange process increase in proportion to the volume of proton exchange. This occurs due to a crystalline strain, and as the volume of proton exchange increases, a crack is introduced into the crystal surface depending upon the size of the strain. In order to avoid this, an optical waveguide can be divided into a plurality of optical waveguides so as to provide an optical waveguide group, thereby reducing the area and volume of proton exchange, and to significantly reduce the chemical damages to the crystal.

In the present embodiment, the optical waveguide 103b having a width of 1.4 µm is provided along the center line of the substrate 101, with the optical Waveguides 103a and 103a with a width of 1 µm being provided on the respective sides of the optical waveguide 103b with a 1 µm interval therebetween. Thus, the fundamental wave 104 having a wavelength of 850 nm is cut off for the individual optical waveguide width, and can be propagated in a single mode through the optical waveguides 103a, 103b and 103c as a single optical waveguide. Moreover, it is possible to significantly reduce the area of proton exchange so as to realize a reduction in the propagation loss along the optical waveguide by a factor of about 2, i.e., from 1.5 dB/cm to 0.8 dB/cm. As a result, it is possible to reduce the optical absorption in the optical waveguide, and to significantly increase the optical damage resistance, i.e., by a factor of about 2.

Next, the improvement in the conversion efficiency from a fundamental wave into a higher harmonic wave or sum frequency wave will be described. In the following description, a case where a second harmonic wave or a sum frequency wave is generated will be discussed.

When generating a second harmonic wave, a higher harmonic wave having a wavelength of λ/2 is generated for a fundamental wave having a wavelength of λ. When generating a sum frequency wave, a higher harmonic wave having a wavelength of λ3 is generated from light having a wavelength of λ1 and light having a wavelength of λ2. In either case, the wavelength of the fundamental wave is longer than that of the converted light. In these cases, the optical waveguide group is required to allow for single mode propagation of a fundamental wave through a combination of a plurality of optical waveguides. For example, when the optical waveguide group includes three optical waveguides, it is necessary to design the optical waveguides so that each optical waveguide or a combination of two optical waveguides does not allow for propagation of the fundamental wave. When the optical waveguide group does not allow for single mode propagation of the fundamental wave, the waveguide condition for the fundamental wave may change during propagation, whereby it is difficult to stably effect a wavelength conversion. Thus, the fundamental wave propagates though the group of optical waveguides 103 as a single optical waveguide with a single mode electric field distribution, as illustrated in FIG. 16A. In contrast, the converted wave, e.g., a higher harmonic wave or a sum frequency wave propagates with a guide mode electric field distribution in which the converted wave propagates selectively through the center optical waveguide 103b, as illustrated in FIG. 16B.

Therefore, in the present embodiment, the optical waveguide is designed so that:

the fundamental wave propagates through the optical waveguide group in a single mode; and the converted light propagates through the optical waveguides.

Thus, it is controlled so that the phase matching condition holds between the fundamental wave and the converted wave which have different propagation states. The guide mode of the higher harmonic wave or sum frequency wave can be realized by, for example, controlling the wavelength of the fundamental wave.

By using an optical waveguide having such a structure, it is possible to realize an optical wavelength conversion device capable of effecting an efficient wavelength conversion, for the following reasons. First, it is possible to significantly increase the amount of overlap between the electric field distribution of the fundamental wave and that of the converted light. In the prior art, it is difficult to independently control the electric field distribution of the guide mode of the fundamental wave and that of the guide mode of the higher harmonic wave. In contrast, according to the present embodiment, it is possible to control the propagation mode of the fundamental wave with the optical waveguide group while controlling the propagation mode of the converted light, e.g., a higher harmonic wave or a sum frequency wave, with the individual optical waveguides of the optical waveguide group. As a result, it is possible to increase the amount of overlap between the fundamental wave and the converted light. The second reason is the increased light confinement of the converted light, e.g., a higher harmonic wave or a sum frequency wave. With a conventional optical waveguide allowing for propagation of a fundamental wave, a higher harmonic wave is propagated in a multiple mode, whereby it is difficult to sufficiently confine the higher harmonic wave. In contrast, with an optical waveguide structure as that of the present embodiment, the converted light can also propagate through the optical waveguide in a single mode. Therefore, it is possible to significantly improve the power density of a higher harmonic wave or a sum frequency wave. Thus, it is possible to dramatically improve the conversion efficiency by the increase in the amount of overlap between the electric field distribution of the fundamental wave and that of the converted light and the improvement in the light confinement of a higher harmonic wave or a sum frequency wave.

Another feature of the present embodiment, i.e., the improvement of the focusing characteristics of the converted light, will be described. With a conventional optical waveguide, a higher harmonic wave is propagated in a multiple mode, whereby the aspect ratio of the output beam of the higher harmonic wave is equal to or greater than 1:3. In order to focus such output light, it is necessary to effect a beam shaping process so as to control the aspect ratio of the beam to be closer to 1:1. In contrast, with an optical waveguide structure as that of the present embodiment, converted light can be propagated therethrough in a single mode, whereby it is possible to suppress the lateral spread of the output beam and to improve the aspect ratio of the output beam to 1:1.5. Thus, it is possible to significantly improve the focusing characteristics.

In order to further improve the focusing characteristics, a structure such as that illustrated in FIG. 17 is effective. In this structure, the number of optical waveguides provided in the optical waveguide group 103 of the optical wavelength conversion device is reduced to one in the vicinity of an output section 107. The optical waveguide 103b alone cuts off the fundamental wave 104, whereby the fundamental wave 104 is in a radiation mode, and is radiated in the vicinity of the output section 107. Thus, there is an advantage that the output beam is not mixed with the fundamental wave component. Moreover, it is possible to solve the problem that the fundamental wave output from the output edge returns to the light source, thereby making the output of the light source unstable. Moreover, by reducing the number of optical waveguides to one in the vicinity of the output section 107, it is possible to improve the aspect ratio of the output beam to 1:1.3.

The present inventors further conducted an experiment to study the optical waveguide structure of the present embodiment, and found that care should be taken with respect to the following points.

First, care should be taken with respect to the propagation characteristics of each optical waveguide of the optical waveguide group. When the individual optical waveguides all have an equal propagation constant ($=(2\pi/\lambda) \times N$, wherein $\lambda$ is the wavelength, and N is the effective refractive index for $\lambda$), the phase matching wavelength of the fundamental wave propagating through the optical waveguide group coincides with that of a higher harmonic wave or a sum frequency wave propagating through the individual optical waveguides. Therefore, it is difficult to selectively generate a higher harmonic wave or a sum frequency wave which propagates through a particular optical waveguide, whereby the conversion efficiency is reduced and the output higher harmonic wave or sum frequency wave has a multiple beam output pattern. When the optical waveguides have propagation constants close to each other, a coupling between the optical waveguides occurs, whereby a higher harmonic wave or a sum frequency wave propagating through one optical waveguide transfers onto another optical waveguide. In such a case, the light propagation state may change, thereby making the output light unstable. Thus, it is preferred that the propagation constant of an optical waveguide which is intended to generate a higher harmonic wave or a sum frequency wave is substantially different from that of another optical waveguide. In order to solve this problem, it is necessary to design the optical waveguides so that different optical waveguides have different propagation constants. For example, when the optical waveguide group includes three optical waveguides, as in the present embodiment, the optical waveguides are preferably designed so that the propagation constant of the center optical waveguide and that of the side optical waveguides differ from each other by about 0.1%. For example, by varying the width, the refractive index or the depth of the optical waveguides, it is possible to easily provide optical waveguides having different propagation constants.

Second, it has been found that it is necessary to provide a sufficient interval between the optical waveguides of the optical waveguide group. The optical waveguides are typically formed by a method such as a proton exchange method or a metal diffusion method. With any method, the optical waveguides are formed by diffusing protons or metal into the substrate. Therefore, while the optical waveguide pattern can be formed by a photolithography method, adjacent optical waveguides may thereafter contact each other as the diffusion into the substrate is effected. The present inventors employed several values for the interval between two optical waveguides, and found that two adjacent optical waveguides are completely integrated into one optical waveguide for interval values of 0.5 $\mu$m or less and that it is preferable to set the interval between two optical waveguides to 0.8 $\mu$m or more.

As described above, the optical wavelength conversion device of the present embodiment provides the following effects:

The optical damage resistance is improved by the reduction in the chemical damages to the surface;

it is possible to reduce the propagation loss along the optical waveguide;

the conversion efficiency is improved by improving the amount of overlap between different guide modes; and the beam shape of the output light can be optimized, whereby the focusing characteristics are improved.

In order to realize a high conversion efficiency, the arrangement of the group of optical waveguides is preferably symmetric with respect to the center optical waveguide and the number of optical waveguides of the optical waveguide group is an odd number. The symmetric arrangement of the optical waveguides with respect to the center optical waveguide is preferred because the propagation mode of light being propagated (including converted light and the fundamental wave) will then be symmetric. When the propagation mode of light being propagated is in linear asymmetry, the beam shape of the output light is also asymmetric, thereby deteriorating the focusing characteristics. Moreover, the asymmetry of the fundamental wave and the asymmetry of converted light are different from each other, thereby reducing the amount of overlap and thus the conversion efficiency. The number of optical waveguides of the optical waveguide group is preferably an odd number because it is then possible to obtain a high conversion efficiency where a higher harmonic wave or a sum frequency wave is generated in the center optical waveguide of the optical waveguide group. The amount of overlap between the fundamental wave propagating through the optical waveguide group and converted light propagating through the optical waveguides is maximized when a higher harmonic wave or a sum frequency wave propagates through the center optical waveguide of the optical waveguide group. This is because a high power density portion is localized along the center optical waveguide for both the fundamental wave and the converted light. Thus, the highest conversion efficiency can be obtained when providing an odd number of optical waveguides so that the light obtained by converting the fundamental wave is propagated through the optical waveguide around the center line of the optical wavelength structure.

Moreover, the width of each optical waveguide or the interval between two optical waveguides can be gradually changed with respect to the light propagation direction, thereby providing a plurality of optical waveguides having different propagation directions. Thus, it is possible to employ a tapered optical waveguide structure as illustrated in FIGS. 18A and 18B (where the optical waveguide structure is tapered along the propagation direction) or an optical waveguide structure in which the propagation constant has a distribution along the propagation direction. Thus, when the optical waveguide structure is provided with a distribution along the propagation direction, it is possible to provide an optical waveguide structure in which the phase matching wavelength has a distribution with respect to the propagation direction. Therefore, in an optical wavelength conversion device, for example, it is possible to realize a structure in which the phase matching wavelength tolerance is increased. In an optical wavelength conversion device utilizing a nonlinear optical effect, it is necessary to precisely control the phase matching condition because the phase matching wavelength tolerance is narrow. Therefore, it is very effective to provide the propagation constant of the optical waveguide with a distribution so as to increase the phase matching wavelength tolerance, thereby relaxing the phase matching condition and thus realizing stable output characteristics.

In the present embodiment and Embodiment 8 to be described below, the optical waveguide can be effectively produced by a proton exchange process, with which it is possible to improve the optical damage resistance. Alternatively, the optical waveguide can be produced through a metal diffusion process such as Ti diffusion, Zn diffusion, In diffusion or Sc diffusion. The problem of substrate surface roughening should be addressed for various optical waveguide formation processes to be employed, including a metal diffusion process, with which the optical damage resistance may be reduced by such surface roughening. Such surface roughening increases in proportion to the diffusion area. Therefore, by reducing the area across which metal is diffused, it is possible to significantly reduce the surface roughening and to reduce the area across which the surface is roughened. Thus, it is possible to reduce the optical absorption, which may cause optical damages, thereby significantly improving the optical damage resistance.

The optical wavelength conversion device of the present invention can also be used in an optical waveguide structure for generating a difference frequency wave, a parametric wave, or the like. In such a case, the fundamental wave has a wavelength shorter than that of light to be generated, and the design of the optical waveguide will be the main concern. When generating a difference frequency wave or a parametric wave, the optical waveguide needs to have a structure such that the fundamental wave and the converted light can both propagate therethrough. However, an optical waveguide satisfying such a condition will be a multiple mode for the fundamental wave. Therefore, the fundamental wave excited by the optical waveguide propagates in several separate propagation modes (multiple mode), thereby dispersing the power and significantly reducing the conversion efficiency. In view of this, an example where the present invention is applied to an optical wavelength conversion device for generating a parametric wave will be described in Embodiment 8 below.

(Embodiment 8)

FIG. 19 is a perspective view illustrating the structure of an optical wavelength conversion device 110 according to Embodiment 8 of the present invention. The optical wavelength conversion device 110 includes the MgO:LiNbO$_3$ substrate 101, and a periodic polarization inverted structure provided in the vicinity of the surface of the substrate 101, which is similar to that of Embodiment 7 but has a different interval. In the vicinity of the surface of the substrate 101, there is also provided a group of optical waveguides 103 including, for example, three optical waveguides 103a, 103b and 103c, which are arranged in a direction to cross the polarization inverted regions 102 (perpendicular in the illustrated example). Only one optical waveguide 103b is provided in the vicinity of the input section, with the other optical waveguides 103a and 103c extending from a certain point on the surface of the substrate 101 along the propagation direction. The fundamental wave 104 enters the optical waveguide 103b, propagates through the optical waveguide 103b, and is converted into a parametric or difference frequency wave 105a. The parametric or difference frequency wave 105a is output through an output section located opposite to the input section of the optical wavelength conversion device 110. The optical wavelength conversion device 110 can be produced in a manner similar to that of Embodiment 7.

Next, the operating principle of the optical wavelength conversion device 110 of the present embodiment will be described. In this optical wavelength conversion device 110, the fundamental wave 104 is excited in the optical waveguide 103b and converted into the parametric or difference frequency wave 105a which propagates through the optical waveguide group 103. The optical waveguide group 103 is designed so that the propagation constant of the optical waveguide 103b is different from that of the other optical waveguides 103a and 103a so that the fundamental wave excited in the optical waveguide 103b will not propagate through the optical waveguides 103a and 103c. For example, the difference in the propagation constant between the respective optical waveguides can easily be provided by changing the width of the optical waveguides. In the present embodiment, the optical waveguide 103b having a width of 1.4 $\mu$m is provided along the center line of the substrate 101, with the optical waveguides 103a and 103c with a width of 1 $\mu$m being provided on the respective sides of the optical waveguide 103b with a 1 $\mu$m interval. Thus, the fundamental wave can propagate in a single mode through the optical waveguide 103b, and can be converted in the optical waveguide group 103 into a parametric or difference frequency wave propagating therethrough. It is possible to provide phase matching between the fundamental wave and the parametric or difference frequency wave, both of which propagate through the optical waveguide in a single mode, whereby it is possible to efficiently generate a parametric or difference frequency wave. Moreover, in the present embodiment, it is possible to reduce the area of proton exchange as in Embodiment 7, thereby reducing the chemical damages to the surface of the structure and improving the optical damage resistance. In the present embodiment, the optical waveguides 103a and 103a are not provided in the vicinity of the input section so that when exciting the fundamental wave in the optical waveguide 103b, the light can be prevented from being excited and transferred into an adjacent optical waveguide.

Moreover, by providing the optical waveguide group including a plurality of optical waveguides in the vicinity of the input section and the output section of the optical waveguide structure, it is possible to improve the coupling efficiency of the optical waveguide, and to shape the output beam. In such a case, an optical waveguide group can be provided in the vicinity of the input section and the output section to be connected to a single optical waveguide, whereby it is possible to control the beam shape at the input section and the output section. By appropriately designing the optical waveguide structure, it is possible to provide a large coupling efficiency between the single optical waveguide and the optical waveguide group, so that the optical waveguide structure will be capable of shaping a light beam with a reduced loss.

For example, when an optical waveguide group is used at the input section, the optical waveguide can be divided into a plurality of optical waveguides along the propagation direction, thereby obtaining an input taper structure, in which the propagation mode at the input section is expanded. In such a case, an optical waveguide group including a plurality of optical waveguides can be provided in the vicinity of the input section of a linear-shaped optical waveguide structure, thereby dividing the optical waveguide at the input section into a plurality of optical waveguides. Thus, the area of proton exchange is reduced, whereby the change in refractive index is reduced and the optical waveguide condition comes closer to a cut-off condition, thereby expanding and increasing the mode distribution. By utilizing this, it is possible to expand the propagation mode at the input side so as to taper the input section. When using an optical waveguide group at the output section, the aspect ratio of the beam through the optical waveguide is improved as described above, thereby improving the aspect ratio of the guide mode, and allowing for output beam shaping.

Moreover, the present inventors have found a novel crystalline characteristic in connection with a proton exchange optical waveguide intended to improve the optical damage resistance. In Embodiment 9 below, another example of the present invention intended to improve the optical damage resistance will be described.

(Embodiment 9)

One possible cause of optical damages when an optical wavelength conversion device using $LiNbO_3$ is a defect in a crystal. An electric charge is moved by an electric field excited by light, and the internal electric field is maintained by the charge trapped in a crystal defect. This internal electric field induces a change in refractive index via an electro-optical effect, thereby causing optical damages. $LiNbO_3$ can be grown by a Czochralski method, and has a congruent composition, with which the growth condition is stable. The congruent composition refers to a crystalline composition ratio which is slightly shifted from that of a perfect crystal, in which the molarity percentage of Li is 48 mol % and the molarity percentage of Nb is 52 mol %.

The Li molarity percentage in a proton exchange layer is represented by the following expression with respect to the respective molar numbers of $H_2O$, $Li_2O$ and $Nb_2O_5$.

Molarity percentage of Li (%)=$Li_2O/(Li_2O+H_2O+Nb_2O_5)$ *100 (%)

When Z mol of a metal element is added as a metal additive to 1 mol of $LiNbO_3$, the molarity percentage of the metal element is Z mol*100 (%).

The mol concentration as used herein refers to a mol concentration ratio between Li and Nb present in the $LiNbO_3$. The sum of the molarity percentage of Li and that of Nb in a crystal is 100 mol %. In a perfect crystal, Li and Nb are present in the same molar number, whereby the molarity percentage of Li and that of Nb are both 50 mol %. Thus, there are a large number of defects in a crystalline structure having a congruent composition. While several models have been proposed in the art for an $LiNbO_3$ crystal, the Li defect model has been strongly supported. According to this crystal model, each Nb atom in excess of the stoichiometric composition is present at an Li site in the crystal, and there still are vacant Li sites.

It has conventionally been proposed in the art to add a particular metal element such as Mg, Zn, Sc, or In to an $LiNbO_3$ crystal so as to fill each crystal defect therein with an additive metal atom in order to improve the optical damage resistance. When such an additive metal element is added to a crystal, vacancies in Li sites are first filled with the additive metal, and Nb atoms present in Li sites are substituted with the additive metal, thereby eliminating a defect (vacancy) in the crystal and thus improving the optical damage resistance. The optical damage resistance starts to rapidly increase around a point where the amount of metal element added is such that the Li site vacancy is eliminated. For $LiNbO_3$ having a congruent composition, this corresponds to about 5 mol % of Mg or Zn.

The present inventors have found that the amount of crystal defects increases when a proton exchange process is performed on an $LiNbO_3$ crystal to which such a metal element is added. While the amount of defects in the $LiNbO_3$ crystal is reduced by the metal addition, a proton exchange process significantly increases the amount of Li site defects because the proton exchange process exchanges Li atoms in the crystal with protons. This occurs for the following two reasons. First, the amount of Li exchanged by a proton exchange process is as much as about 10%, whereby the percentage by which proton is introduced into a proper Li site is low. Second, when $LiNbO_3$ is used, the proton exchange layer has a substantial crystalline strain because $LiNbO_3$ takes a trigonal crystalline structure while $HNbO_3$ takes a cubic crystalline structure. Therefore, in order to improve the optical damage resistance in the proton exchange layer, it is necessary to reduce the crystalline strain and to set protons at a proper Li site. The present inventors conducted various experiments and found that these problems can be solved by an annealing process. More particularly, the present inventors found that the optical damage resistance is increased significantly by setting the proton concentration after the annealing process to be less than or equal to a particular predetermined value (e.g., several %). When an annealing process is performed, the proton concentration decreases due to the thermal diffusion of protons, thereby significantly reducing the crystalline strain. Moreover, by an annealing process, it is possible to maintain protons at appropriate Li positions.

However, it has been found that when the proton concentration in the crystal is high, there remains some crystalline strain, whereby the Li site defects are not sufficiently removed. According to an experiment conducted by the present inventors, when a proton exchange layer is not subjected to an annealing process, the electro-optical constant decreases significantly, whereby a change in refractive index due to an electro-optical effect does not occur. However, where an annealing process is performed to reduce the proton concentration, the optical damage is increased significantly by the annealing process, and a continued annealing process thereafter reduces the optical damage. Particularly, for a proton exchange optical waveguide used in an optical wavelength conversion device, an annealing process is indispensable for increasing the nonlinear optical effect, thereby increasing the optical damage significantly. When an optical waveguide produced through a proton exchange process is used in a nonlinear optical device, it is necessary to provide a sufficient optical damage resistance when used as an optical waveguide. In view of this, the present inventors made a study as follows for characteristics of a proton exchange optical waveguide having a desirable optical damage resistance.

First, the present inventors studied the relationship between the proton exchange concentration in the proton exchange optical waveguide and the optical damage resistance. Using a substrate obtained by doping 5 mol % of Mg into $LiNbO_3$ having a congruent composition, the relationship between the proton exchange concentration in the optical waveguide and the optical damage resistance was measured while controlling the proton exchange time and the annealing time. The results are shown in FIG. 20.

Immediately after the proton exchange process, the molarity percentage of Li is reduced to about 20 mol %, while the optical damage resistance is very high. When no annealing process is performed, the nonlinear constant decreases, thereby reducing the conversion efficiency. When the proton concentration decreases and the Li concentration increases by an annealing process, the optical damage resistance gradually decreases. When the Li concentration is increased to be equal to or greater than 30 mol % by an annealing process, the optical damage resistance starts to increase again. It is believed that this is because the crystal defect is reduced as the proton concentration decreases. Thus, it was found that in order to increase the optical damage resistance, it is necessary to reduce the proton concentration, and that it is preferred to recover the molarity percentage of Li to be equal to or greater than 40 mol %. Moreover, it is preferred that the molarity percentage of Li is 43 mol % or more because the optical damage resistance is then 90% or more of that of a crystal before a proton exchange process.

As described above, it was found that it is possible to recover the optical damage resistance to a level that is substantially the same as that before the proton exchange process by sufficiently reducing the proton concentration by subjecting the proton exchange layer to an annealing process. However, an annealed proton exchange layer has a low proton concentration and thus a small change in refractive index, and may be undesirable because it is difficult to increase the light confinement of the optical waveguide. In order to solve this problem, it is preferred to provide a structure with which it is possible to reduce the defect density in a crystal even when there is a large amount of proton in the proton exchange layer. Based on the above-described defect model, the present inventors presumed that this problem could be solved by previously providing in a crystal, in which a proton exchange layer is to be provided, Li or other additive metal in an amount sufficient to fill the crystal defects (the amount of which increases by a proton exchange process) so as to completely eliminate the crystal defect in the proton exchange layer. Conventionally, it has been reported that the amount of additive metal should be about 5 mol for Mg, for example, and that over about 5 mol, the amount of crystal defects increases while increasing the absorption, thereby reducing the optical damage resistance. However, this amount is determined with respect to the LiNbO$_3$ crystal itself, but not to the proton exchange optical waveguide produced in the LiNbO$_3$ crystal. An experiment conducted by the present inventors have shown that in order to improve the optical damage resistance of a proton exchange optical waveguide, it is necessary to add an additive of a concentration higher that an optimal value for an LiNbO$_3$ crystal, so that the crystal defect is eliminated when a proton exchange layer is formed.

In the experiment, various crystals having different Li concentrations and additive metal concentrations were produced by a crystal pulling method, and the optical damage resistance of a layer subjected to a proton exchange process was measured. As a result, the present inventors found that the optical damage resistance of a proton exchange layer is strongly dependent upon the value Y+Z, which is obtained by adding together the molarity percentage Y of Li and the molarity Z of the additive metal in the proton exchange layer. The "molarity percentage of Li" as used herein refers to the concentration of Li element with respect to the total concentration of Li and Nb in a crystal. In an ideal crystal, the molarity percentage of Li and that of Nb are both 50 mol %. In a normal crystal (having a congruent composition), the molarity percentage of Li is about 48 mol % and the molar concentration of Nb is about 52 mol %. The molarity percentage of an added metal element as used herein refers to the content (in %) of the added metal element in 1 mol of LiNbO$_3$ crystal.

FIG. 21 illustrates the relationship between the value Y+Z and the optical damage resistance. When the value Y+Z is 20 mol % or less, the crystal has substantially no electro-optical effect, thereby significantly increasing the optical damage resistance. For a value of Y+Z in the range of 34 mol % to 40 mol %, the optical damage resistance is reduced, and an optical damage resistance substantially equal to that of LiNbO$_3$ doped with 5 mol % of Mg is exhibited when the value Y+Z is 45 mol %. It was confirmed that while the optical damage resistance slightly varies depending upon the Li concentration and the additive metal concentration, a desirable optical damage resistance, substantially equal to that of an LiNbO$_3$ substrate doped with 5 mol % of Mg, is obtained for any crystal in which the value Y+Z is 48 mol % or more. Therefore, the value Y+Z in the proton exchange layer is preferably 48 mol % or more. It is believed that this is because the crystal defect occurring from a proton exchange process is compensated for by an added metal element and Li. Li in the crystal is replaced with protons by a proton exchange process, thereby increasing the amount of defects in Li sites in the crystal. Although the exchanged proton can be moved by a heat treatment to an optimal position in the crystal, the Li crystal defects cannot be filled completely. Thus, after subjecting the proton exchange layer to a heat treatment so as to move protons to optimal positions, Li and an additive metal element can be provided in portions of the crystal which are to be subjected to proton exchange in amounts that are sufficient to prevent an expected amount of crystal defects, so as to minimize the amount of crystal defects in the proton exchange layer. This value is such that the sum of the molarity percentage Y of Li and the molarity Z of the added metal element is 45 mol % to 50 mol % or more.

It is difficult to produce an intended crystal from a commercially available crystal with a congruent composition which is doped with 5 mol % of MgO for the following reasons. In a commercially available crystal, the sum of the molarity percentage of Li and the molarity percentage of Mg is about 53 mol %, and the value is reduced to about 20 mol % by a proton exchange process. Even if the crystal is subjected to an annealing process, it is difficult to realize a concentration of the proton exchange layer exceeding 48 mol % because the concentration of the surrounding portions is as low as 53 mol %. This is because when the proton concentration is reduced to a degree such that the sum of the molarity percentage of Li and the molarity of the added metal element is equal to or greater than 48 mol %, the difference in refractive index between the optical waveguide and the substrate is reduced, whereby it is difficult to produce an optical waveguide having a small cross-sectional area and a strong light confinement.

The following method can possibly be used to solve this problem. First, the molarity of the added metal element can be increased. For example, when 7 mol of Mg is doped into a congruent crystal (Li concentration: 48 mol %), the sum of the molarity percentage of Li and the molarity of Mg is 55 mol %. When a proton exchange process and an annealing process are performed so that the sum of the molarity percentage of Li and the molarity of Mg in the proton exchange layer is 48 mol %, it is possible to produce an optical waveguide having a desirable optical damage resistance. Second, the Li concentration of the crystal can be increased. For example, an LiNbO$_3$ perfect crystal (Li molarity percentage: 50 mol %) may be doped with 5 mol % of Mg. The sum of the molarity percentage of Li and the molarity of the added metal element is 55 mol %. By subjecting the crystal to a proton exchange process and then an annealing process, the sum of the molarity percentage of Li and the molarity of the added metal element can be increased to over 50 mol %, whereby it is possible to produce a proton exchange optical waveguide with a high optical damage resistance. In any case, the substrate itself has a composition that is shifted from the optimal composition, so that the optical damage resistance will be lower than an optimal value. However, it is possible to significantly increase the optical damage resistance of the optical waveguide itself by employing an optimal structure in the proton exchange layer. Thus, it is possible to realize a crystalline structure having a desirable optical damage resistance in an optical waveguide produced through a proton exchange process. When the molarity percentage of Li and the molarity of the added metal element are further increased, it is possible to produce an optical waveguide with a high optical damage resistance even when the degree of annealing process is reduced (i.e., when the proton concentration is higher). In such a case, it is possible to provide a substantial difference between the refractive index of the optical waveguide and that of the substrate, and thus to produce an optical waveguide with an even greater light confinement, thereby producing an optical wavelength conversion device having a high efficiency. The molarity percentage of Li is preferably 50 mol % or less. Over 50 mol %, the amount of crystal defects increases.

When an optical waveguide having a high Li molarity percentage is used, the nonlinear optical constant of the optical waveguide increases, whereby it is possible to produce an optical wavelength conversion device having a high efficiency, for the following reasons. The Li molarity percentage in the proton exchange optical waveguide influences the nonlinear optical constant. When the Li molarity percentage is set to be equal to or greater than 45 mol %, the nonlinear optical constant and the conversion efficiency are 1.05 and 1.1, respectively, of those of an optical waveguide in which the Li molarity percentage is less than or equal to 40 mol %. When the sum of the molarity percentage of Li and the molarity of the added metal element is increased by addition of a metal element to be 50 mol % or more, the nonlinear optical constant and the conversion efficiency are improved by a factor of about 1.1 and about 1.2, respectively. It is very effective also in terms of efficiency to control the Li concentration in the proton exchange optical waveguide.

In the present embodiment, an $LiNbO_3$ substrate is used. However, effects similar to those described above can also be obtained by using $LiTaO_3$, or $LiNb_xTa_{1-x}O_3$ ($0 \leq x \leq 1$) (a mixture of $LiNbO_3$ and $LiTaO_3$). Effects similar to those described above can also be obtained by using any other additive metal element, including Mg, Zn, In, Sc, used either alone or in combination of two or more. $LiTaO_3$ and $LiNb_xTa_{1-x}O_3$ ($0 \leq x \leq 1$) (a mixture of $LiNbO_3$ and $LiTaO_3$) provide a congruent composition and an optical damage resistance that are equivalent to those provided by $LiNbO_3$. Moreover, the optical damage resistance is varied by a proton exchange process in a manner similar to that when using $LiNbO_3$. Thus, as when $LiNbO_3$ is used, the optical damage resistance is reduced as the amount of crystal defects increases. Therefore, as a method for preventing Li defect in the proton exchange layer, it is possible to prevent the amount of crystal defects from increasing due to the proton exchange process by adding a relatively large amount of Li or a metal additive.

The Li concentration in the crystal can alternatively be increased through thermal diffusion of Li. When an $LiNbO_3$ substrate is subjected to a heat treatment at a temperature of 1000° C. to 1100° C. in a powder containing Li, the Li atoms diffuse into the $LiNbO_3$ substrate surface, thereby providing a crystal in which the Li concentration is higher in the vicinity of the substrate surface. Because only a several $\mu m$ thick portion of the crystal in the vicinity of the substrate surface is used for the optical waveguide, a proton exchange layer formed in a substrate obtained as described above has a high optical damage resistance.

The amount of metal added to the crystal can be increased by increasing the amount of the metal added during a crystal pulling process, or alternatively through thermal diffusion of metal. For example, when using Zn, a ZnO film is deposited on $LiNbO_3$ and subjected to a heat treatment at about 1000° C. so as to diffuse Zn into the crystal, thereby producing a layer with a high metal additive concentration in the vicinity of the substrate surface. Then, a proton exchange optical waveguide is produced in the layer so as to produce an optical waveguide having a desirable optical damage resistance.

Effects similar to those described above can be obtained when a single metal element is added or when more than one of the above-listed metal elements are added simultaneously.

While the above-described experiment was performed for the Li concentration and the metal additive concentration by using a linear single optical waveguide, further improvement in the optical damage resistance was confirmed for an optical waveguide structure including a group of optical waveguides as illustrated above in Embodiments 7 and 8. It is possible to reduce the area of proton exchange and thus to reduce the chemical damages by using such a group of optical waveguides. Moreover, it is possible to improve the optical damage resistance of the optical waveguide itself by controlling the Li concentration and/or the metal additive concentration. As a result, it is possible to realize an optical wavelength conversion device having a reduced loss and high output characteristics.

(Embodiment 10)

In the present embodiment, a coherent light generation apparatus of the present invention will be described. The coherent light generation apparatus includes a semiconductor laser device and an optical wavelength conversion device and is capable of realizing stable output characteristics. A feature of the coherent light generation apparatus of the present invention is the use of the optical wavelength conversion device of the present invention having a desirable optical damage resistance whereby it is possible to realize stable output characteristics.

The optical damage resistance of a conventional optical wavelength conversion device is not sufficient. Therefore, when blue light having a wavelength of about 425 nm is output with an output of about 10 mW, a phenomenon in which the phase matching wavelength is varied by optical damages is observed. Thus, the output of the coherent light generation apparatus varies gradually. In order to stabilize the output of the apparatus, it is necessary to control the oscillation wavelength of the semiconductor laser device so that the SHG (second harmonic generation) output has a constant value, necessitating an output stabilization circuit. In contrast, the optical wavelength conversion device of the present invention has a desirable optical damage resistance, whereby a coherent light generation apparatus using the optical wavelength conversion device does not need an output stabilization circuit. Moreover, it is possible to obtain a stable output with a simple structure.

FIG. 22 is a perspective view illustrating the structure of a coherent light generation apparatus 120 according to the present embodiment. The coherent light generation apparatus 120 includes an optical wavelength conversion device 121 and a semiconductor laser device 122 as those described above in Embodiment 7 with reference to FIG. 15. The optical wavelength conversion device 121 includes an input section 123 and an output section 124. The semiconductor laser device 122 may be a semiconductor laser device in which the emission wavelength is variable, e.g., a DBR semiconductor laser device obtained by integrating a DBR grating structure on an LD or a semiconductor laser device in which the wavelength can be varied by the temperature or by an external grating. The emission wavelength is adjusted to satisfy the phase matching condition of the optical wavelength conversion device so as to stabilize the output of the coherent light generation apparatus.

The coherent light generation apparatus 120 has the following features in addition to the feature that it improves the optical damage resistance of the optical wavelength conversion device. The optical wavelength conversion device 121 includes a group of three optical waveguides and is capable of converting a fundamental wave having a wavelength of 850 nm to a second harmonic wave having a wavelength of 425 nm. In the optical wavelength conversion device 121, the fundamental wave propagates through the optical waveguide group, and the second higher harmonic generation (SHG) propagates through the center optical waveguide. As SHG propagates through the center optical waveguide, the aspect ratio of the output beam is about 1:1.5. Thus, where the output light is focused by using a focusing optical system, it is possible to focus 90% or more of the light, thereby significantly improving the light efficiency. A conventional structure, with which the aspect ratio of the output light is about 1:3 or more, requires a prism optical system, or the like, for improving the aspect ratio, thereby lowering the light efficiency.

In a variable wavelength coherent light generation apparatus which utilizes parametric oscillation, the optical waveguide-type device is small, whereby it is possible to reduce the size of the coherent light generation apparatus by directly coupling the semiconductor laser device with the optical wavelength conversion device as illustrated in FIG. 22. For example, by using an optical wavelength conversion device having a periodic polarization inverted structure as that of Embodiment 8 and a laser light source, it is possible to realize parametric oscillation. In parametric oscillation, when a fundamental wave $\lambda 3$ is input, signal light $\lambda 2$ and idler $\lambda 1$ are generated which satisfy the relationship $1/\lambda 3 = 1/\lambda 1 + 1/\lambda 2$, and each of the generated light waves propagate in a single mode through the group of optical waveguides as a single optical waveguide Therefore, it is possible to generate, from a fundamental wave having a wavelength of $\lambda 3$, light having a wavelength that satisfies the above condition, while varying the wavelength of the light, thereby realizing a variable wavelength coherent light generation apparatus. By employing the optical wavelength conversion device of the present invention having a high efficiency and a wavelength conversion function in combination with such a coherent light generation apparatus, it is possible to output a higher harmonic wave on the mW order by the wavelength conversion by a semiconductor laser device, thereby realizing a variable wavelength coherent light generation apparatus integrated with a semiconductor laser device. The temperature of the optical wavelength conversion device can be adjusted by using, for example, a heater, a Peltier element, or the like, so as to modulate the phase matching wavelength, and to vary the output wavelength. When a sum frequency wave or a difference frequency wave is generated, it is possible to synthesize two light beams together outside the device and to input the synthesized light beam into an optical waveguide.

(Embodiment 11)

According to the above-described embodiment, it is possible to realize an optical wavelength conversion device capable of providing an efficient and stable output. In the present embodiment, a short wavelength light source is provided by using the optical wavelength conversion device of the present invention. The short wavelength light source includes a semiconductor laser device having a wavelength in an 850 nm band, a focusing optical system, and an optical wavelength conversion device such as that described above in Embodiment 7 with reference to FIG. 15. The output light from the semiconductor laser device is focused by the focusing optical system onto an edge surface of the optical waveguide of the optical wavelength conversion device, and excited to provide a guide mode. Then, SHG light after wavelength conversion is output through the other edge surface of the optical waveguide of the optical wavelength conversion device. Since an optical wavelength conversion device having a high conversion efficiency is used, it is possible to obtain blue SHG light of 10 mW with a semiconductor laser device having an output of about 100 mW. The wavelength in a 400 nm band is desirable for a wide variety of technical fields such as plate-making, bioengineering, special measurement such as fluorescence spectrometry, or optical disk field. The short wavelength light source of the present embodiment using an optical wavelength conversion device can be used in practice in any of these technical fields in view of both the output characteristics and the stability.

While light from the semiconductor laser device is coupled to an optical waveguide with a focusing optical system in the present embodiment, it is alternatively possible to directly couple the semiconductor laser device with the optical waveguide. When an optical waveguide of a TE (transverse electric) mode is used, the guide mode of the semiconductor laser device can be equal to the electric field distribution, whereby it is possible to provide coupling with a high efficiency even without a focusing lens. In an experiment conducted by the present inventors, it was confirmed that a direct coupling can be made with a coupling efficiency of 80%, and that substantially the same coupling characteristics as those obtained by a coupling via a lens can be obtained. The use of a direct coupling may be desirable because it is then possible to realize a small and inexpensive light source.

(Embodiment 12)

In the present embodiment, an optical system 140 of the present invention will be described. FIG. 23 is a cross-sectional view illustrating the optical system 140 of the present embodiment. The optical system 140 includes a coherent light generation apparatus 145 such as that described above in Embodiment 10. A light beam emitted from the coherent light generation apparatus 145 having an output of 10 mW is focused by a lens 146, and then is transmitted through a beam splitter 147 and a $\lambda/4$ plate 157 to be illuminated onto an optical disk 150, which is an information reproduction medium, via an objective lens 149. The reflected light is collimated by the objective lens 149, and reflected by the beam splitter 147. Then, a photodetector 148 reads signals from the light. By modulating the intensity of the output from the coherent light generation apparatus, it is possible to write information on the optical disk 150.

In the optical system, the phase matching condition tolerance of the optical wavelength conversion device is increased, whereby it is possible to stabilize the output and to suppress variations in the output to be 50% or less even for variations in the environmental temperature.

Since the system can generate high output blue light, it is possible to write information onto an optical disk as well as reading information from the optical disk. Moreover, by using a semiconductor laser as a light source for a fundamental wave, it is possible to reduce the size of the system, thereby enabling its applications in small consumer optical disk reproduction/recording apparatuses.

In order to write information onto an optical disk, it is necessary to modulate the output of the coherent light generation apparatus. In the optical system of the present embodiment, it is possible to modulate the output from the coherent light generation apparatus by modulating the output intensity of the semiconductor laser device.

Furthermore, by optimizing the width of the optical waveguide of the optical wavelength conversion device, it is possible to optimize the aspect ratio of the output beam. For example, it is possible to provide a group of three optical waveguides designed so that a higher harmonic wave propagates through the center optical waveguide, wherein only the center optical waveguide extends in the vicinity of the output section, with the other optical waveguides being cut off at a certain point along the propagation direction so that light cannot be propagated therethrough. By employing such a structure, it is possible to control the aspect ratio of the output beam to be closer to 1:1. Therefore, a beam shaping prism, or the like, for improving the focusing characteristics of an optical pickup is no longer necessary, thereby realizing a high transmission efficiency, desirable focusing characteristics and a low cost. Moreover, it is possible to reduce the noise of scattered light occurring during a beam shaping process, thereby simplifying the optical pickup.

As described above, according to the present invention, in an optical waveguide structure including a high refractive index layer, a first proton exchange region (first ion exchange region) is annealed so that the region has a graded pattern, after which a second proton exchange region (second ion exchange region) is formed so that the region has a step-like graded pattern, whereby it is possible to significantly improve the optical damage resistance and the wavelength conversion efficiency, the operating lifetime at high temperatures, and the characteristics due to the reduction in the propagation loss along the optical waveguide. Thus, the present invention provides significant effects in practical use.

With the short wavelength light generation apparatus of the present invention, light from a semiconductor laser device is converted in an optical waveguide which includes a high refractive index layer having a step-like graded refractive index distribution pattern, whereby it is possible to realize a high output, high reliability short wavelength light source. Thus, the present invention provides significant effects in practical use.

In a method for producing an optical waveguide of the present invention, annealing processes are performed for producing a high refractive index cladding layer, wherein the annealing process for the first proton exchange region (first ion exchange region) and the annealing process for the second proton exchange region (second ion exchange region) are performed at different temperatures. Thus, it is possible to uniformly and precisely produce a graded refractive index distribution which is required for the second proton exchange region (second ion exchange region), thereby significantly improving the optical wavelength conversion device characteristics. Thus, the present invention provides significant effects in practical use.

The present invention employs an optical waveguide structure including a group of optical waveguides, whereby it is possible to reduce the propagation loss along the optical waveguide, thereby significantly improving the optical damage resistance. Moreover, by optimizing the structure of the group of optical waveguides, it is possible to improve the conversion efficiency and the focusing characteristics. Thus, the present invention provides significant effects in practical use.

According to the present invention, in an optical wavelength conversion device using a proton exchange optical waveguide, the Li concentration in the optical waveguide is appropriately controlled, whereby it is possible to significantly improve the optical damage resistance. Thus, the present invention provides significant effects in practical use.

According to the present invention, a high output coherent light generation apparatus having stable output characteristics can be obtained by employing an optical wavelength conversion device of the present invention having a desirable optical damage resistance. Thus, the present invention provides significant effects in practical use.

According to the present invention, an optical system with reduced noise can be obtained by employing a high output coherent light generation apparatus of the present invention which has little output variation. Thus, the present invention provides significant effects in practical use.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical waveguide, comprising:
   a nonlinear optical crystal;
   a first ion exchange region provided in the vicinity of a portion of a surface of the nonlinear optical crystal; and
   a second ion exchange region provided in the surface of the nonlinear optical crystal, wherein:
   the second ion exchange region covers a greater area of the surface than an area covered by the first ion exchange region; and
   the second ion exchange region includes a region having an extent of 0.02 $\mu$m to 0.2 $\mu$m along a depth direction in which an ion exchange ratio varies along the depth direction.

2. An optical waveguide according to claim 1, wherein the second ion exchange region includes a region having an extent of 0.02 $\mu$m to 0.2 $\mu$m along a depth direction in which an amount of change in an ion exchange ratio is 5 $\mu m^{-1}$ to 50 $\mu m^{-1}$.

3. An optical waveguide according to claim 1, wherein the first ion exchange region has an amount of change in ion exchange ratio which is less than or equal to 0.06 $\mu m^{-1}$.

4. An optical waveguide according to claim 1, wherein the second ion exchange region includes a region having an extent of 0.03 $\mu$m to 0.1 $\mu$m along a depth direction in which an ion exchange ratio varies along the depth direction.

5. An optical waveguide according to claim 1, wherein the second ion exchange region has an amount of change in ion exchange ratio of 10 $\mu m^{-1}$ to 30 $\mu m^{-1}$.

6. An optical waveguide according to claim 1, wherein the first ion exchange region has a nonlinear optical constant which is equal to or greater than 90% of that of the crystal, and the second ion exchange region has a nonlinear optical constant which is less than or equal to 60% of that of the crystal.

7. An optical waveguide according to claim 1, wherein the first ion exchange region has a change of surface refractive index Δn which is less than or equal to 0.02 for light having a wavelength of 633 nm, and the second ion exchange region has a change of surface refractive index Δn which is equal to or greater than 0.11 for light having a wavelength of 633 nm.

8. An optical waveguide according to claim 1, wherein the optical waveguide is provided through an ion exchange process in the surface of the nonlinear optical crystal, the nonlinear optical crystal being made of $LiNb_xTa_{1-x}O_3$ ($0 \leq x \leq 1$), and a molarity percentage of Li in the optical waveguide is equal to or greater than 40 mol %.

9. An optical waveguide according to claim 1, wherein the optical waveguide is provided through an ion exchange process in the surface of the nonlinear optical crystal, the nonlinear optical crystal being made of $LiNb_xTa_{1-x}O_3$ ($0 \leq x \leq 1$) and doped with a metal element in the vicinity of the surface, and a molarity percentage Y of Li and a molarity percentage Z of the metal element in the optical waveguide have a relationship of $Y+Z \geq 45$ mol %.

10. An optical waveguide, comprising:
  a nonlinear optical crystal;
  a first ion exchange region provided in the vicinity of a portion of a surface of the nonlinear optical crystal; and
  a second ion exchange region provided in the surface of the nonlinear optical crystal, wherein:
    the second ion exchange region covers a greater area of the surface than an area covered by the first ion exchange region; and
    the second ion exchange region has a refractive index higher than that of the first ion exchange region, and the second ion exchange region has a refractive index distribution which is in a step-like graded pattern.

11. An optical waveguide according to claim 10, wherein the first ion exchange region and the second ion exchange region have different graded patterns obtained by annealing processes at different temperatures, respectively.

12. An optical waveguide according to claim 10, wherein a depth of the first ion exchange region is expanded by an annealing process to be equal to or greater than 8 times that before the annealing process.

13. An optical waveguide according to claim 10, wherein a depth of the second ion exchange region is expanded by an annealing process to be equal to or greater than 1.2 times that before the annealing process.

14. An optical waveguide according to claim 10, wherein a depth of the second ion exchange region is expanded by an annealing process to be equal to or greater than 2 times that before the annealing process.

15. An optical waveguide according to claim 10, wherein a surface refractive index of the second ion exchange region is substantially equal to that before an annealing process.

16. An optical waveguide according to claim 10, wherein the step-like graded pattern of the refractive index distribution of the second ion exchange region is provided by an annealing process which satisfies the relationship represented by Expressions 1 and 2 below:

$$C(k,t) = CO \times 0.5 \times \{Erf[(h+k)/2/\sqrt{Dp \times t}] + Erf[(h-k)/2/\sqrt{Dp \times t}]\} \quad \text{Expression 1}$$

(where $C(k,t)$ is an ion exchange concentration, k is a depth ($\mu$m), t is an annealing time (hour), CO is an initial ion exchange concentration, Erf[ ] is an error function, h is an initial ion exchange depth ($\mu$m), and Dp is an ion diffusion constant by an annealing process ($\mu m^2$/hour)); and $$1.5 < (h+k)/2/\sqrt{Dp \times t} < 20 \quad \text{Expression 2.}$$

17. An optical waveguide according to claim 10, wherein the nonlinear optical crystal is an $LiNb_xTa_{1-x}O_3$ ($0 \leq x \leq 1$) crystal.

18. An optical waveguide according to claim 10, wherein each of an ion exchange process for providing the first ion exchange region and an ion exchange process for providing the second ion exchange region is a proton exchange process.

19. An optical waveguide according to claim 10, wherein the optical waveguide is provided through an ion exchange process in the surface of the nonlinear optical crystal, the nonlinear optical crystal being made of $LiNb_xTa_{1-x}O_3$ ($0 \leq x \leq 1$), and a molarity percentage of Li in the optical waveguide is equal to or greater than 40 mol %.

20. An optical waveguide according to claim 10, wherein the optical waveguide is provided through an ion exchange process in the surface of the nonlinear optical crystal, the nonlinear optical crystal being made of $LiNb_xTa_{1-x}O_3$ ($0 \leq x \leq 1$) and doped with a metal element in the vicinity of the surface, and a molarity percentage Y of Li and a molarity percentage Z of the metal element in the optical waveguide have a relationship of $Y+Z \geq 45$ mol %.

21. An optical waveguide, comprising:
  a nonlinear optical crystal;
  a first ion exchange region provided in the vicinity of a portion of a surface of the nonlinear optical crystal; and
  a second ion exchange region provided in the surface of the nonlinear optical crystal, wherein:
    the second ion exchange region covers a greater area of the surface than an area covered by the first ion exchange region; and
    the second ion exchange region has an ion concentration higher than that of the first ion exchange region, and the second ion exchange region has an ion concentration distribution which is in a step-like graded pattern.

22. An optical waveguide according to claim 21, wherein the first ion exchange region and the second ion exchange region have different graded patterns of ion concentration distribution obtained by annealing processes at different temperatures, respectively.

23. An optical waveguide according to claim 21, wherein a depth of the first ion exchange region is expanded by an annealing process to be equal to or greater than 8 times that before the annealing process.

24. An optical waveguide according to claim 21, wherein a depth of the second ion exchange region is expanded by an annealing process to be equal to or greater than 1.2 times that before the annealing process.

25. An optical waveguide according to claim 21, wherein a depth of the second ion exchange region is expanded by an annealing process to be equal to or greater than 2 times that before the annealing process.

26. An optical waveguide according to claim 21, wherein a surface ion concentration of the second Ion exchange region is substantially equal to that before an annealing process.

27. An optical waveguide according to claim 21, wherein the step-like graded pattern of the ion concentration distribution of the second ion exchange region is provided by an annealing process which satisfies the relationship represented by Expressions 1 and 2 below:

$$C(k,t) = CO \times 0.5 \times \{Erf[(h+k)/2/\sqrt{Dp \times t}] + Erf[(h-k)/2/\sqrt{Dp \times t}]\} \quad \text{Expression 1}$$

(where C(k,t) is an ion exchange concentration, k is a depth (μm), t is an annealing time (hour), CO is an initial ion exchange concentration, Erf[ ] is an error function, h is an initial ion exchange depth (μm), and Dp is an ion diffusion constant by an annealing process (μm²/hour)); and $$1.5 < (h+k)/2/\sqrt{Dp \times t} < 20 \quad \text{Expression 2.}$$

28. An optical waveguide according to claim 21, wherein the nonlinear optical crystal is an $LiNb_xTa_{1-x}O_3$ ($0 \leq x \leq 1$) crystal.

29. An optical waveguide according to claim 21, wherein each of an ion exchange process for providing the first ion exchange region and an ion exchange process for providing the second ion exchange region is a proton exchange process.

30. An optical waveguide according to claim 21, wherein the optical waveguide is provided through an ion exchange process in the surface of the nonlinear optical crystal, the nonlinear optical crystal being made of $LiNb_xTa_{1-x}O_3$ ($0 \leq x \leq 1$), and a molarity percentage of Li in the optical waveguide is equal to or greater than 40 mol %.

31. An optical waveguide according to claim 21, wherein the optical waveguide is provided through an ion exchange process in the surface of the nonlinear optical crystal, the nonlinear optical crystal being made of $LiNb_xTa_{1-x}O_3$ ($0 \leq x \leq 1$) and doped with a metal element in the vicinity of the surface, and a molarity percentage Y of Li and a molarity percentage Z of the metal element in the optical waveguide have a relationship of Y +Z$\geq$45 mol %.

32. An optical wavelength conversion device, comprising an optical waveguide which is provided through an ion exchange process in a surface of a crystal of $LiNb_xTa_{1-x}O_3$ ($0 \leq x \leq 1$), wherein a molarity percentage of Li in the optical waveguide is equal to or greater than 40 mol % after the ion exchange process.

33. An optical wavelength conversion device, comprising an optical waveguide which is provided through an ion exchange process in a surface of a crystal, the crystal being made of $LiNb_xTa_{1-x}O_3$ ($0 \leq x \leq 1$) and doped with a metal element in the vicinity of the surface, and a molarity percentage Y of Li and a molarity percentage Z of the metal element in the optical waveguide have a relationship of Y+Z$\geq$45 mol % after the ion exchange process.

34. An optical wavelength conversion device according to claim 33, wherein the metal element is one of Mg, Zn, Sc and In, or a mixture of two or more of Mg, Zn, Sc and In.

\* \* \* \* \*

UNITED STATES PATENT AND TRADEMARK OFFICE
CERTIFICATE OF CORRECTION

PATENT NO.    : 6,519,077 B1  Page 1 of 1
DATED         : February 11, 2003
INVENTOR(S)   : Mizuuchi et al.

It is certified that error appears in the above-identified patent and that said Letters Patent is hereby corrected as shown below:

Column 56,
Line 65, "30um$^{31\ 1}$", should read -- 30um$^{-1}$ --.

Signed and Sealed this

Thirtieth Day of September, 2003

JAMES E. ROGAN
*Director of the United States Patent and Trademark Office*